(12) United States Patent
Irikura

(10) Patent No.: US 7,591,338 B2
(45) Date of Patent: Sep. 22, 2009

(54) HYDRAULIC TRANSAXLE AND VEHICLE COMPRISING IT

(75) Inventor: Koji Irikura, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 195 days.

(21) Appl. No.: 11/008,662

(22) Filed: Dec. 10, 2004

(65) Prior Publication Data

US 2005/0126843 A1 Jun. 16, 2005

(51) Int. Cl.
*B60K 17/356* (2006.01)
*B60K 17/30* (2006.01)

(52) U.S. Cl. ............... 180/242; 180/253; 180/308; 180/305

(58) Field of Classification Search .......... 180/242, 180/253, 308, 305
See application file for complete search history.

(56) References Cited

U.S. PATENT DOCUMENTS

| | | | | | |
|---|---|---|---|---|---|
| 3,337,231 | A | * | 8/1967 | Drake | 180/409 |
| 3,351,147 | A | | 11/1967 | Williamson | |
| 3,469,646 | A | * | 9/1969 | O'Connor | 180/255 |
| 5,472,062 | A | * | 12/1995 | Nagai et al. | 180/252 |
| 5,542,492 | A | * | 8/1996 | Kasper | 180/253 |
| 5,823,284 | A | * | 10/1998 | Hoar et al. | 180/240 |
| 6,098,738 | A | | 8/2000 | White | |
| 6,109,379 | A | * | 8/2000 | Madwed | 180/65.5 |
| 6,206,127 | B1 | * | 3/2001 | Zakula et al. | 180/236 |
| 6,302,233 | B1 | * | 10/2001 | Okamuro et al. | 180/253 |
| 6,349,781 | B1 | * | 2/2002 | Kruse | 180/7.2 |
| 6,408,972 | B1 | * | 6/2002 | Rodgers et al. | 180/197 |
| 6,425,453 | B1 | * | 7/2002 | Knutson et al. | 180/256 |
| 6,478,099 | B1 | * | 11/2002 | Madwed | 180/21 |
| 6,513,614 | B2 | * | 2/2003 | Knutson et al. | 180/242 |
| 7,044,259 | B2 | * | 5/2006 | Stoll et al. | 180/307 |
| 2003/0106725 | A1 | | 6/2003 | Irikura | |

FOREIGN PATENT DOCUMENTS

| | | |
|---|---|---|
| DE | 101 27 275 A1 | 12/2001 |
| DE | 100 30 900 A1 | 1/2002 |
| EP | 0 749 862 A1 | 12/1996 |
| FR | 2 688 175 | 9/1993 |
| FR | 2 693 154 | 1/1994 |
| FR | 2 726 230 | 5/1996 |
| GB | 1 237 467 | 6/1971 |
| JP | 58-58932 | 4/1983 |

(Continued)

OTHER PUBLICATIONS

Dialog File 351, Accession No. 1993-361703/199346, WPI English language abstract of FR 2 688 175 (Document AP1).

(Continued)

*Primary Examiner*—Paul N Dickson
*Assistant Examiner*—Marlon A Arce
(74) *Attorney, Agent, or Firm*—Sterne, Kessler, Goldstein & Fox P.L.L.C.

(57) ABSTRACT

A steerable hydraulic transaxle comprises: a kingpin relatively rotatably supported by a vehicle chassis; a housing fixed to the kingpin; a single axle disposed in the housing; a single wheel fixed onto the single axle out of the housing; and a hydraulic motor disposed in the housing so as to drive the single axle.

13 Claims, 54 Drawing Sheets

FOREIGN PATENT DOCUMENTS

| | | |
|---|---|---|
| JP | 62-37775 | 8/1983 |
| JP | 59 213520 A | 12/1984 |
| JP | 2004-210215 | 7/2004 |

OTHER PUBLICATIONS

Dialog File 351, Accession No. 1994-044623/199406, WPI English language abstract of FR 2 693 154 (Document AL2).

Dialog File 351, Accession No. 1996-241128/199625, WPI English language abstract of FR 2 726 230 (Document AM2).

Dialog File 351, Accession No. 2002-042697/200206, WPI English language abstract of DE 101 27 275 A1 (Document AO2).

Dialog File 351, Accession No. 2002-107160/200215, WPI English language abstract of DE 100 30 900 A1 (Document AP2).

European Search Report for European Application No. 04 02 9139, mailed Mar. 17, 2005, European Patent Office, Netherlands.

European Search Report for corresponding EP Appl. No. EP 08 00 0143, dated May 23, 2008, 2 pages.

* cited by examiner (a)

(b)

(c)

(a)

(b)

(c)

(a)

(b)

(a)

(b)

HYDRAULIC TRANSAXLE AND VEHICLE COMPRISING IT

BACKGROUND OF THE INVENTION

1. Field of the Invention

The invention relates to a hydraulic transaxle, which incorporates a hydraulic motor for driving a single wheel, and is steerably supported by a vehicle chassis. The invention also relates to a four-wheel driving vehicle including the hydraulic transaxles for driving respective wheels.

2. Related Art

As disclosed in U.S. Patent Application Publication No. 2003/0106725A1, there is a conventional vehicle having left and right steerable wheels linked to a steering operation device such as a steering wheel. In the conventional vehicle, according to steering, e.g., according to increase of a rotational angle of a steering wheel from its straight traveling position, turning angles of the left and right steerable wheels are increased so that the turning angle of the steerable wheel on the turning inside of the vehicle (hereinafter referred to as "inside wheel") becomes larger than that of the steerable wheel on the turning outside of the vehicle (hereinafter referred to as "outside wheel").

This vehicle can turn on a small circle by a reduced steering degree (a small rotational angle of the steering wheel). However, the steerable wheels are not drivingly connected to a prime mover. The rotary speeds of the steerable wheels depend upon the speed control of (unsteerable) drive wheels by an operator's manipulation. Such a vehicle is disadvantageous in traveling capacity on a bad road and climbing capacity.

As disclosed in Japanese Utility Model Application Publication No. Sho 58-58932 and Japanese Utility Model Publication No. Sho 62-37775, there is a conventional four-wheel driving vehicle having four fixed displacement hydraulic motors for driving respective four wheels, i.e., left and right front wheels and left and right rear wheels. The left and right front wheels are steerable wheels, which are steered by turning of a steering wheel. The hydraulic motors are mounted on a vehicle chassis and drivingly connected to the respective wheels through respective deceleration gear trains in respective housings.

The vehicle has left and right variable displacement hydraulic pumps. The left front and rear hydraulic motors are fluidly connected in parallel to the left hydraulic pump, and the right front and rear hydraulic motors to the right hydraulic pump. The front hydraulic motors can be fluidly separated from the respective hydraulic pumps so as to put the vehicle into a two-wheel drive mode. By operating a speed control manipulator, the left and right hydraulic pumps are synchronously controlled in their delivery direction and amount so as to control the traveling direction and speed of the vehicle. The hydraulic pumps are fluidly connected to each other so as to allow differential rotation of left and right rear wheels (and left and right front wheels). The vehicle is also provided with a valve for differential locking, i.e., cutting off the fluidal connection between the hydraulic pumps, so as to facilitate escape of the vehicle from mud or a ditch.

This conventional vehicle is disadvantageous in minimization because the hydraulic motors and the respective deceleration gear train housings are mounted upright on the vehicle chassis. The vehicle is also disadvantageous in cost because of the two hydraulic pump. Further, when the vehicle travels in the four-wheel drive mode, the front and rear hydraulic motors on each of left and right sides of the vehicle are fluidly connected in parallel to the common left or right hydraulic pump, so that the amount of hydraulic fluid supplied to each of the hydraulic motors is restricted. Therefore, the vehicle is disadvantageous in efficiency of acceleration, i.e., high-speed traveling.

As disclosed in Japanese Patent Application Publication No. 2004-210215, there is another conventional vehicle having a transaxle housing incorporating left and right hydraulic motors for driving respective left and right wheels. The left and right wheels are supported by respective left and right wheel support units steerably supported on left and right ends of the transaxle housing, and drivingly connected to the respective hydraulic motors. The left and right hydraulic motors are fluidly connected in parallel to a common hydraulic pump so as to differentially drive the left and right wheels. The left and right hydraulic motors may be variable in displacement. In this case, means for controlling the displacements of the hydraulic motors, e.g., movable swash plates, are operated according to steering.

The transaxle housing incorporating the left and right hydraulic motors is laterally extended in the vehicle between the left and right wheel support units so as to restrict a space for other parts or assemblies in the vehicle. Further, the large transaxle including the transaxle housing and the left and right wheel support units is not handy, and is disadvantageous in ensuring a free space in a small size vehicle.

SUMMARY OF THE INVENTION

A first object of the present invention is to provide a compact and convenient hydraulic transaxle incorporating a hydraulic motor for driving a steerable wheel.

To achieve the object, according to a first aspect of the present invention, a steerable hydraulic transaxle comprises: a kingpin relatively rotatably supported by a vehicle chassis; a housing fixed to the kingpin; a single axle disposed in the housing; a single wheel fixed onto the single axle out of the housing; and a hydraulic motor disposed in the housing so as to drive the single axle. As a result, the housing supporting the single wheel is supported by the vehicle chassis so as to be rotatable around the center axis of the kingpin. Such a compact transaxle is advantageous in ensure a free space in a small size vehicle.

Preferably, the single axle is coaxially disposed in the hydraulic motor, thereby facilitating minimization of the steerable hydraulic transaxle.

Preferably, the steerable hydraulic transaxle further comprises motor control means for changing a displacement of the hydraulic motor in association with the rotation of the kingpin and the housing relative to the vehicle chassis. If a turning radius of front wheels is different from a turning radius of rear wheels during turning of a vehicle, the motor control means of the transaxle for either the front or rear wheel can change the displacement of the hydraulic motor so as to accelerate or decelerate the corresponding wheel, thereby preventing drag of wheels during turning of the vehicle. Even if the turning radius of front wheels is equal to that of rear wheels, the motor control means may be used for decelerating the vehicle during its turning.

Further preferably, the steerable hydraulic transaxle having the motor control means further comprises a kingpin casing fixed to the vehicle chassis. The kingpin relatively rotatably penetrates the kingpin casing. The motor control means changes the displacement of the hydraulic motor according to the rotation of the kingpin relative to the kingpin casing. Further preferably, the motor control means includes a cam formed on the kingpin casing. Therefore, the motor control means can be compactly and suitably provided to the steerable hydraulic transaxle.

Preferably, the kingpin is penetrated so as to pass fluid supplied to the hydraulic motor in the housing. The kingpin may be a solid shaft bored by a fluid hole, or a hollow shaft through which fluid pipes may be passed. Therefore, fluid supplied to the hydraulic motor is protected by the kingpin without hindering steering of the wheel.

According to a second aspect of the invention, a steerable hydraulic transaxle comprises: a motor housing fixed to a vehicle chassis, wherein the motor housing is partly formed as a kingpin; a hydraulic motor disposed in the motor housing; an axle housing supported by the kingpin to be rotatable relative to the motor housing; a single axle disposed in the axle housing and drivingly connected to the hydraulic motor; and a single wheel fixed onto the single axle out of the axle housing. Therefore, the axle can be spaced from the hydraulic motor so as to increase the layout variation of the transaxle, e.g., to increase the height difference between the hydraulic motor and the axle so as to ensure a large ground clearance of a vehicle.

Preferably, the steerable hydraulic transaxle further comprises: an output shaft of the hydraulic motor disposed on the center axis of the kingpin; and a gear train disposed in the axle housing so as to drivingly connect the output shaft of the hydraulic motor to the single axle. The output shaft disposed on the center axis of the kingpin can smoothly transmit the output force of the hydraulic motor to the axle through the gear train, and the output shaft is not interfered with by the rotation of the axle housing relative to the motor housing.

Preferably, the steerable hydraulic transaxle further comprises motor control means for changing a displacement of the hydraulic motor in association with the rotation of the axle housing relative to the motor housing. Therefore, the displacement of the hydraulic motor can be changed to prevent dragging of running wheels even if a turning radius of front wheels is different from that of rear wheels. The motor control means may be used for increasing the displacement of the hydraulic motor so as to safely decelerate a vehicle while the vehicle turns. Further, the motor control means may be used for reducing the displacement of the hydraulic motor so as to increase a high-speed traveling efficiency of a vehicle.

A second object of the invention is to provide a vehicle having hydraulic motors for respective front and rear wheels, wherein the vehicle can change its traveling speed level so as to ensure optimal traveling efficiency.

To achieve the second object, according to a third aspect of the invention, a vehicle comprises: a pair of steerable left and right first wheels disposed at one of front and rear portions of the vehicle; a first hydraulic motor for driving the pair of first wheels; a pair of left and right second wheels disposed at the other rear or front portion of the vehicle; a second hydraulic motor for driving the pair of second wheels; a common hydraulic pump fluidly connected to the first and second hydraulic motor; and a switching valve interposed between the common hydraulic pump and the first and second hydraulic motors. The switching valve can be switched between a parallel connection position and a tandem connection position. The switching valve disposed at the parallel connection position fluidly connects the first and second hydraulic motors in parallel to the hydraulic pump. The switching valve disposed at the tandem connection position fluidly connects the first and second hydraulic motors in tandem to the hydraulic pump. Due to the tandem connection of the first and second hydraulic motors to the hydraulic pump, the vehicle can efficiently travel at high speed in the four-wheel drive mode.

Preferably, the vehicle further comprises motor control means for changing a displacement of the first hydraulic motor according to a steering operation of the pair of first wheels. The motor control means may be used for safely decelerating the turning vehicle. Alternatively or additionally, the motor control means may be used for changing the speed of either the front wheels or the rear wheels so as to correspond to a difference of turning radius between the front wheels and the rear wheels during turning of the vehicle, thereby preventing dragging of wheels.

Preferably, the vehicle further comprises motor control means for changing a displacement of the second hydraulic motor. The switching valve can be further switched to a two-wheel driving mode position. The switching valve disposed at the two-wheel driving mode position fluidly connects not the first hydraulic motor but the second hydraulic motor to the hydraulic pump. The motor control means reduces the displacement of the second hydraulic motor when the switching valve is disposed at the two-wheel driving mode position. Therefore, the high-speed traveling efficiency of the vehicle set in the two-wheel driving mode is enhanced.

Preferably, a pair of the first hydraulic motors for driving the respective left and right first wheels are fluidly connected in parallel to the hydraulic pump whether the switching valve is disposed at the parallel connection position or at the tandem connection position. Therefore, the left and right first wheels can be differentially rotated so as to smoothly turn the vehicle.

Further preferably, the vehicle having the pair of first hydraulic motors further comprises a pair of first transaxles incorporating the respective first hydraulic motors and supporting the respective first wheels. The pair of first transaxles are steerably supported by the vehicle chassis so that the pair of first wheels supported by the respective first transaxles serve as steerable wheels. The pair of first transaxles can be compactly disposed on the vehicle so as to facilitate minimization of the vehicle, and they can ensure a large free space therebetween in the vehicle.

Alternatively, further preferably, the vehicle having the pair of first hydraulic motors further comprises motor control means for changing displacement of the first hydraulic motors according to a steering operation of the pair of first wheels. The above-mentioned effect of the motor control means can be obtained while the differential rotation of the left and right first wheels is ensured.

Preferably, the vehicle having the pair of first hydraulic motors is provided with a pair of the second hydraulic motors for driving the respective second wheels, which are preferably fluidly connected in parallel to the hydraulic pump whether the switching valve is disposed at the parallel connection position or at the tandem connection position. Therefore, the left and right second wheels can be differentially rotated so as to smoothly turn the vehicle.

Further preferably, the pair of second wheels driven by the respective second hydraulic motors are steerable. Therefore, the turning circle of the vehicle can be further reduced.

Further preferably, the vehicle having the steerable first and second wheels further comprises motor control means for changing displacement of the first and second hydraulic motors according to a steering operation of the first and second wheels. The motor control means may be used for safely decelerating the turning vehicle. Alternatively or additionally, the motor control means may be used for changing the speed of either the front wheels or the rear wheels so as to correspond to a difference of turning radius between the front wheels and the rear wheels during turning of the vehicle, thereby preventing dragging of wheels. Further, the motor control means may be used for increase the high-speed traveling efficiency of the vehicle. These effects of the motor control means can be obtained while the differential rotation of the left and right first wheels and the differential rotation of the left and right second wheels are ensured.

Preferably, the vehicle having the pair of second hydraulic motors further comprises a pair of second transaxles incorporating the respective second hydraulic motors and supporting the respective second wheels. The pair of second transaxles can be compactly disposed on the vehicle so as to facilitate minimization of the vehicle, and they can ensure a large free space therebetween in the vehicle.

Further preferably, the pair of second transaxles are steerably supported by the vehicle chassis so that the pair of second wheels supported by the respective second transaxles serve as steerable wheels. The vehicle can turn on a finely small circle by the steerable first and second wheels.

These, other and further objects, features and advantages will appear more fully from the following description with reference to accompanying drawings.

BRIEF DESCRIPTION OF THE DRAWINGS

FIG. 11 is a plan view of a clamping portion 71a of a motor control arm 71 to be fitted onto cam 26a.

DETAILED DESCRIPTION OF THE INVENTION

Figure 1:
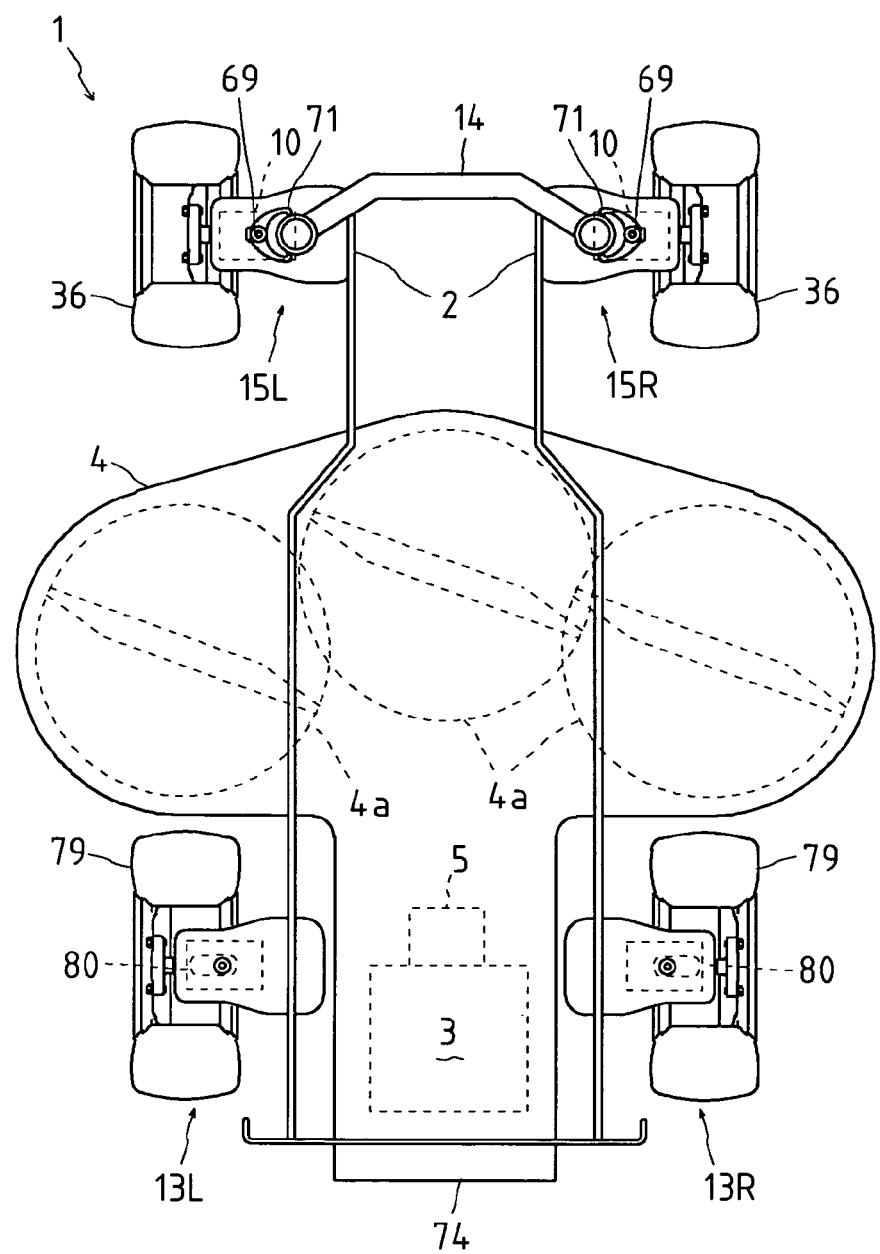
FIG. 1 is a schematic plan view of a four-wheel driving and two-wheel steering vehicle 1 having left and right steerable front transaxles 15 (15L and 15R) with respective front wheels 36 and left and right unsteerable rear transaxles 13 (13L and 13R) with respective rear wheels 79 when vehicle 1 is directed straight.

A four-wheel driving and two-wheel steering vehicle 1 shown in FIGS. 1 to 17 will be described. As shown in FIG. 1, vehicle 1 is provided with a chassis including right and left side frames 2 supporting right and left front transaxles 15L and 15R (generically named as "front transaxles 15") and right and left rear transaxles 13L and 13R (generically named as "rear transaxles 13"), respectively.

In the following description (e.g., about each of transaxles 15 and 13), terms "proximal" and "distal" are defined with respect to the center of vehicle 1 (and later-discussed various alternative vehicles 1).

Each of front transaxles 15 supports a front wheel 36, and each of rear transaxles 13 supports a rear wheel 79. Front transaxles 15 are steerably supported by right and left side frames 2 of the vehicle chassis so that front wheels 36 serve as steerable wheels. A front cross member 14 is interposed between right and left front transaxles 15 across side frames 2 so that both front transaxles 15 are substantially integrally steerable. Rear transaxles 13 are fixedly (unsteerably) supported by right and left side plates 2 so that rear wheels 79 serve as unsteerable wheels.

Each of rear transaxles 13 incorporates a hydraulic motor 80 for driving each rear wheel 79, and each of front transaxles 15 incorporates a hydraulic motor 10 for driving each front wheel 36.

Figure 14:
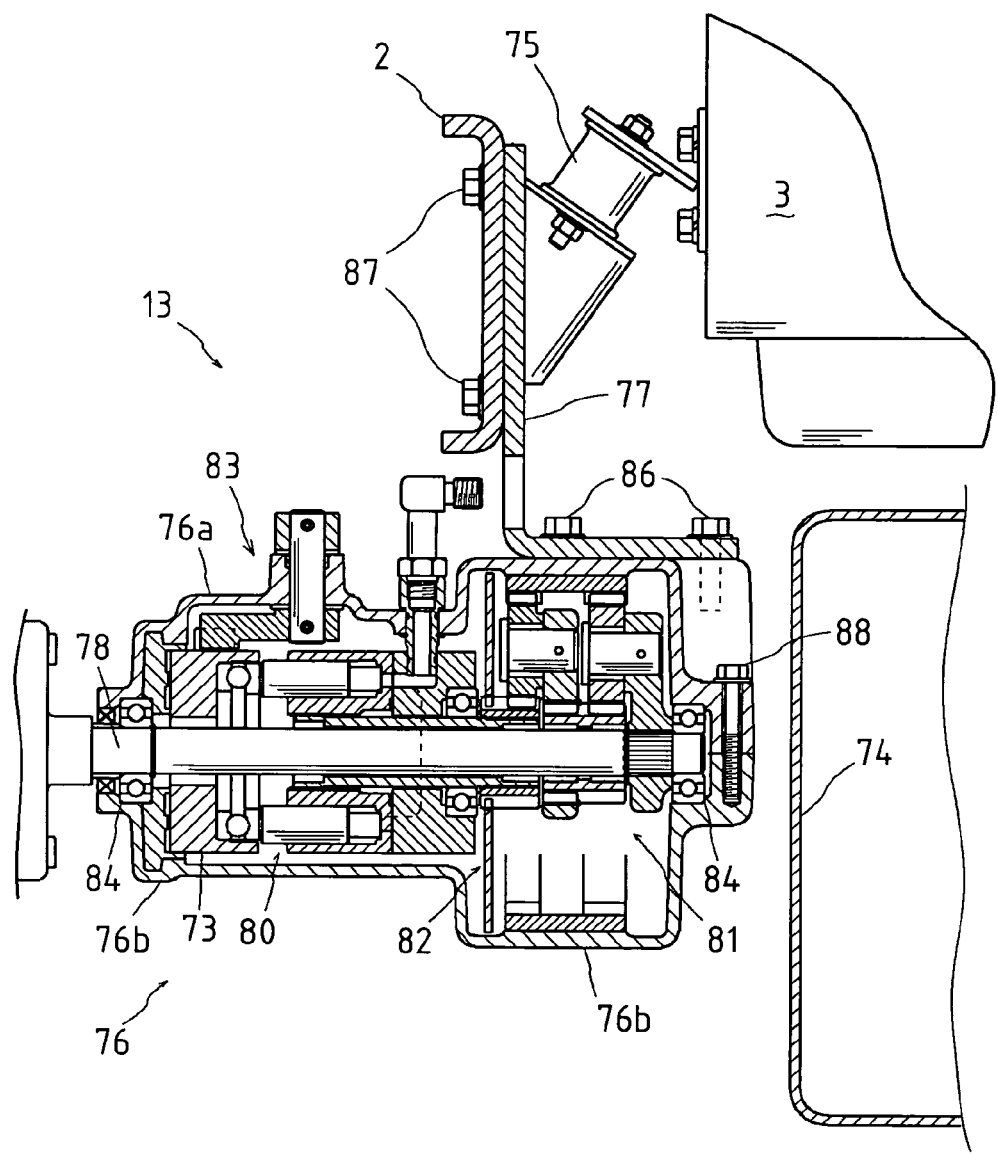
FIG. 14 is a sectional rear view of rear transaxle 13 (left rear transaxle 13L), showing a transaxle housing 76 incorporating a hydraulic motor 80 for driving rear wheel 79.

An engine 3 is disposed between right and left rear wheels 79 and mounted onto right and left side frames 2 through vibration-isolating rubbers 75, as shown in FIG. 14. A mower 4 is suspended down from the chassis and incorporates rotary blades 4a disposed between front transaxles 15 and rear transaxles 13, and drivingly connected to engine 3 so as to drive rotary blades 4a. Mower 4 has a rear-discharging chute 74 extended rearward over engine 3 and a hydraulic pump 5.

Figure 15:
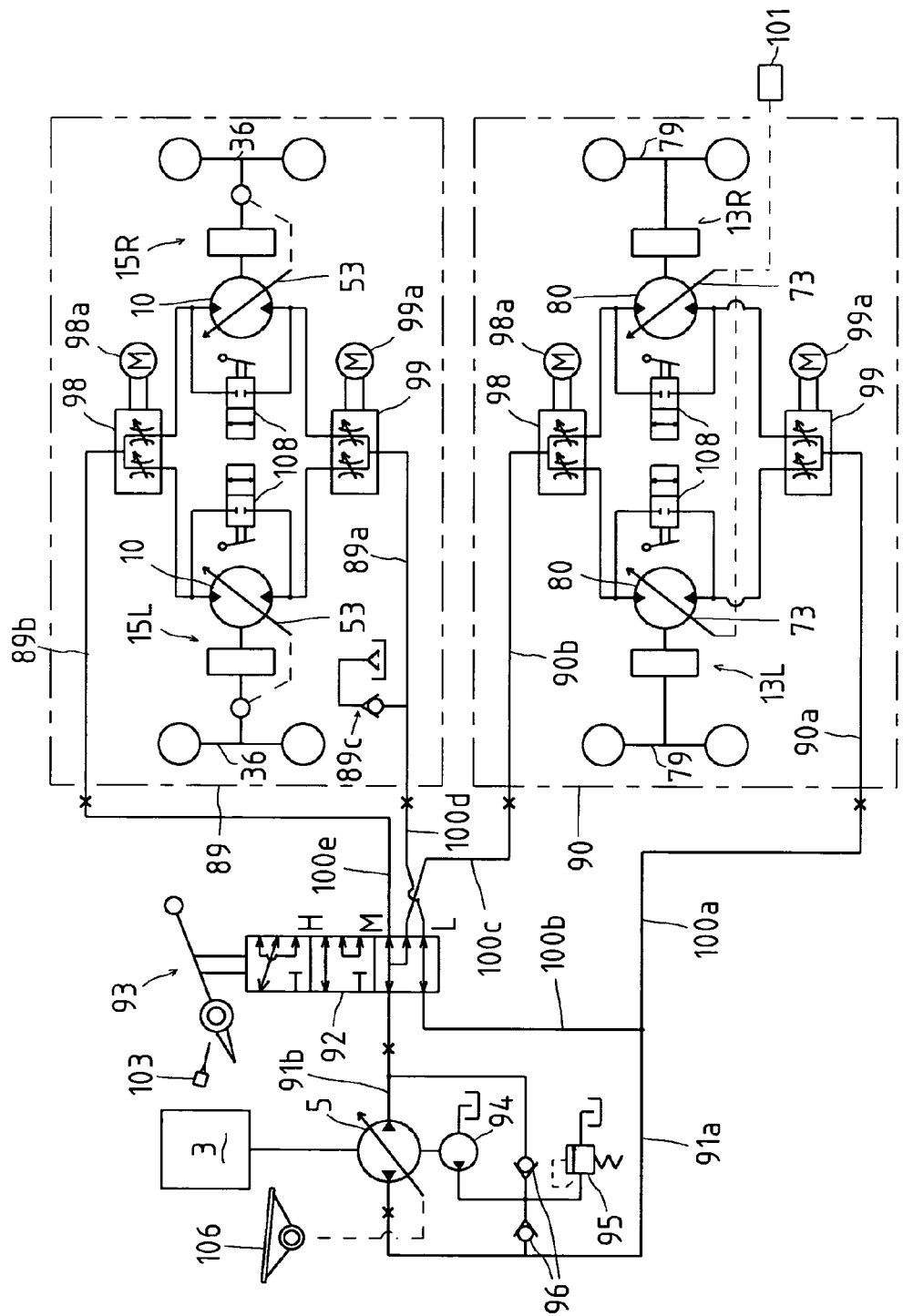
FIG. 15 is a diagram of a hydraulic circuit system of vehicle 1 shown in FIG. 1, comprising a first hydraulic circuit 89 for the pair of hydraulic motors 10, a second hydraulic circuit 90 for the pair of hydraulic motors 80, and an auxiliary speed changing system including an auxiliary speed changing valve 92.

Common variable displacement hydraulic pump 5 for driving all hydraulic motors 80 and 10 is disposed in vehicle 1 suitably so as to be driven by engine 3 (via a belt and pulleys, for example). Hydraulic pump 5 has displacement control means, such as a movable swash plate, interlocking with a main speed changing pedal 106, as shown in FIG. 15. Alternatively, the movable swash plate may be electrically controlled by a controller 107 based on detection of the depression of pedal 106, as shown in FIG. 17.

As shown in FIG. 15, a first hydraulic circuit 89 including hydraulic motors 10 of right and left front transaxles 15 is constructed such as to fluidly connect motors 10 in parallel to hydraulic pump 5 via an auxiliary speed changing valve 92, and a second hydraulic circuit 90 including hydraulic motors 80 of right and left rear transaxles 13 is constructed such as to fluidly connect motors 80 to hydraulic pump 5 via auxiliary speed changing valve 92. Therefore, hydraulic motors 10 differentially drive right and left front wheels 36, and hydraulic motors 80 differentially drive right and left rear wheels 79.

Figure 2:
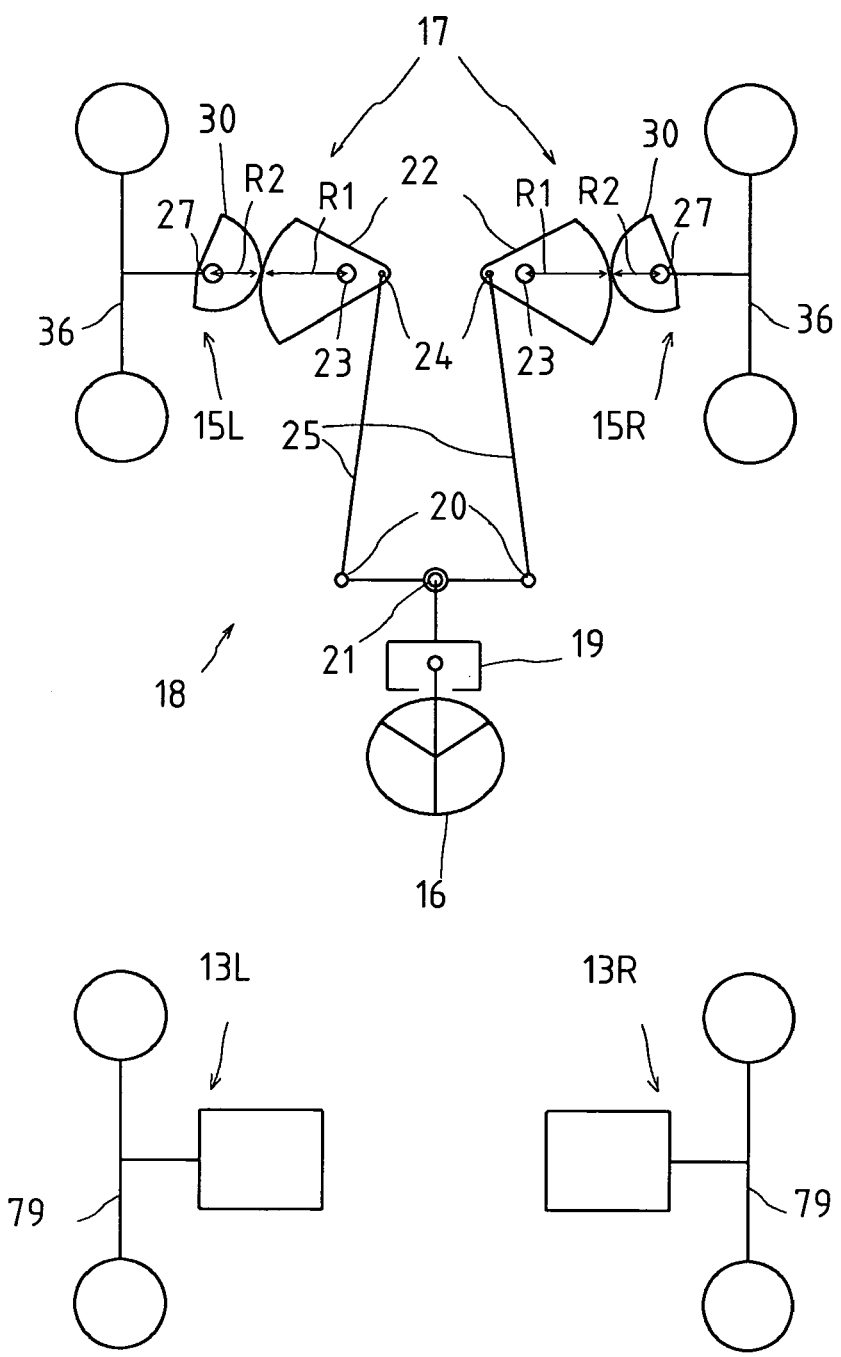
FIG. 2 is a diagram of a steering linkage 18 of vehicle 1 of FIG. 1 when vehicle 1 is directed straight.

A steering linkage 18 for front wheels 36 will be described. As shown in FIG. 2, vehicle 1 includes a steering wheel 16 whose rotational force is distributed between left and right steering gear trains 17 so as to steer front wheels 36. A stem of steering wheel 16 is inserted into a steering gearbox 19. A connection rod 20 interposed between input portions of right and left steering gear trains 17 is drivingly connected to steering gearbox 19 at a distribution center pivot 21 disposed on the middle point of connection rod 20. Alternatively, a power steering cylinder and a hydraulic control device for it may be interposed between steering wheel 16 and right and left steering gear trains 17.

Figure 17:
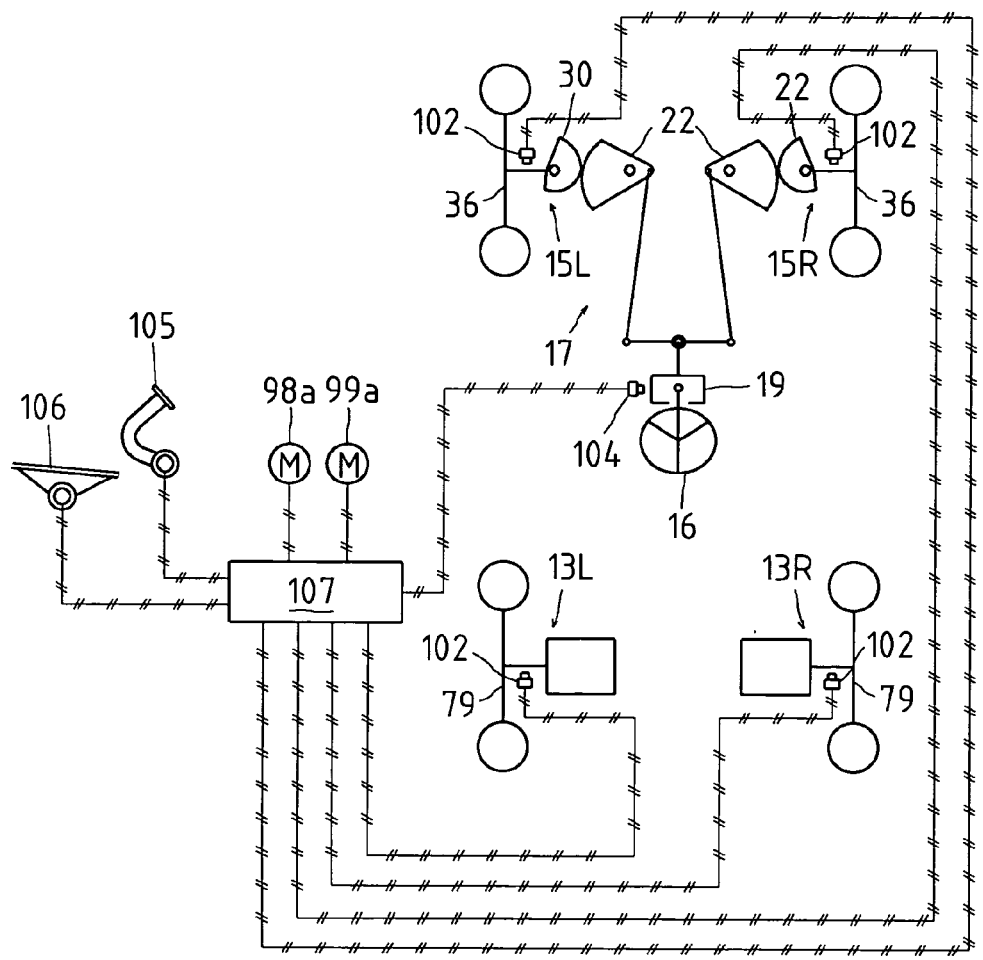
FIG. 17 is a diagram of an electric control system of vehicle 1 shown in FIG. 1 for controlling step motors 98a and 99a of flow control valves 98 and 99 shown in FIG. 15.

Referring to FIG. 17, a steering angle sensor 104 is disposed adjacent to steering wheel 16 so as to detect the rotational angle and direction of steering wheel 16. Steering angle sensor 104 transmits a detection signal to controller 107.

Figure 3:
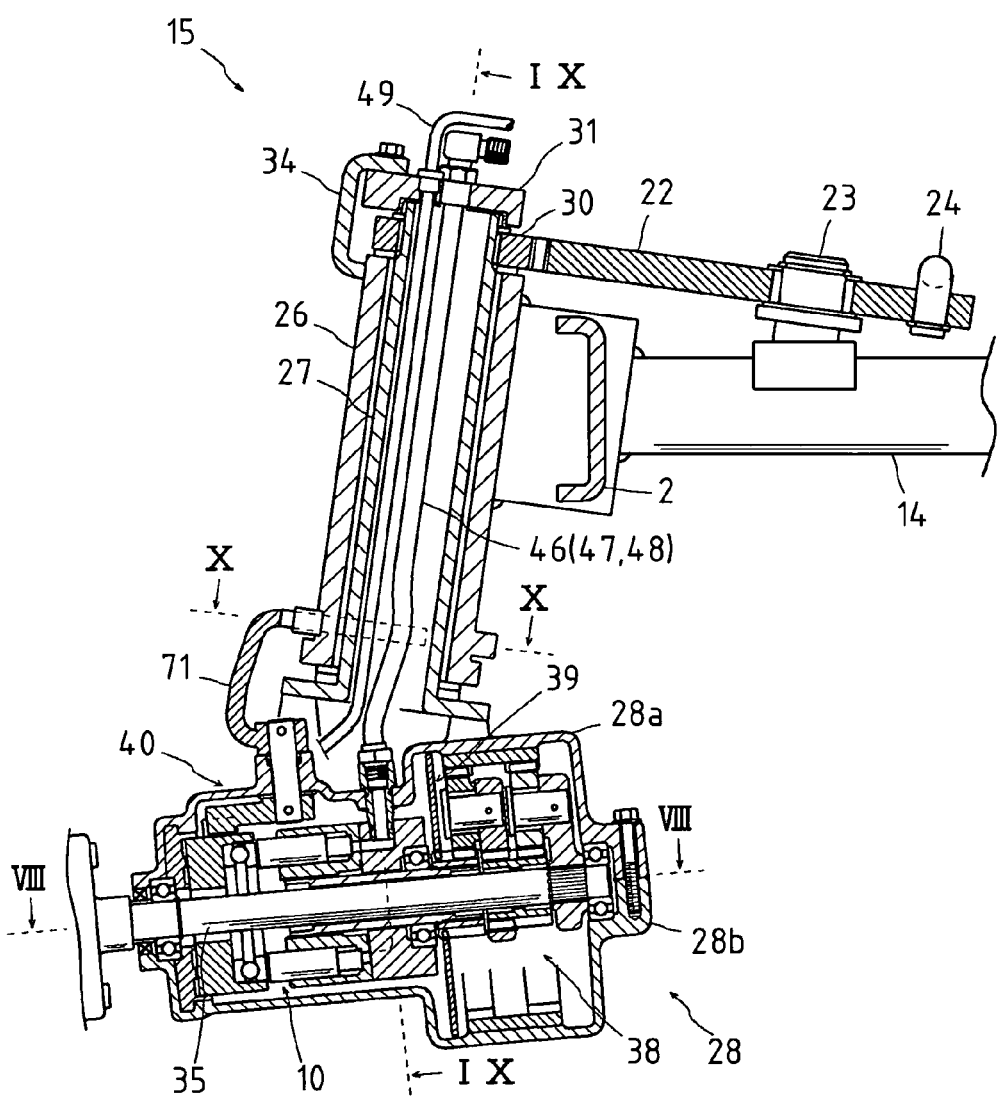
FIG. 3 is a sectional rear view of front transaxle 15 (left front transaxle 15L).

As shown in FIGS. 2 and 3, each steering gear train 17 includes mutually meshing sector gears 22 and 30. Sector gear 22 has a toothed distal edge meshing with sector gear 30, and has a joint pin 24 at its proximal end. A link rod 25 is pivotally extended from joint pin 24 to each end of connection rod 20. A pivot shaft 23 of sector gear 22 is disposed between the toothed distal edge and proximal joint pin 24.

Figure 6:
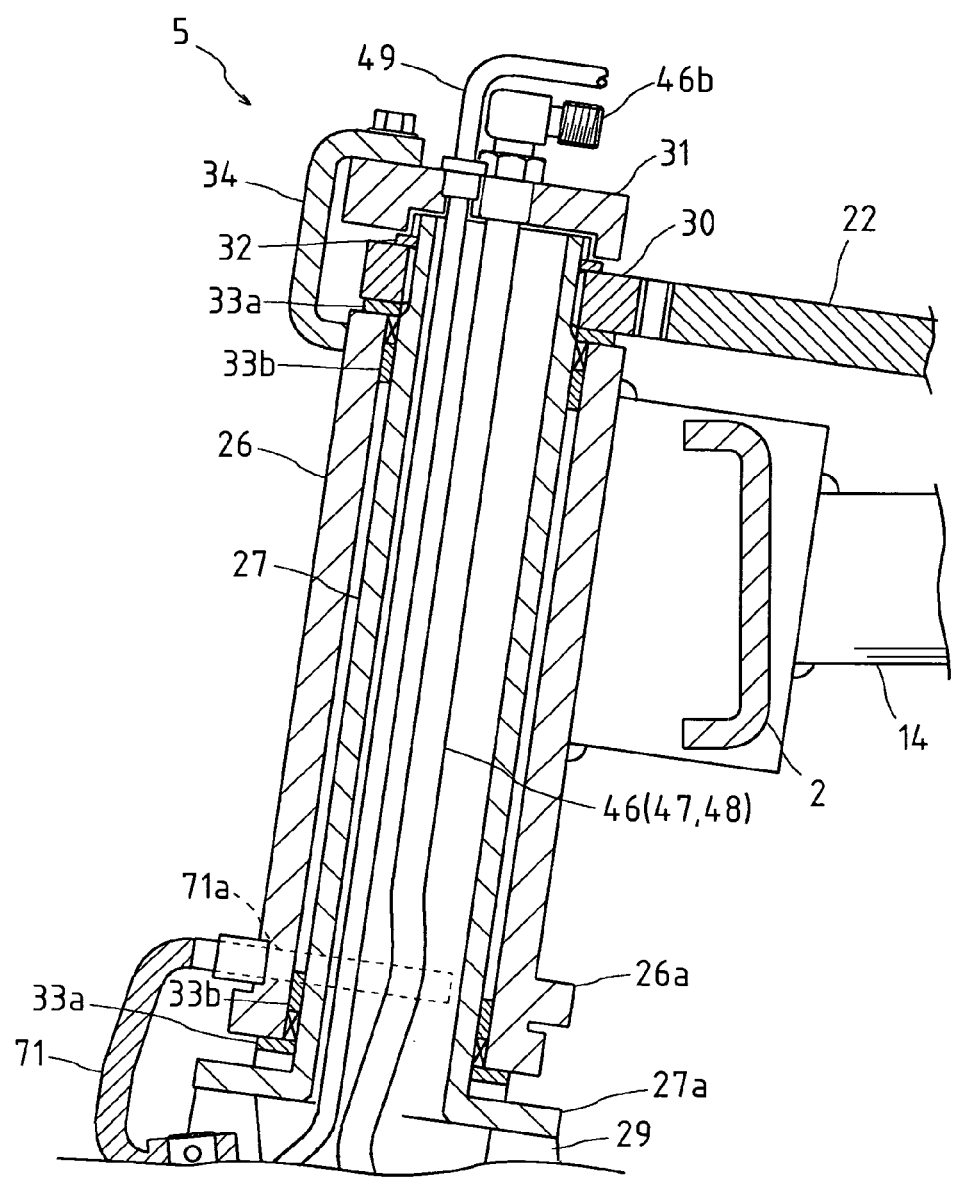
FIG. 6 is a sectional rear view of an upper portion of front transaxle 15 shown in FIG. 3, showing a kingpin support casing 26 and kingpin sleeve 27 therethrough.
Figure 9:
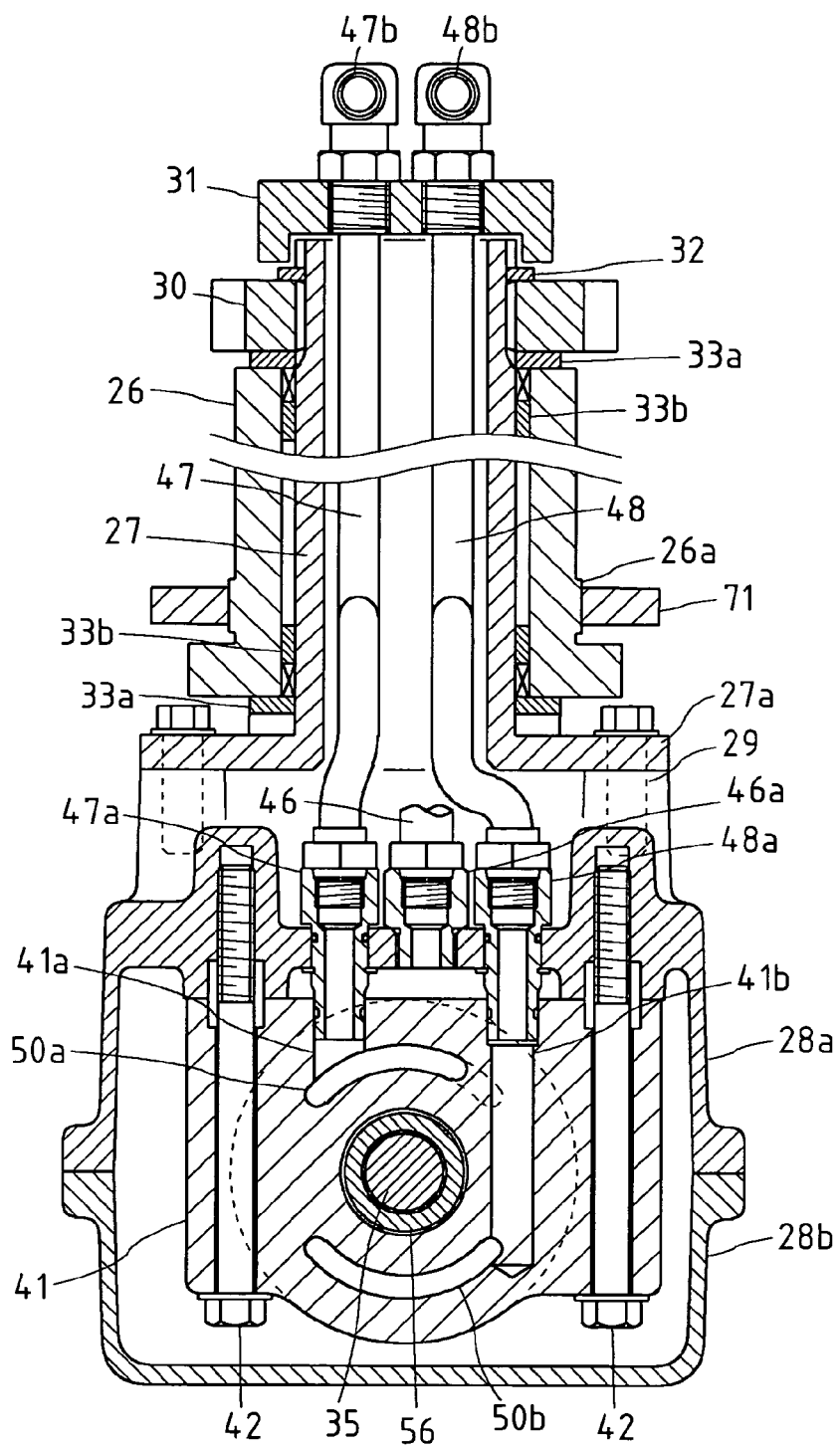
FIG. 9 is a cross sectional view of transaxle 15 taken along a IX-IX line of FIG. 3, showing the upper portion thereof including kingpin support casing 26 and kingpin sleeve 27, and the lower portion thereof including steerable transaxle housing 28 and a center section 41 of hydraulic motor 10.

A kingpin support casing 26 is fixed onto each of right and left ends of cross member 14. A kingpin sleeve 27 having top and bottom open ends is coaxially disposed in kingpin support casing 26 so as to be substantially horizontally rotatable around its substantially vertical center axis. A top portion of kingpin sleeve 27 projects upward from kingpin support casing 26 so as to be fixedly provided thereon with sector gear 30. Therefore, kingpin sleeve 27 serves as a pivot shaft of sector gear 30. A bottom portion of kingpin sleeve 27 projects downward from kingpin support casing 26 so as to be fixed to a steerable transaxle housing 28 of transaxle 15. Therefore, transaxle housing 28 of transaxle 15 is rotatable integrally with sector gear 30 and kingpin sleeve 27 relative to the chassis including side frames 2 and cross member 14. More specifically, as shown in FIGS. 6 and 9, transaxle housing 28 is formed on the top portion thereof with a mount boss 29, onto which a bottom flange 27a of kingpin sleeve 27 is fastened so as to open the inner space of kingpin sleeve 27 into transaxle housing 28.

As shown in FIG. 2, sector gears 22 and 30 of right and left steering gear trains 17 are disposed laterally symmetrically when vehicle 1 is directed straight, i.e., when steering wheel 16 is disposed at its neutral (or straight traveling) position. When steering wheel 16 is rotated for turning of vehicle 1, connection rod 20 is tilted so as to rearwardly pull link rod 25 and the proximal end of sector gear 22 on the turning inside of vehicle 1, and to forwardly push link rod 25 and the proximal end of sector gear 22 on the turning outside of vehicle 1. Therefore, mutually meshing toothed edges of sector gears 22 and 30 on the turning inside of vehicle 1 are rotated forward, and those on the turning outside of vehicle 1 are rotated rearward.

Figure 4:
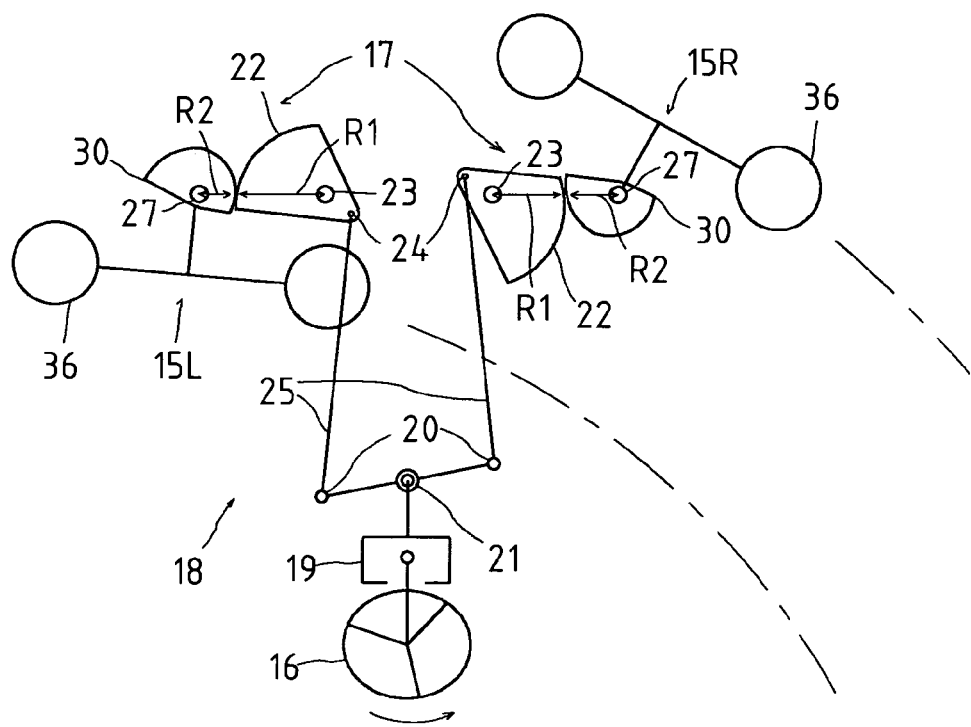
FIG. 4 is a diagram of steering linkage 18 of vehicle 1 of FIG. 1 when vehicle 1 turns left.
Figure 4:
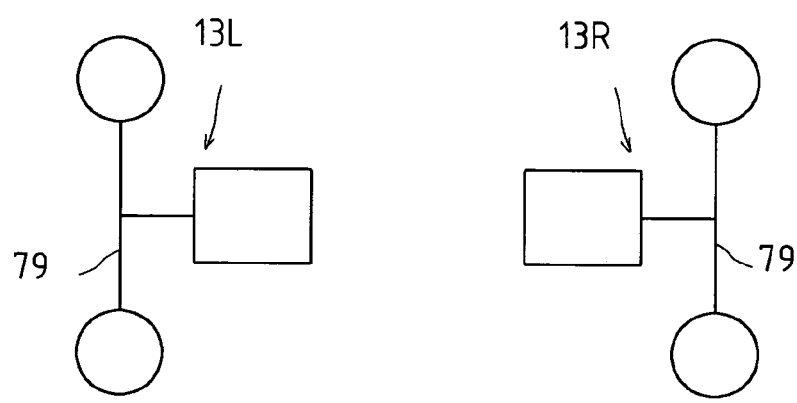
Figure 5:
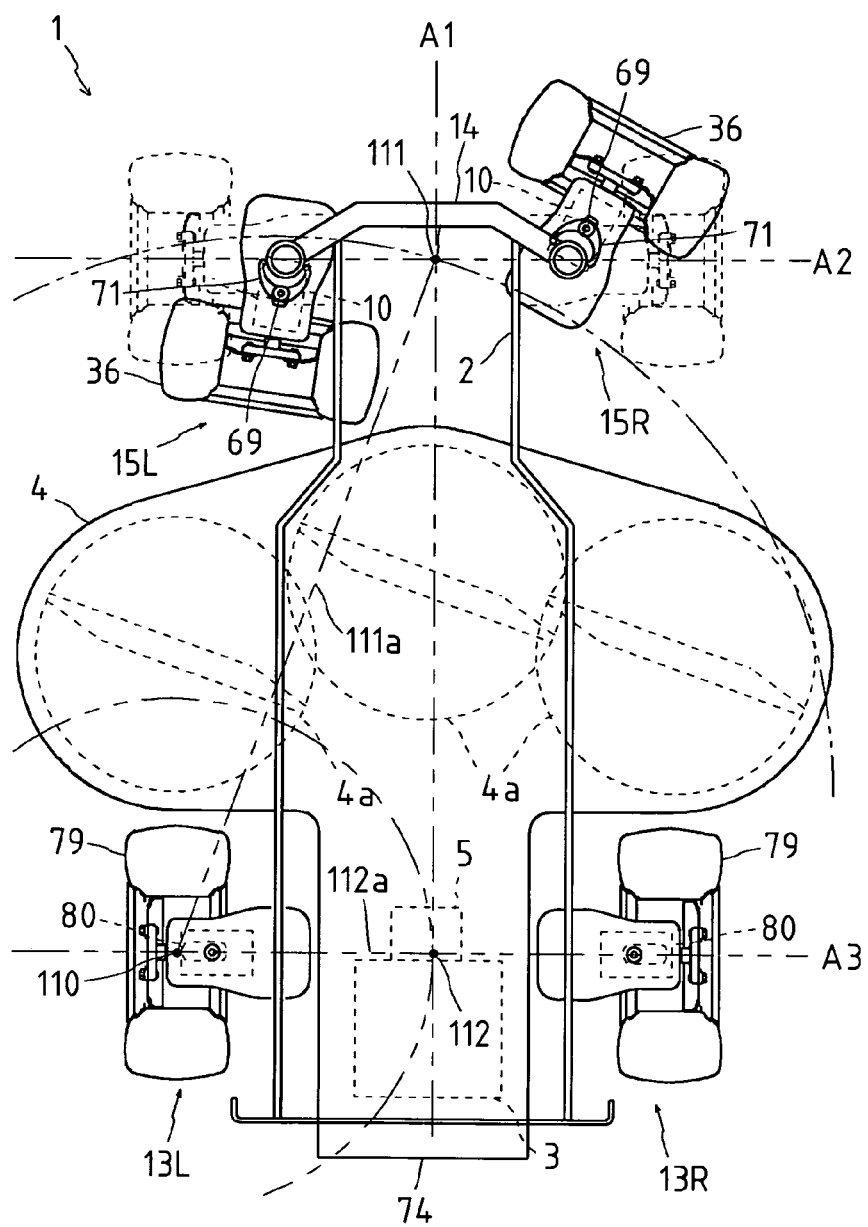
FIG. 5 is a schematic plan view of vehicle 1 shown in FIG. 1 when vehicle 1 turns left while left rear wheel 79 is stationary.

A gear ratio between mutually meshing sector gears 22 and 30 is defined as a ratio of a radius R2 of sector gear 30 to a radius R1 of sector gear 22 between their center pivotal axes. In this regard, radius R1 of sector gear 22 is defined as a distance between the center axis of pivot shaft 23 and its toothed edge, and radius R2 of sector gear 30 is defined as a distance between the center axis of kingpin sleeve 27 and its toothed edge. As mutually meshing toothed edges of sector gears 22 and 30 are rotated forward, the ratio of radius R2 to radius R1 is reduced so as to increase the increase rate of turning angle of corresponding wheel 36. As mutually meshing toothed edges of sector gears 22 and 30 are rotated rearward, the ratio of radius R2 to radius R1 is increased so as to reduce the increase rate of turning angle of corresponding wheel 36. Therefore, the turning angle of wheel 36 on the turning inside of vehicle 1 (hereinafter, "inside wheel 36") becomes larger than that of wheel 36 on the turning outside of vehicle 1 (hereinafter, "outside wheel 36"), as shown in FIGS. 4 and 5. As the rotational angle of steering wheel 16 from the neutral position is increased, the difference of turning angle between inside wheel 36 and outside wheel 36 becomes larger.

FIG. 5 is a plan view of vehicle 1 when steering wheel 16 is fully rotated for left turning of vehicle 1. A longitudinal straight line A1 is a center (laterally middle) line of vehicle 1. A lateral straight line A2 passes the center axes of right and left kingpin sleeves 27. A lateral straight line A3 is a coaxial line of right and left rear wheels 79.

Vehicle 1 is turned right and left by differentially driving unsteerable rear wheels 79 with hydraulic motors 80 with the assistance of the right and left turning of steerable front wheels 36. Therefore, the further steering wheel 16 is rotated from the straight traveling position, the more proximally a turning center 110 of vehicle 1 moves on line A3. When steering wheel 16 is fully rotated leftward, left rear wheel 79 (left hydraulic motor 80) stops so that turning center 110 of vehicle 1 is disposed in left rear wheel 79, as shown in FIG. 5. The turning circle of the center (laterally middle) position of vehicle 1 between front wheels 36 has a radius 111a as a distance between turning center 110 and a cross point 111 of lines A1 and A2 (which is the middle point between front wheels 36). The turning circle of the center (laterally middle) position of vehicle 1 between rear wheels 79 has a radius 112a as a distance between turning center 110 and a cross point 112 of lines A1 and A3 (which is the middle point between rear wheels 79).

Since radius 111a is larger than radius 112a, front wheels 36 are required to drive faster than rear wheels 79. Additionally, the further steering wheel 16 is rotated from the straight traveling position, the larger the ratio of radius 111a to radius 112a becomes. Therefore, hydraulic motors 10 are automatically controlled to reduce their displacements as steering wheel 16 is rotated from the straight traveling position.

Right and left hydraulic motors 10 can reduce their displacements at the same rate during the turning of steering wheel 16 because fluid from hydraulic pump 5 is distributed between motors 10 fluidly connected in parallel to pump 5 so as to allow the differential rotation of inside and outside wheels 36. Alternatively, the displacement reduction rate of motor 10 for outside wheel 36 may be larger than that of motor 10 for inside wheel 36 so as to forcibly drive outside wheel 36 faster than inside wheel 36.

A structure for steerably supporting transaxle 15 will be described with reference to FIGS. 3 and 6. A joint member 34 is extended upward from the top of kingpin support casing 26 across sector gear 30. A cap 31 is fastened to joint member 34 by a bolt so as to cover the open top end of kingpin sleeve 27 above sector gear 30, thereby being fixed to kingpin support casing 26.

Upper and lower thrust bearings 33a are disposed between the bottom surface of sector gear 30 and the top surface of kingpin support casing 26, and between the bottom surface of kingpin support casing 26 and the top surface of mount boss 27a of kingpin sleeve 27, respectively. Upper and lower bearings (bushes) 33b are interposed between kingpin support casing 26 and kingpin sleeve 27 in kingpin support casing 26 adjacent to the top and bottom open ends of kingpin support casing 26, respectively. Oil seals are interposed between upper bearings 33a and 33b, and between lower bearings 33a and 33b, respectively. A retaining ring 32 for retaining sector gear 30 is fitted on kingpin sleeve 27 between sector gear 30 and cap 31. Due to this construction, kingpin sleeve 27 and sector gear 30 are stably supported to be rotatable relative to kingpin support casing 26 and cap 31.

To remove sector gear 30 from kingpin sleeve 27, the bolt is loosened and cap 31 is removed from joint member 34, and retaining ring 32 is removed from kingpin sleeve 27. By the removal of sector gear 30 from kingpin sleeve 27, kingpin sleeve 27 can be easily removed downward from kingpin support casing 26, thereby facilitating maintenance of kingpin sleeve 27 and transaxle housing 28 and their interior parts.

Referring to the interior of kingpin sleeve 27, as shown in FIGS. 6, 7, 9 and 10, pipe couplings 46b, 47b and 48b are disposed just above cap 31 and screwed into cap 31, and drain pipe 46 and hydraulic fluid pipes 47 and 48 are substantially axially extended in kingpin sleeve 27 from respective pipe couplings 46b, 47b and 48b. A brake wire 49 is substantially axially extended in kingpin support casing 26 while an outer wire of brake wire 49 is retained on the top surface of cap 31. Brake wire 49 is connected to an unshown braking manipulator such as a brake pedal. Pipes 46, 47 and 48 are soft and slightly slackened so that they can be suitably twisted during the rotation of kingpin sleeve 27 relative to kingpin support casing 26. Kingpin sleeve 27 and kingpin support casing 26 protect such soft pipes 46, 47 and 48 and brake wire 49 therein, and facilitate the compact arrangement of pipes 46, 47 and 48 and brake wire 49.

Figure 7:
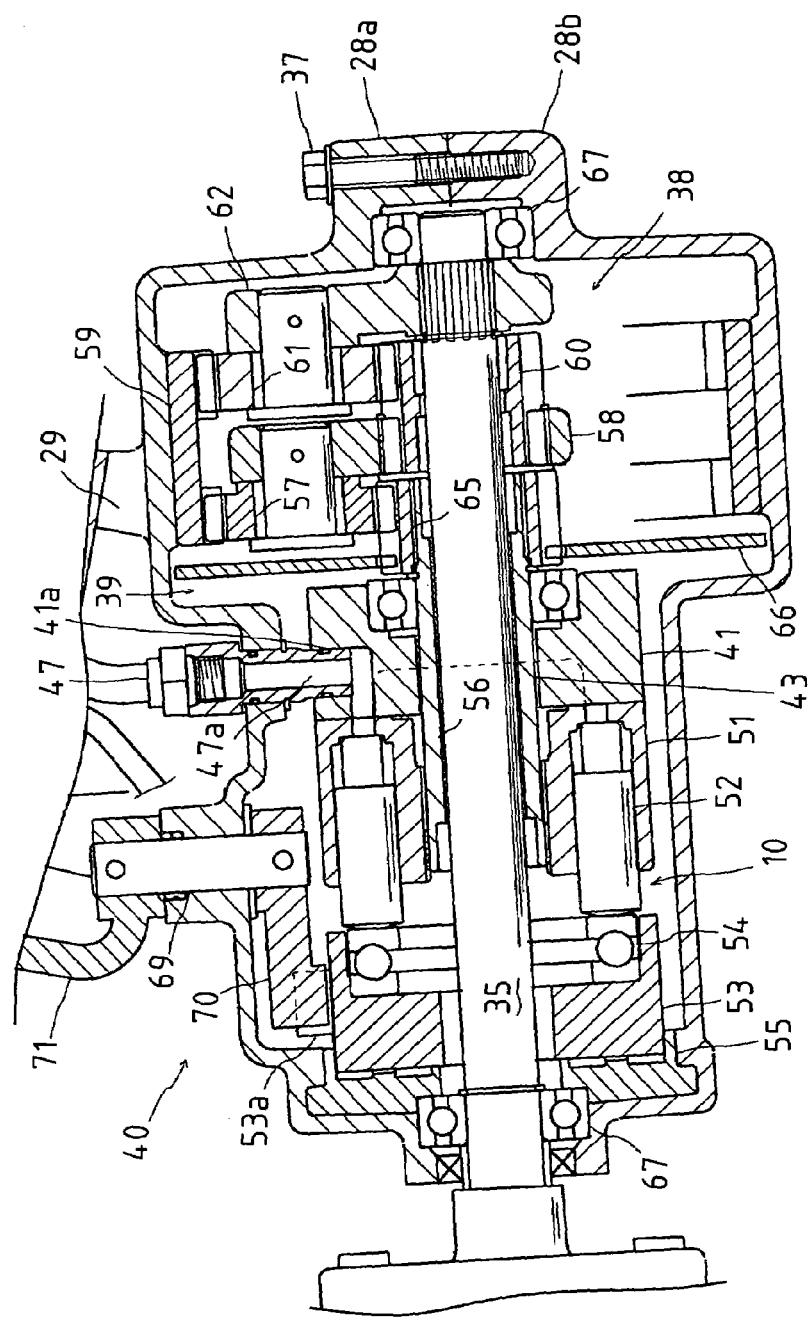
FIG. 7 is a sectional rear view of a lower portion of front transaxle 15 shown in FIG. 3, showing a steerable transaxle housing 28 incorporating a hydraulic motor 10, a deceleration gear train 38 and an axle 35.

A structure of transaxle 15 will be described. As shown in FIGS. 3 and 7, transaxle housing 28 of transaxle 15 comprises an upper housing half 28a and a lower housing half 28b separably joined to each other by bolts 37 through a horizontal joint surface, on which a center axis of a horizontal axle 35 serving as the center axial shaft of wheel 36 is disposed. Alternatively, transaxle housing 28 may be constituted by right and left housing halves joined to each other through a vertical joint surface. Axle 35 is journalled at both ends by upper and lower housing halves 28a and 28b through bearings 67. An end of axle 35 projects outward from transaxle housing 28 so as to be formed into a hub on which wheel 36 is mounted.

In transaxle housing 28 are disposed variable displacement hydraulic motor 10, a deceleration gear train 38, a brake assembly 39, and a motor control linkage 40 connected to a movable swash plate 53 of hydraulic motor 10 (for controlling the displacement of motor 10).

Referring to FIG. 17, rotary speed sensors 102 are disposed adjacent right and left axles 35 so as to detect the rotary speeds of axles 35, respectively. Rotary speed sensors 102 transmit detection signals to controller 107.

Hydraulic motor 10 will be described with reference to FIGS. 3, 7 to 9. In transaxle housing 28, a center section 41 is fastened to upper housing half 28a by upwardly screwed bolts 42. Center section 41 has a horizontal penetrating hole 43 through which axle 35 is relatively rotatably passed at an intermediate portion thereof. As shown in FIG. 9, pipe couplings 46a, 47a and 48a of respective pipes 46, 47 and 48 are screwed into the top wall of upper housing half 28a above center section 41, and vertical ducts 41a and 41b formed in center section 41 are open upward to be connected to respective pipe couplings 47a and 48a, thereby preventing fluid from leaking outward from transaxle housing 28 through pipes 46, 47 and 48, and reducing unexpected influence of hydraulic pressure onto center section 41.

In center section 41 are formed upper and lower kidney ports 50a and 50b in connection with respective vertical ducts 41a and 41b. Kidney ports 50a and 50b are open at a vertical end surface of center section 41, onto which a cylinder block 51 is slidably rotatably fitted. A motor sleeve 56 serving as a motor shaft of hydraulic motor 10 is disposed at the axial center portion of cylinder block 51, and not-relatively rotatably fitted to cylinder block 51. Motor sleeve 56 is coaxially and relatively rotatably disposed on axle 35 through bearings (bushes), whereby a distal portion of transaxle housing 28 incorporating hydraulic motor 10 can be so compact as to be disposed in a rim of wheel 36. Motor sleeve 56 relatively rotatably penetrates center section 41 through penetrating hole 43 and projects outward from center section 41 opposite to cylinder block 51.

Pistons 52 are axially and reciprocally inserted into cylinder block 51 around motor sleeve 56, thereby constituting hydraulic motor 10 as an axial piston type. Alternatively, hydraulic motor 10 may be made as a radial piston type. Heads of pistons 52 project outward from cylinder block 51 opposite to center section 41 so as to abut against a thrust bearing 54 of movable swash plate 53. An arcuately recessed guide seat 55 is fixedly fitted to transaxle housing 28 so as to slidably fit cradle type swash plate 53. Alternatively, a trunnion type movable swash plate may be used instead of guide seat 55.

In this way, each of hydraulic motors 10 is individually provided with kidney ports 50a and 50b, ducts 41a and 41b, pipe couplings 47a and 48a and pipes 47 and 48 so as to be fluidly connected to hydraulic pump 5. Soft pipes 47 and 48 replace a propeller shaft and other mechanical transmission means which reduce a space for disposing mower 4 and rear-discharging duct 74.

Figure 8:
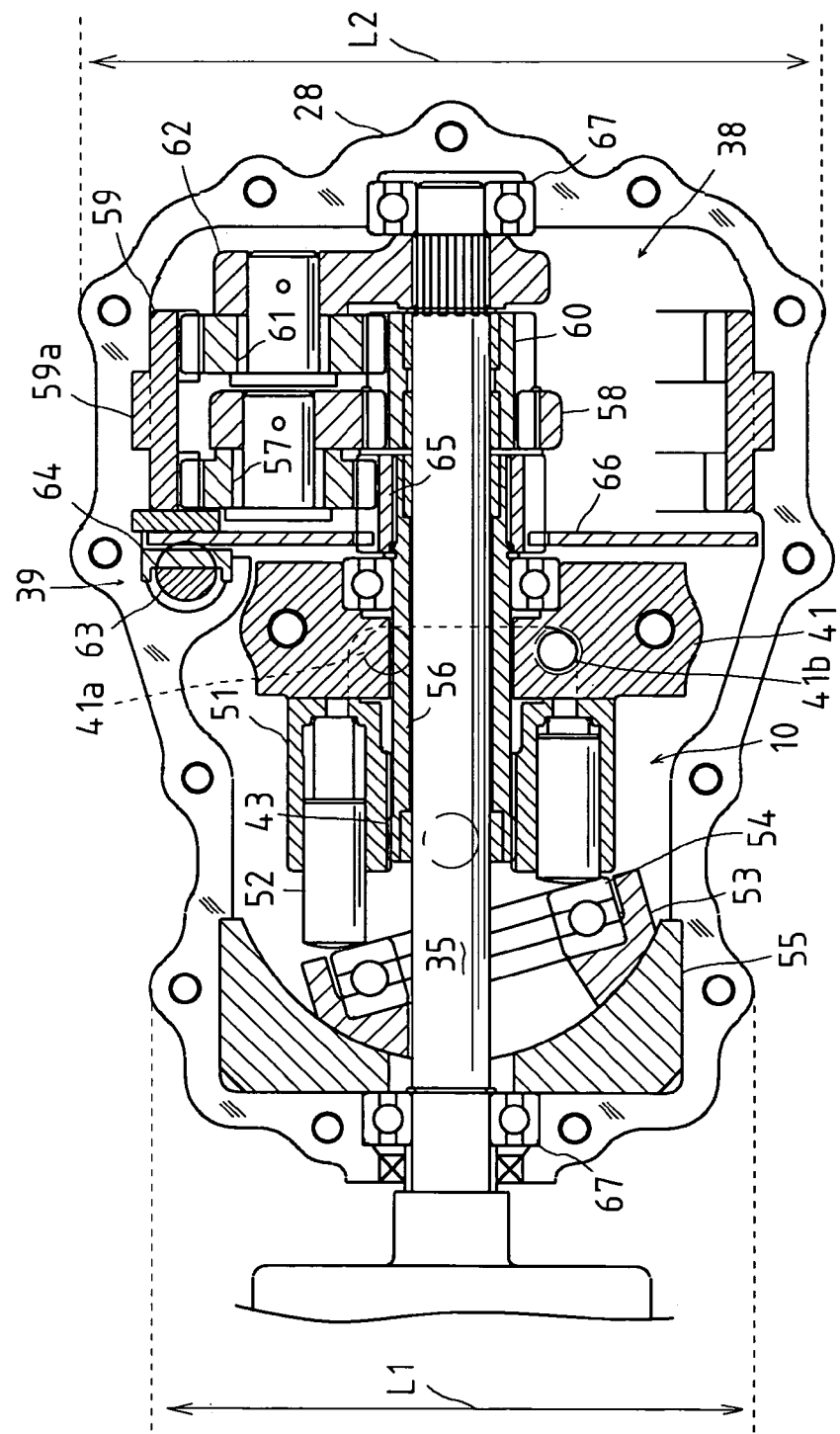
FIG. 8 is a cross sectional view of transaxle 15 taken along a VIII-VIII line of FIG. 3, showing transaxle housing 28 incorporating hydraulic motor 10 and axle 35.

As shown in FIGS. 3, 7 and 8, deceleration gear train 38 is disposed in a proximal portion of transaxle housing 28. Deceleration gear train 38 includes two planetary gear assemblies disposed in parallel and mutually drivingly connected in tandem. One planetary gear assembly includes a first sun gear 65 and first planetary gears 57, and the other includes a second sun gear 60 and second planetary gears 61. First sun gear 65 is fixed on the end portion of motor sleeve 56 projecting outward from center section 41 opposite to cylinder block 51. First planetary gears 57 are disposed around first sun gear 65 and mesh with it. A ring gear 59 is formed on its outer peripheral surface with keys 59a fitted into walls of housing halves 28a and 28b so that the outer peripheral surface of ring gear 59 is not-relatively rotatably fitted to the surrounding inner surface of transaxle housing 28. Ring gear 59 serves as an internal gear meshing with first planetary gears 57 and second planetary gears 61 therein.

First planetary gears 57 are pivoted on a first carrier 58, and second planetary gears 61 on a second carrier 62. Second carrier 62 is spline-fitted on an end portion of axle 35 adjacent to bearing 67. Second sun gear 60 is fixed on axle 35 between second carrier 62 and the end of motor sleeve 56 projecting from center section 41. Second sun gear 60 meshes with an internal gear formed in first carrier 58, and with second planetary gears 61 disposed therearound.

In this way, deceleration gear train 38 is so constructed as to transmit the rotary force of motor sleeve 56 to axle 35 through first sun gear 65, first planetary gears 57, second sun gear 60, second planetary gears 61 and second carrier 62.

The proximal portion of transaxle housing 28 disposed between wheel 36 and side frame 2 (out of the rim of wheel 36) is expanded so as to have a radial dimension L2 which is larger than a radial dimension L1 of the distal portion of transaxle housing 28 incorporating hydraulic motor 10, thereby ensuring large-sizing of deceleration gear train 38. Due to such a large-sized deceleration gear train 38, a high-speed and low-torque hydraulic motor can be used as hydraulic motor 10, i.e., hydraulic motor 10 can be sufficiently small-sized so as to be disposed in the rim of wheel 36.

Alternatively, the deceleration gear train interposed between motor sleeve 56 and axle 35 may use parallel spur gears. Alternatively, the deceleration gear train may include only one gear assembly, which may include one sun gear and planetary gears, or include two mutually meshing spur gears. An alternative deceleration gear train will be discussed later.

Figure 12:
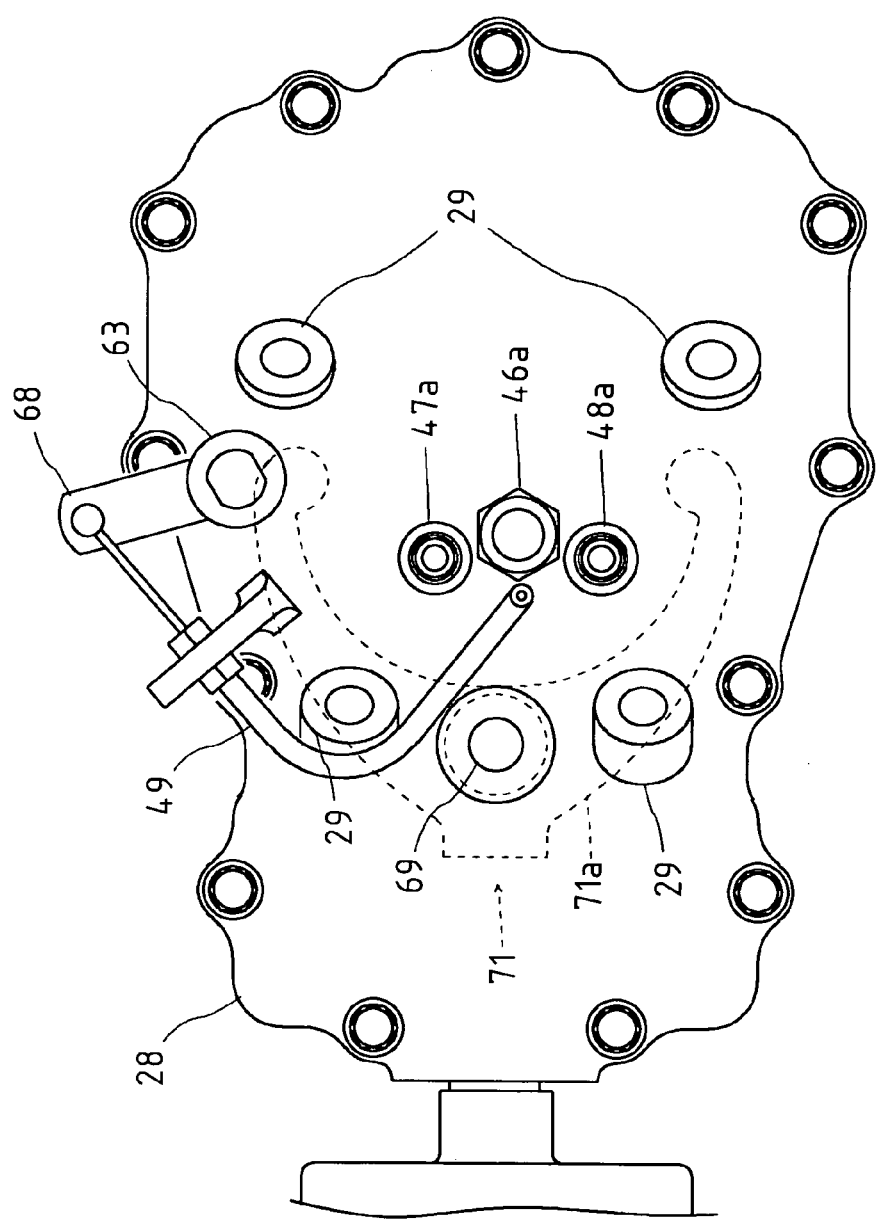
FIG. 12 is a plan view of steerable transaxle housing 28 of front transaxle 15 incorporating hydraulic motor 10.
Figure 13:
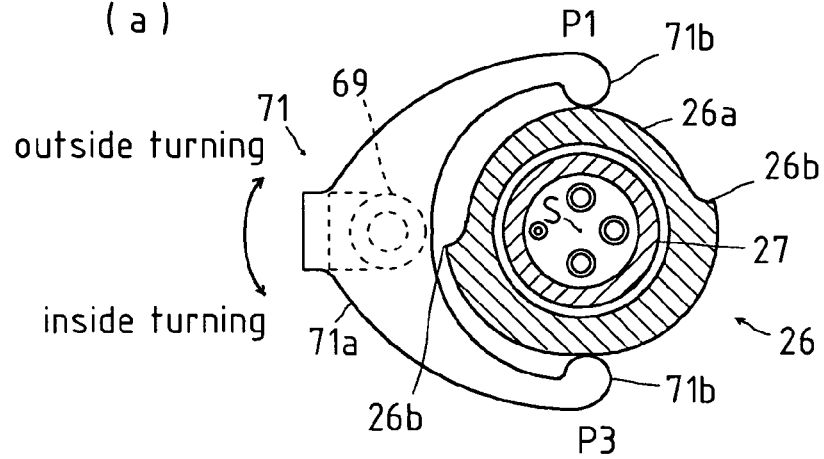
FIG. 13(a) is an axially sectional view of clamping portion 71a of motor control arm 71 clamping cam 26a when a steering wheel 16 is disposed at a straight traveling position.
FIG. 13(b) is an axially sectional view of clamping portion 71a of motor control arm 71 clamping cam 26a when steering wheel 16 is rotated so as to direct corresponding wheel 36 on the turning inside of vehicle 1.
FIG. 13(c) is an axially sectional view of clamping portion 71a of motor control arm 71 clamping cam 26a when steering wheel 16 is rotated so as to direct corresponding wheel 36 on the turning outside of vehicle 1.
Figure 13:
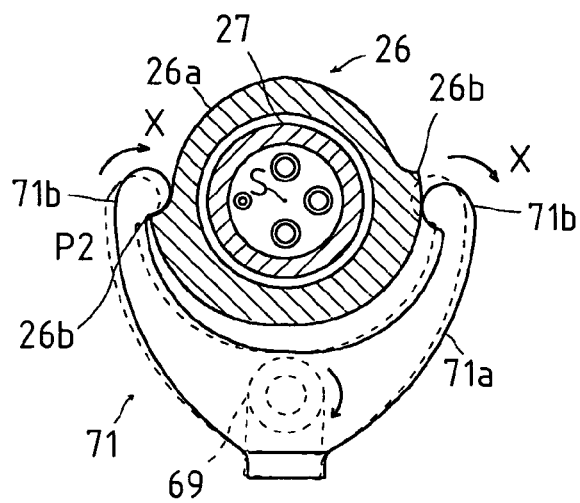
Figure 13:
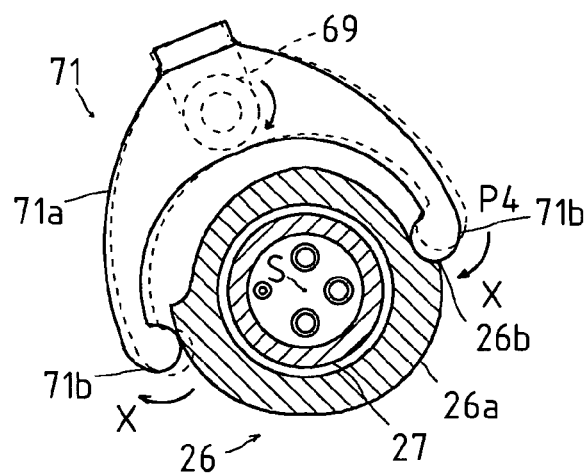

As shown in FIGS. 3, 7 and 8, wet disk type brake assembly 39 is disposed between deceleration gear train 38 and center section 41. Brake assembly 39 includes a brake disk 66, a pressure plate 64 and a camshaft 63. Brake disk 66 is spline-fitted onto first sun gear 65 so as to be axially slidable along first sun gear 65. Vertical camshaft 63 is partly cut away to form a sectionally semicircular cam whose surface is fitted to pressure plate 64 adjacent to brake disk 66. A brake pad is disposed between ring gear 59 and brake disk 66. As shown in FIG. 12, camshaft 63 projects upward from transaxle housing 28 and is fixedly provided thereon with a brake arm 68. Brake wire 49 is extended from the bottom open end of kingpin sleeve 27 and connected to brake arm 68. As shown in FIG. 6, brake wire 49 is extended outward from cap 31 and connected to a brake manipulator, such as a brake pedal, provided on vehicle 1.

If camshaft 63 is rotated for braking, the cam surface having been fitted to pressure plate 64 is slanted so as to press pressure plate 64 against brake disk 66, thereby clamping brake disk 66 between pressure plate 64 and the brake pad and braking first sun gear 65 fixed on motor sleeve 56.

Referring to FIGS. 7, 10 to 13, motor control linkage 40 for controlling movable swash plate 53 interlocks with steering linkage 18 so as to reduce the displacement of hydraulic motor 10, i.e., increase the output speed of motor 10, in proportion to increase of the steering angle. As shown in FIG. 7, a vertical control shaft 69 is rotatably supported by a top wall of the distal portion of upper housing half 28a. An arm 70 is fixed on a bottom end of control shaft 69 in transaxle housing 28, and fitted into a space between twin upward projections 53a of swash plate 53 so that swash plate 53 and arm 70 rotate together with control shaft 69.

Figure 11:
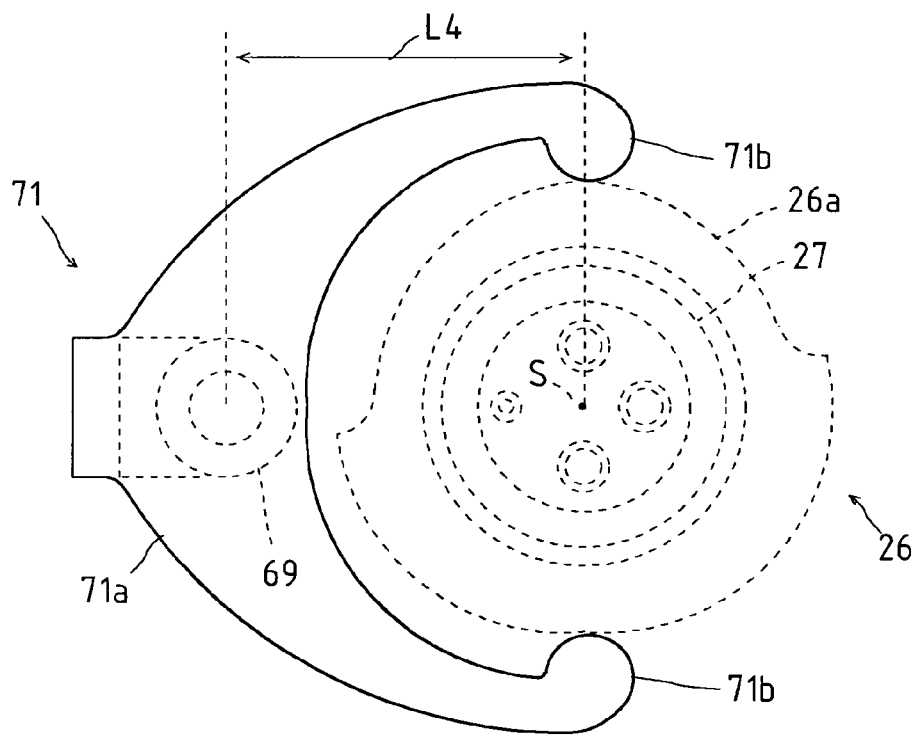

A motor control arm 71 is fixed onto a top end of control shaft 69 projecting upward from the top wall of transaxle housing 28. Motor control arm 71 is extended upward, as shown in FIG. 7, and bent to extend a C-like shaped clamping portion 71a in parallel to the rotational direction of transaxle housing 28 relative to the chassis of vehicle 1. Clamping portion 71a bifurcates so as to have two opposite nodular ends 71b, as shown in FIG. 11.

Figure 10:
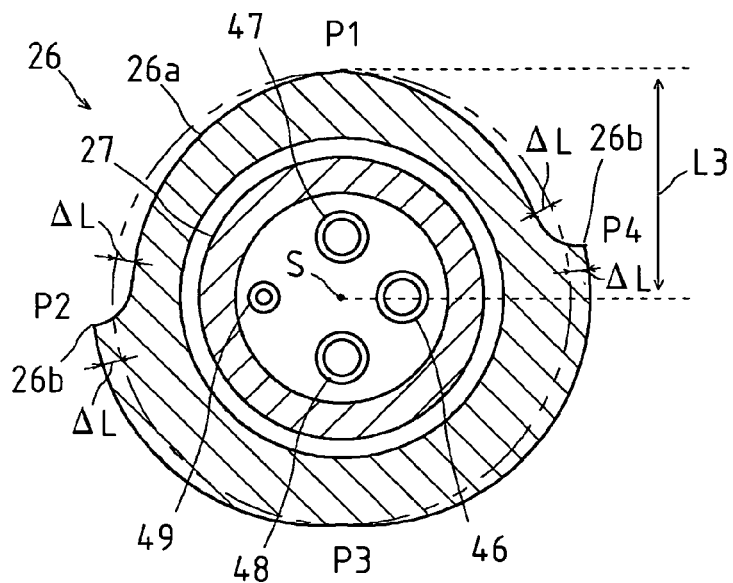
FIG. 10 is a cross sectional view of transaxle 15 taken along a X-X line of FIG. 3, showing a shape of a cam 26a formed on kingpin support casing 26.

A peripheral portion of kingpin support casing 26 to be pressed against nodular ends 71b of motor control arm 71 is formed into a cam 26a as shown in FIG. 10. Four points P1, P2, P3 and P4 are arranged on the periphery of cam 26a counterclockwise so as to divide the peripheral surface of cam 26a into four substantially quarter ranges. Point P1 is disposed on the front end of cam 26a, and point P3 on the rear end of cam 26a. Points 1 and 3 are disposed on the basically circular line exactly opposite to each other with respect to a center axis S of kingpin sleeve 27. Point P2 between points P1 and P3 is slightly shifted toward point P3 from a point equally distant from points P1 and P3, and opposite point P4 between points P1 and P3 is slightly shifted toward point P1 from a point equally distant from points P1 and P3. A long range between points P1 and P2 is equal to that between P3 and P4, and a short range between points P2 and P3 is equal to that between P4 and P1.

One of nodular ends 71b slides along the peripheral surface of cam 26a between points P2 and P4 through point P1, and the other nodular end 71b between points P2 and P4 through point P3. The long ranges between points P1 and P2 and between points P3 and P4 serve as slidable ranges for opposite nodular ends 71b when corresponding wheel 36 turns to the turning inside of vehicle 1. The short ranges between points P1 and P4 and between points P2 and P3 serve as slidable ranges for opposite nodular ends 71b when corresponding wheel 36 turns to the turning outside of vehicle 1. Therefore, the turning angle of transaxle 15 with wheel 36 on the turning inside of vehicle 1 is larger than that on the turning outside of vehicle 1.

Since illustrated cam 26a is formed for left transaxle 15L, the long range between P1 and P2 is disposed left, and the short range between P1 and P4 right. If cam 26a is provided for right transaxle 15R, the long ranges are exchanged for the short ranges in their right and left positional relation.

Each of the substantially quarter ranges of cam 26a has a periphery surface whose distance from center axis S of kingpin sleeve 27 gradually vanes. A basically circular line having a constant radius L3 is drawn in a phantom line in FIG. 10. During the shift from point P1 to point P2, and from point P1 to point P4, distance L3 of the peripheral surface of cam 26a is reduced so as to increase its deviation ΔL from the basically circular line. During the shift from point P3 to point P2, and from point P3 to point P4, distance L3 of the peripheral surface of cam 26a is increased so as to increase its deviation ΔL from the basically circular line. On each of points P2 and P4, the peripheral surface of cam 26a is curled so as to form a step 26b serving as a stopper for nodular end 71b.

As shown in FIG. 13(a), when steering wheel 16 is disposed at the neutral (straight traveling) position, nodular ends 71b abut against cam 26a on points P1 and P3. Control shaft 69 revolves integrally with kingpin sleeve 27 and transaxle housing 28 while keeping a constant distance L4 of its center axis from center axis S of kingpin sleeve 27, as shown in FIG. 11.

By rotating steering wheel 16 leftward from the straight traveling position, left transaxle 15L with wheel 36 on the turning inside of vehicle 1 turns leftward so that nodular ends 71b slide along cam 26a in the long ranges from point P1 to point P2 and from point P3 to point P4. During the sliding of nodular ends 71b on cam 26a, nodular end 71b on the range between points P1 and P2 moves toward center axis S of kingpin sleeve 27, and nodular end 71b on the range between points P3 and P4 moves away from center axis S of kingpin sleeve 27. Finally, nodular end 71b sliding between points P1 and P2 reaches step 26b on point P2, and nodular end 71b sliding between points P3 and P4 reaches step 26b on point P4, as shown in FIG. 13(b), thereby defining the maximum left (inside) turning angle of left transaxle 15L with wheel 36.

By rotating steering wheel 16 rightward from the straight traveling position, left transaxle 15L with wheel 36 on the turning outside of vehicle 1 turns rightward so that nodular ends 71b slide along cam 26a in the short ranges from point P1 to point P4 and from point P3 to point P2. During the sliding of nodular ends 71b on cam 26a, nodular end 71b on the range between points P1 and P4 moves toward center axis S of kingpin sleeve 27, and nodular end 71b on the range between points P3 and P2 moves away from center axis S of kingpin sleeve 27. Finally, nodular end 71b sliding between points P1 and P4 reaches step 26b on point P4, and nodular end 71b sliding between points P3 and P2 reaches step 26b on point P2, as shown in FIG. 13(c), thereby defining the maximum right (outside) turning angle of left transaxle 15L with wheel 36.

The movement of nodular ends 71b depending upon the deviation of cam 26a from the basically circular line causes the rotation of control shaft 69 fixed to motor control arm 71 relative to transaxle housing 28, thereby moving swash plate 53. Whether steering wheel 16 is rotated right or left, nodular ends 71b move in a common direction X arrowed in FIG. 13(b) and FIG. 13(c) so as to reduce the tilt angle of swash plate 53, i.e., reduce the displacement of hydraulic motor 10, thereby accelerating wheels 36.

Deviation rate ΔL of cam 26a in the long range is the same as that in the short range so that the displacement reduction rate of motor 10, i.e., the acceleration rate of wheel 36 is the same whether transaxle 15 with wheel 36 is disposed on the turning inside of vehicle 1 or the turning outside of vehicle 1. The natural distribution of fluid between right and left motors 10 fluidly connected in parallel to hydraulic pump 5 ensures the differential driving of right and left wheels 36 during the turning of vehicle 1.

Alternatively, deviation rate ΔL of cam 26a in the long range may be different from that in the short range so as to forcibly make a difference of displacement between right and left motors 10 during the turning of vehicle 1. More specifically, deviation rate ΔL of cam 26a in the long range may be smaller than that in the short range so that inside wheel 36 becomes slower than outside wheel 36 during the turning of vehicle 1.

Referring to FIG. 14, unsteering transaxle 13 with rear wheel 79 will be described. A transaxle housing 76 of transaxle 13 is disposed on each of right and left sides of duct 74. An L-like shaped bracket 77 is fastened at its vertical portion to the vertical surface of side frame 2 by bolts 87, and fastened at its horizontal portion onto a top surface of housing 76. An upper housing half 76a and a lower housing half 76b are joined to each other through a horizontal joint surface by bolts 88 so as to constitute housing 76. An axle 78 is disposed in housing 76 so that the center axis of axle 78 is disposed on the horizontal joint surface between upper and lower housing halves 76a and 76b.

In transaxle housing 76, opposite ends of horizontal axle 78 are journalled by upper and lower housing halves 76a and 76b through respective bearings 84. The distal end of axle 78 opposite to duct 74 projects outward from housing 76 so as to be formed into a hub of wheel 79.

Transaxle housing 76 incorporates a variable displacement hydraulic motor 80, a deceleration gear train 81, a brake assembly 82 and a motor control linkage 83 connected to a movable swash plate 73 of motor 80. Description about deceleration gear train 81, brake assembly 82 and the structure of motor control linkage 83 in housing 76 is omitted because they are configured in the same way as deceleration gear train 38, brake assembly 39 and motor control linkage 40 of transaxle 15.

Hydraulic motor 80 may be fixed in displacement, if possible. In the present embodiment, variable displacement hydraulic motor 80 has movable swash plate 53 actuated by an external actuator 101 through linkage 83. As shown in FIG. 17, controller 107 controls actuator 101 of right and left transaxles 13R and 13L based on the detection of rotary speeds of right and left axles 78 by rotary sensors 102 adjacent to respective axles 78.

A mechanical differential gear assembly may replace the pair of hydraulic motors 80. Examples of the mechanical differential gear assembly will be described later with reference to FIGS. 18 to 21.

Alternatively, rear wheels 79 may be steerable according to the operation of steering wheel 16. An example of a mechanism of steerable rear wheels 79 will be described later with reference to FIG. 19.

Transaxle housing 28 of front steering transaxle 15 may serve as transaxle housing 76 of rear transaxle 13. If transaxle housing 28, provide on its top with mount boss portion 29, is used as transaxle housing 76 of transaxle 13, mount boss portion 29 is available to steerably support housing 76 onto the chassis of vehicle 1 in the same way as transaxle housing 28 of transaxle 15. If transaxle 13 is unsteerably supported, transaxle housing 28 serving as housing 76 may be fixed to the chassis of vehicle 1 through bracket 77 as mentioned above.

A hydraulic circuit system for driving vehicle 1 will be described with reference to FIG. 15. First hydraulic circuit 89 of transaxles 15L and 15R has a pair of fluid passages 89a and 89b and respective external ports of passages 89a and 89b so as to fluidly connect hydraulic motors 10 in parallel to hydraulic pump 5. Hydraulic circuit 90 of transaxles 13L and 13R has a pair of fluid passages 90a and 90b and respective external ports of passages 90a and 90b so as to fluidly connect hydraulic motors 80 in parallel to hydraulic pump 5.

An auxiliary speed changing valve 92 is interposed between hydraulic pump 5 and all the external ports of first and second hydraulic circuits 89 and 90 so as to change the fluidal connection pattern of hydraulic motors 10 and 80 to hydraulic pump 5. By manipulation of an auxiliary speed changing manipulator 93 (such as a pedal or a lever), auxiliary speed changing valve 92 is switched among three positions, i.e., a high speed level position H, a middle speed level position M and a low speed level position L. A sensor 103 is disposed adjacent to auxiliary speed changing manipulator 93, and switched on when auxiliary speed changing manipulator 93 is set for setting auxiliary speed changing valve 92 at high speed position H.

Hydraulic pump 5 is provided with a pair of fluid passages 91a and 91b, which are connected to suction and delivery ports of pump 5, respectively. A charge pump 94 is driven together with hydraulic pump 5 by engine 3. Fluid from charge pump 94 is supplied to fluid passages 91a and 91b through respective check valves 96. A relief valve 95 regulates the hydraulic pressure of fluid from charge pump 94.

Passage 91a from one port of hydraulic pump 5 bifurcates into passages 100a and 100b. Passage 100a is connected to the external port of passage 90a of second hydraulic circuit 90, and passage 100b is connected to auxiliary speed changing valve 92. A passage 100c is interposed between auxiliary speed changing valve 92 and the external port of passage 90b of second hydraulic circuit 90. Passage 91b from the other port of hydraulic pump 5 is connected to auxiliary speed changing valve 92. Passages 100d and 100e are interposed between auxiliary speed changing valve 92 and the respective external ports of passages 89a and 89b of first hydraulic circuit 89.

Auxiliary speed changing valve 92 set at low speed level position L bifurcates passage 91b to passages 100c and 100e so as to distribute fluid into passage 89b of the pair of motors 10 and passage 90b of the pair of motors 80 (or to collect fluid from passage 89b of the pair of motors 10 and passage 90b of the pair of motors 80). Auxiliary speed changing valve 92 set at low speed level position L also connects passage 100b to passage 100d. In this way, when auxiliary speed changing valve 92 is set at low speed level position L, fluid from hydraulic pump 5 through one of passages 91a and 91b is distributed between first and second hydraulic circuits 89 and 90 (between passages 89a and 90a or between passages 89b and 90b), and fluid to hydraulic pump 5 through the other passage 91b or 91a is collected from first and second hydraulic circuits 89 and 90 (from passages 89b and 90b or from passages 89a and 90a). Namely, all hydraulic motors 10 and 80 are fluidly connected in parallel to hydraulic pump 5, thereby reducing fluid supplied to each of motors 10 and 80. Vehicle 1 can travel in a four-wheel driving mode suitably for traction of a heavy machine and climbing a slope.

Auxiliary speed changing valve 92 set at middle speed level position M connects passage 91b to passage 100e, i.e., passage 89b of the pair of motors 10. Auxiliary speed changing valve 92 set at middle speed level position M also connects passage 100c to passage 100d and shuts off passage 100b. In this way, when auxiliary speed changing valve 92 is set at middle speed level position M, fluid from hydraulic pump 5 through one of passages 91a and 91b is supplied to one of first and second hydraulic circuits 89 and 90, and then supplied to the other second or first hydraulic circuit 90 or 89 (from passage 90a to passage 89b through passages 90b and 89a, or from passage 89b to passage 90a through passages 89a and 90b), and returned to pump 5 through the other passage 91b or 91a. Namely, the pair of hydraulic motors 10 and the pair of motors 80 are fluidly connected in tandem to hydraulic pump 5, thereby supplying all the amount of fluid from pump 5 to the pair of motors 10 and to the pair of motors 80. Fluid is distributed between motors 10 and between motors 80, however, the amount of fluid supplied to each of motors 10 and 80 is larger than that when all motors 10 and 80 are fluidly connected in parallel to pump 5 during the setting of auxiliary speed changing valve 92 at low speed level position L. Vehicle 1 can travel in a four-wheel driving mode suitably for effective work at higher speed than that when auxiliary speed changing valve 92 is set at low speed level position L.

Furthermore, when auxiliary speed changing valve 92 is set at middle position M so as to fluidly connect the pair of motors 10 and the pair of motors 80 in tandem to hydraulic pump 5, and when vehicle 1 travels forward, fluid from hydraulic pump 5 is supplied to the pair of motors 80 for rear wheels 79 prior to the pair of motors 10 for front wheels 36. Thus, even if vehicle 1 suddenly starts forward and front wheels 36 is intended to rise from the ground surface, motors 80 supplied with fluid prior to motors 10 can be driven to ensure the torque of rear wheels 79 for gripping the ground surface, thereby stabilizing vehicle 1.

Auxiliary speed changing valve 92 set at high speed level position H connects passage 91b to passage 100c, i.e., passage 90b of the pair of motors 80. Auxiliary speed changing valve 92 set at high speed level position H also connects passage 100d to passage 100e and shuts off passage 100b. In this way, when auxiliary speed changing valve 92 is set at high speed level position H, fluid from hydraulic pump 5 through one of passages 91a and 91b is supplied to only the pair of motors 80 in second hydraulic circuit 90. Namely, motors 80 are effectively driven with fluid supplied without loss for driving motors 10. In this way, high speed position H is provided for putting vehicle 1 into a two-wheel driving mode, while middle and low speed positions M and L are for putting vehicle 1 into the four-wheel driving mode.

Due to the connection of passages 100d and 100e, fluid circulates in first hydraulic circuit 89 isolated from hydraulic pump 5 and second hydraulic circuit 90, thereby allowing rotation of wheels 36. A check valve 89c supplies fluid to first hydraulic circuit 89 when first hydraulic circuit 89 is hydraulically depressed by the circulation of fluid by rotation of wheels 36.

Furthermore, when auxiliary speed changing valve 92 is set at high speed position H, sensor 103 is switched on as mentioned above. Based on the switching on of sensor 103, controller 107 controls external actuator 101 so as to evenly reduce the tilt angles of movable swash plates 73, i.e., reduce the displacements of hydraulic motors 80, thereby accelerating wheels 79. In this way, when auxiliary speed changing valve 92 is set at high speed position H, vehicle 1 can economically travel at higher speed than the speed of vehicle 1 simply set in the two-wheel driving mode without changing of the displacement of motors 80.

Instead of external actuator 101 and sensor 103, linkages 40 with respective movable swash plates 73 may alternatively interlock with auxiliary speed changing valve 92 through a mechanical linkage such as a rod or a wire, so that the tilt angles of movable swash plates 73 are reduced by the setting of valve 92 at high speed level position H. Alternatively, even if the displacements of hydraulic motors 80 are not changed, i.e., even if hydraulic motors 80 are fixed in displacement, the effective driving of motors 80 can be obtained by the two-wheel driving so as to drive vehicle 1 at a higher speed level than that of vehicle 1 traveling in the four-wheel driving mode.

Wherever auxiliary speed changing manipulator 93 is disposed among the low, middle and high speed level positions, main speed changing pedal 106 is depressed so as to change the displacement and delivery direction of hydraulic pump 5, thereby changing the traveling speed and direction of vehicle 1.

Each of motors 10 and 80 has suction and delivery ports bypassed through a bypass valve 108. When vehicle 1 is towed, all bypass valves 108 are opened to bypass respective motors 10 and 80. When vehicle 1 is towed, the force is applied from the ground surface onto wheels 36 and 79 so as to rotate wheels 36 and 79. However, fluid in hydraulic motors 10 and 80 fluidly connected to pump 5 resists the rotational force of wheels 36 and 79. Therefore, bypass valves 108 are opened so that fluid circulates between each motor 10 or 80 and the corresponding bypass passage without flowing to hydraulic pump 5, thereby reducing the resistance of fluid. Thus, motors 10 and 80 are allowed to rotate by the force from the ground surface, and wheels 36 and 79 can be freely rotated by the towing of vehicle 1.

First and second hydraulic circuits 89 and 90 include respective flow control valves 98 interposed between passage 89b and the pair of motors 10 and between passage 90b and the pair of motors 80. First and second hydraulic circuits 89 and 90 also include respective flow control valves 99 interposed between passage 89a and the pair of motors 10 and between passage 90a and the pair of motors 80. In each of flow control valves 98 and 99, each of passages 89b, 90b, 89a and 90a bifurcates to passages connected to respective motors 10 and 80. Flow control valves 98 and 99 are provided with respective step motors 98a and 99a for throttling the bifurcating passages from each of passages 89b, 90b, 89a and 90b. All step motors 98a and 99b are electrically connected to controller 107.

It is assumed that, during the forward traveling of vehicle 1, hydraulic pump 5 delivers fluid to passage 91a and sucks fluid from passage 91b, and during the backward traveling of vehicle 1, hydraulic pump 5 delivers fluid to passage 91b and sucks fluid from passage 91a. Flow control valve 99 can be throttled to restrict the differential rotation of corresponding motors 10 or motors 80 during the forward traveling of vehicle 1. Flow control valve 98 can be throttled to restrict the differential rotation of corresponding motors 10 or motors 80 during the backward traveling of vehicle 1.

When vehicle 1 travels forward and either the pair of motors 10 or the pair of motors 80 need to restrict their differential rotation, corresponding step motor 99a can be actuated to throttle the bifurcating passages in corresponding flow control valve 99 from either higher-pressured passage 89a or 90a to the corresponding pair of motors 10 or 80. During the forward traveling of vehicle 1, step motor 98a is prevented from actuating, i.e., the bifurcating passages in each of flow control valves 98 from the corresponding pair of motors 10 or 80 to each of lower-pressured passages 89b and 90b are not throttled.

When vehicle 1 travels backward and either the pair of motors 10 or the pair of motors 80 need to restrict their differential rotation, corresponding step motor 98a can be actuated to throttle the bifurcating passages in corresponding flow control valve 98 from either higher-pressured passage 89b or 90b to the corresponding pair of motors 10 or 80. During the backward traveling of vehicle 1, step motor 99a is prevented from actuating, i.e., the bifurcating passages in each of flow control valves 99 from the corresponding pair of motors 10 or 80 to each of lower-pressured passages 89a and 90a are not throttled.

A differential locking pedal 105 is provided on vehicle 1 for restricting the differential rotation of motors 10 and 80. Controller 107 controls step motors 98a and 99a based on detection of sensors, e.g., a sensor adjacent to differential locking pedal 105, a sensor adjacent to main speed changing pedal 106, rotary speed sensors 102 and steering angle sensor 104. Controller 107 functions extraction and calculation of data and of executing programs. For example, it may comprise CPU, ROM, RAM, etc. which are mutually connected by buses, or it may comprise one-chip LSI or the like on having the above functions.

For example, when one of right and left front wheels 36 or one of right and left rear wheels 79 is stuck in a ditch or mud, fluid tends to flow through motor 10 or 80 of stuck wheel 36 or 79, and motor 10 or 80 of unstuck wheel 36 or 79 is insufficiently supplied with fluid. However, in this state, by depressing differential locking pedal 105, controller 107 actuates either step motors 98a or 99a based on the switching on of the sensor adjacent to pedal 105, so as to supply fluid to motor 10 or 80 of unstuck wheel 36 or 79, whereby vehicle 1 can escape from the ditch or mud. In the case of the depression of differential locking pedal 105, controller 107 decides whether step motors 98a or 99a should be actuated depending upon whether main speed changing pedal 106 is depressed for forward traveling or backward traveling.

Controller 107 may control step motors 98a and 99a for stabilizing turning of vehicle 1 based on detection of rotary speed sensors 102 and steering angle sensor 104. During the turning of vehicle 1, controller 107 calculates a position of turning center 110, turning radius 112a of rear wheels 79 and turning radius 111a of front wheels 36 (see FIG. 5) based on the detection of rotational angle of steering wheel 16 by sensor 104. Due to the calculation of turning radii 112a and 111a, all optimal rotary speeds of respective wheels 36 and 79 are calculated. Based on the detection of rotary speeds of axles 35 and 78 by sensors 102, if the detected rotary speed of one wheel 36 or 79 is deviate from its optimal rotary speed, and the wheel 36 or 79 is recognized to be slipping, controller 107 actuates either step motors 98a or 99a so as to restrict the amount of fluid flowing through motor 10 or 80 of slipping wheel 36 or 79, thereby forcibly supplying fluid to the other motor 10 or 80 of non-slipping wheel 36 or 79. Therefore, vehicle 1 can turn with constant driving of all wheels 36 and 79 (if auxiliary speed changing valve 92 is set at high speed level position H, with constant driving of both wheels 79).

In the hydraulic circuit system of FIG. 15, first hydraulic circuit 89 includes the pair of parallel-connected motors 10 provided with two flow control valves 98 and 99 on upstream and downstream sides thereof, and each of flow control valves 98 and 99 has the variably throttled bifurcating passage such as to distribute fluid between parallel-connected motors 10 and to collect fluid from motors 10. Second hydraulic circuit 90 including the pair of parallel-connected motors 80 is similar. As a result, the entire hydraulic circuit system including first and second hydraulic circuits 89 and 90 is provided with four flow control valves 98 and 99 in total.

Figure 16:
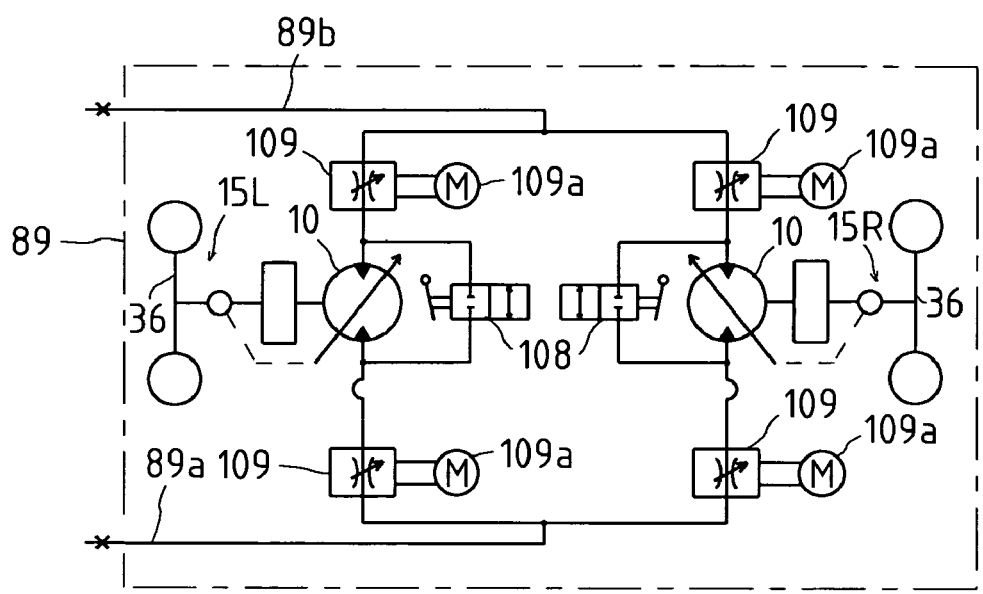
FIG. 16 is a diagram of an alternative first hydraulic circuit 89.

Alternatively, as show in FIG. 16 (FIG. 16 illustrates representative alternative first hydraulic circuit 89), in each of first and second hydraulic circuits 89 and 90, each motor 10 or 80 may be provided with two flow control valves 109 on upstream and downstream sides thereof, and each flow control valve 109 may have a simply linear passage variably throttled by a step motor 109a. As a result, the hydraulic circuit system including first and second hydraulic circuits 89 and 90 is provided with eight flow control valves 109.

Alternative vehicles 1 shown in FIGS. 18 to 20 will be described on the assumption that they are constructed similar to vehicle 1 shown in FIGS. 1 to 16 excluding the following features. Especially, the wheelbase and tread are standardized. FIG. 21 illustrates a drive system shared among vehicles 1 of FIGS. 18 to 20. In comparison with vehicle 1 shown in FIGS. 1 to 16, description will be omitted of those parts and structures designated by the same reference numerals, whose functions are identical.

Figure 18:
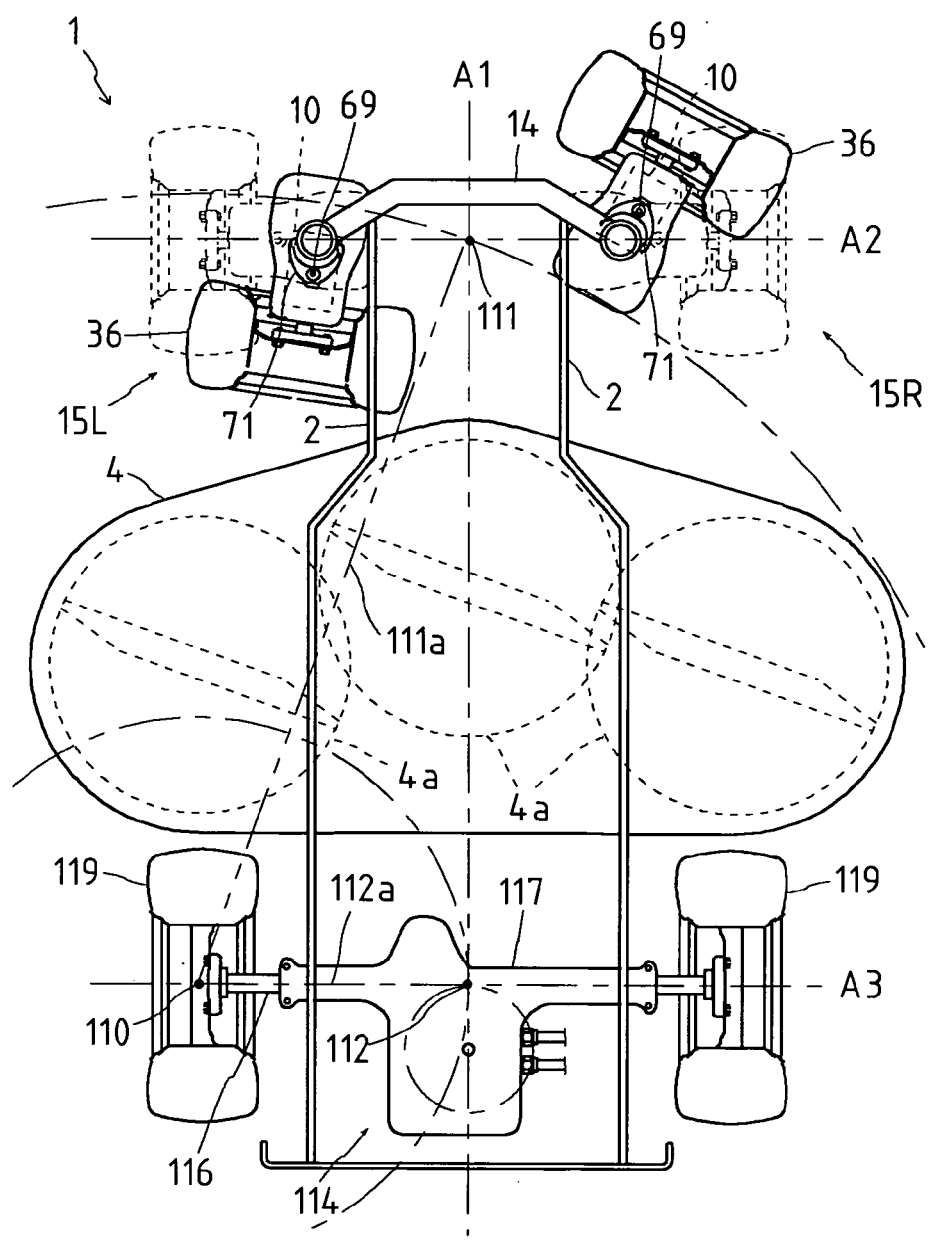
FIG. 18 is a schematic plan view of an alternative four-wheel driving vehicle 1 having left and right steerable front transaxles 15 (15L and 15R) and a rear transaxle 114 unsteerably supporting left and right rear wheels 119, wherein a transaxle housing 117 of rear transaxle 114 incorporates hydraulic pump 5 and a hydraulic motor 115 for driving rear wheels 119.
Figure 19:
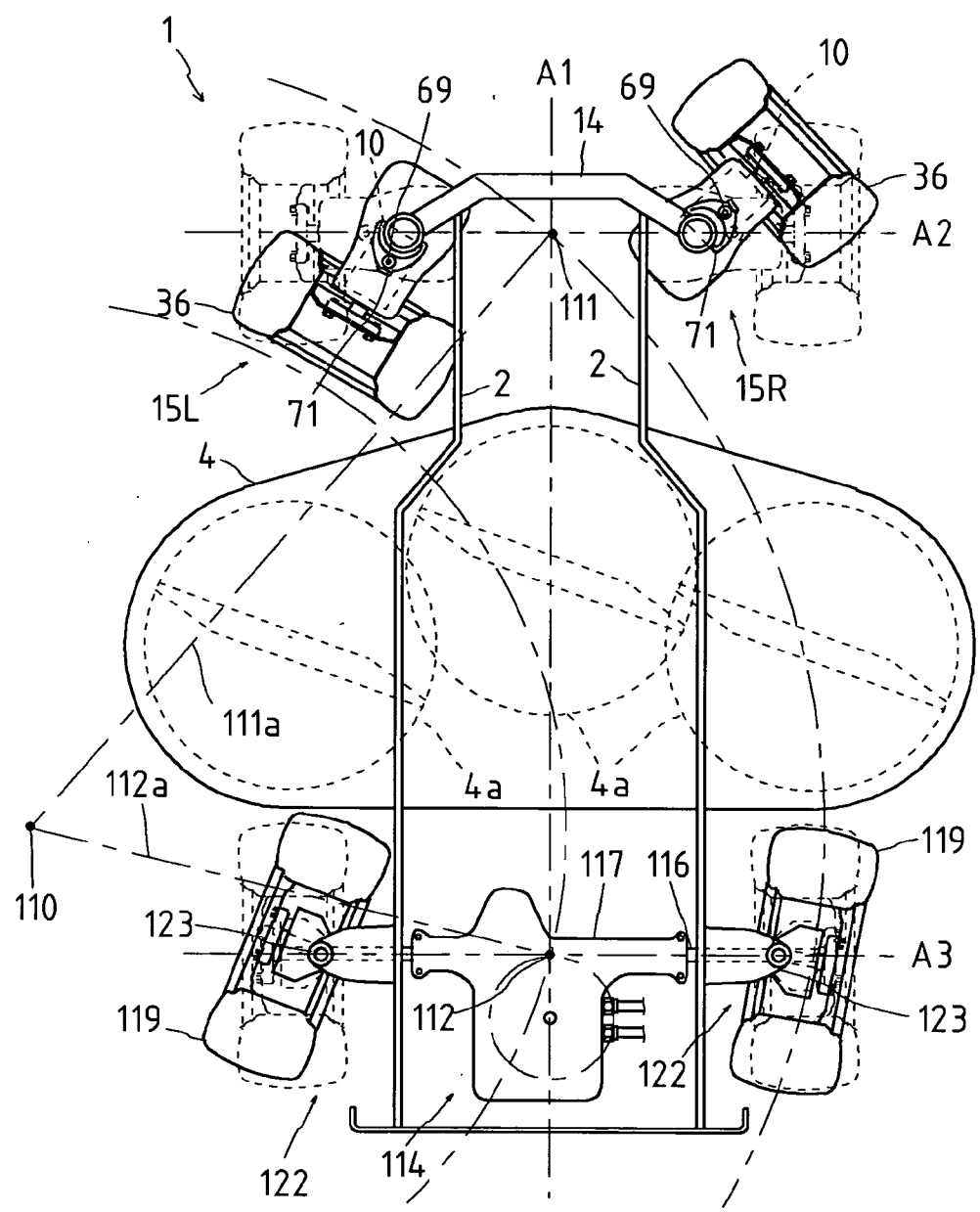
FIG. 19 is a schematic plan view of an alternative four-wheel driving vehicle 1 having left and right steerable front transaxles 15 (15L and 15R) and rear transaxle 114 steerably supporting left and right rear wheels 119, wherein transaxle housing 117 of rear transaxle 114 incorporates hydraulic pump 5 and hydraulic motor 115 for driving rear wheels 119.
Figure 20:
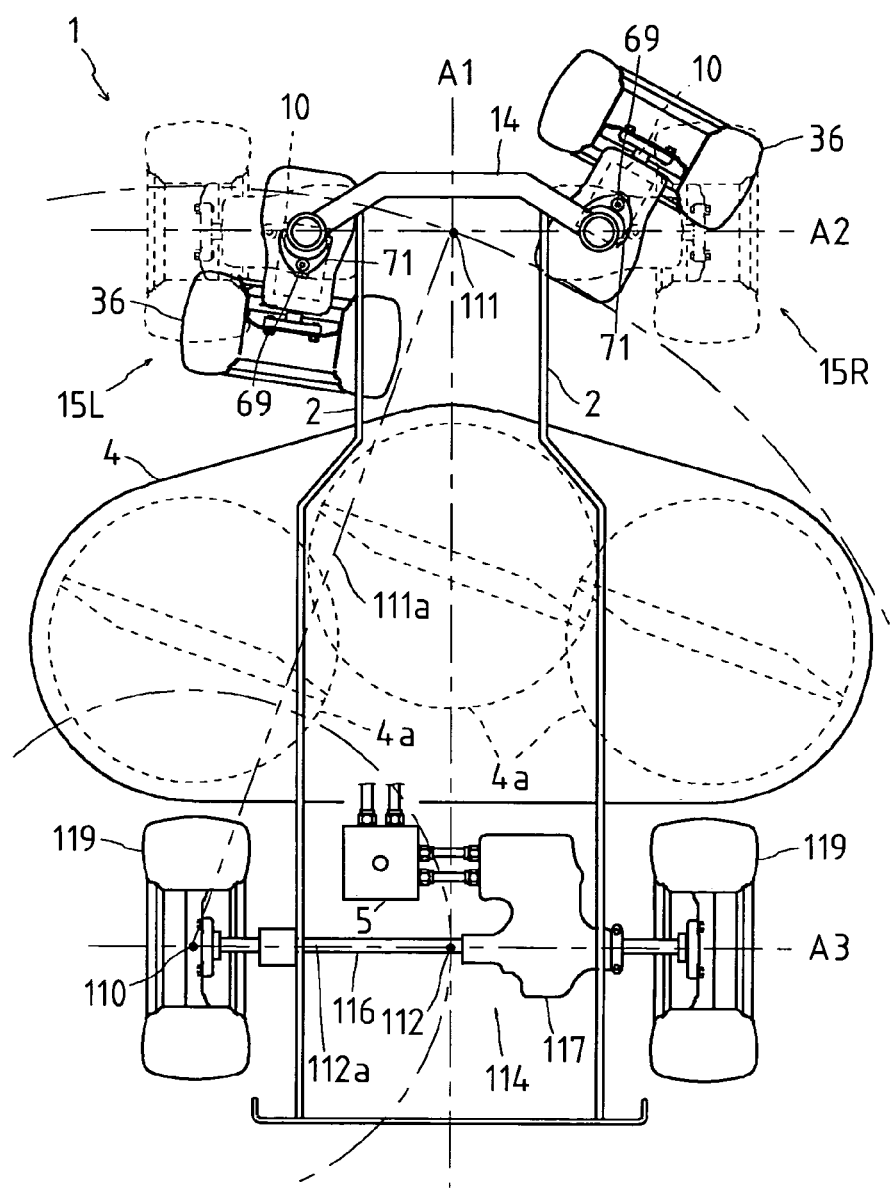
FIG. 20 is a schematic plan view of an alternative four-wheel driving vehicle 1 having left and right steerable front transaxles 15 (15L and 15R) and rear transaxle 114 unsteerably supporting left and right rear wheels 119, wherein hydraulic pump 5 is disposed out of transaxle housing 117 of rear transaxle 114 incorporating hydraulic motor 15 for driving rear wheels 119.
Figure 21:
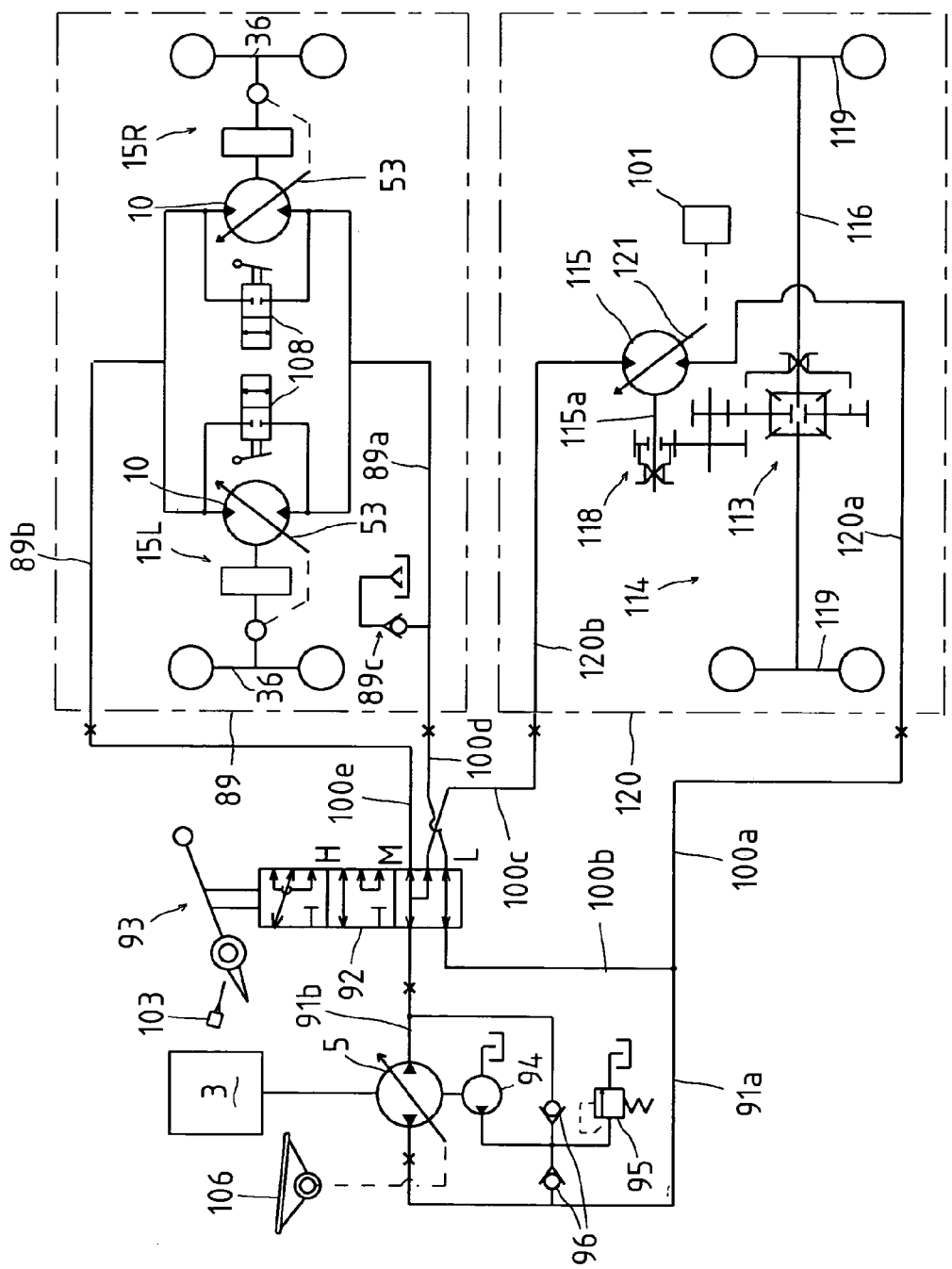
FIG. 21 is a diagram of a hydraulic circuit system used for vehicles 1 shown in FIGS. 18 to 20, comprising first hydraulic circuit 89 for front transaxles 15, a second hydraulic circuit 120 for rear transaxle 114 and an auxiliary speed changing system including auxiliary speed changing valve 92.

Each of alternative vehicles 1 shown in FIGS. 18 to 20, having front steering transaxles 15 (15L and 15R) with front wheels 36, is provided with left and right rear wheels 119. A rear transaxle 114 is provided for driving rear wheels 119. A housing 117 of rear transaxle 114 incorporates a single hydraulic motor 115 and a mechanical differential gear unit 113 (see FIG. 21). Hydraulic motor 115 in each of vehicles 1 shown in FIGS. 18 to 20 is driven by hydraulic pump 5 so as to drive rear wheels 119 through differential gear unit 113.

With respect to each of vehicles 1 shown in FIGS. 18 and 19, hydraulic pump 5 for driving hydraulic motor 115 and motors 10 is disposed in housing 117.

With respect to vehicle 1 shown in FIG. 20, hydraulic pump 5 for driving hydraulic motor 115 and motors 10 is disposed out of housing 117 so as to expand a free space for rear transaxle 114. Pipes are interposed between separate hydraulic pump 5 and rear transaxle 114 so as to drivingly connect hydraulic pump 5 to hydraulic motor 115.

In vehicle 1 shown in FIG. 18, rear transaxle housing 117 is fixed to side frames 2 of the vehicle chassis. Right and left axles 116 (see FIG. 21) are differentially connected to each other through differential gear unit 113 in housing 117, and project outward from housing 117 so as to be fixedly provided thereon with respective rear wheels 119.

With respect to vehicle 1 shown in FIG. 18, when steering wheel 16 is fully rotated for turning, inside rear wheel 119 (rear wheel 119 on the turning inside of vehicle 1) is stopped and turning center 110 is disposed in inside wheel 119 so as to ensure turning radius 112a of rear wheels 119 (the distance between turning center 110 and middle point 112 between right and left rear wheels 119), that is equal to turning radius 112a of rear wheels 79 of vehicle 1 as shown in FIG. 5. Therefore, steering linkage 18 for steering transaxles 15L and 15R can be the same as that of vehicle 1 shown in FIGS. 1 to 16, so as to ensure turning radius 111a of wheels 36 which is as long as that of vehicle 1 shown in FIG. 5. Furthermore, the linkage for acceleration of front wheels 36 in association with the turning of vehicle 1 can be the same as that of vehicle 1 shown in FIGS. 1 to 16. Especially, the shape of cam 26a formed on kingpin support casing 26 can be the same as shown in FIGS. 10, 11, 13(a), 13(b) and 13(c). As a result, hydraulic motors 10 with respective wheels 36 are accelerated during the turning of vehicle 1 suitably for the difference between turning radii 111a and 112a.

Vehicle 1 shown in FIG. 19 is a four-wheel steering vehicle, in which rear wheels 119 are drivingly and steerably connected to respective axles 116. Axles 116 project outward through respective side frames 2 from right and left ends of rear transaxle housing 117, and supported in respective axle casings 123 fixed onto the outside surfaces of side frames 2, thereby constituting right and left steering wheel support units 122. The turning angle range of rear wheels 119 is limited so as to prevent rear wheels 119 from abutting against side frames 2. Steerable rear wheels 119 are linked to each other and operatively connected to steering wheel 16.

Due to the linkage between steering wheel 16 and four wheels 36 and 119, while front wheels 36 are turned in agreement with the turning direction of vehicle 1 (the rotational direction of steering wheel 16), rear wheels 119 are turned opposite to the turning direction of vehicle 1 so as to reduce the turning circle of vehicle 1. Turning center 110 is disposed forward from middle point 112 between rear wheels 119 so as to reduce the difference between turning radius 111a of front wheels 36 and turning radius 112a of rear wheels 119 (and turning center 110 is disposed laterally outside of inside wheel 119, whereby vehicle 1 cannot brake turn by stopping inside wheel 119). Therefore, the acceleration speed of front wheels 36 must be smaller than that of each of vehicles 1 shown in FIGS. 5 and 18. In this regard, the shape of cam 26a may be changed so as to reduce deviation ΔL corresponding to the shift angle of movable swash plates 53 of motors 10.

With respect to vehicle 1 of FIG. 20, right and left rear wheels 119 are fixed onto respective rear axles 116 extended outward from housing 117 of rear transaxle 114, similar to FIG. 18. Alternatively, rear wheels 119 may be steerably connected to axles 116, similar to FIG. 19.

Referring to FIG. 21, while first hydraulic circuit 89 including hydraulic motors 10 of front transaxles 15L and 15R is the same as that of FIG. 15, a second hydraulic circuit 120 includes single hydraulic motor 115 of rear transaxle 114 drivingly connected to rear wheels 119 through mechanical differential gear unit 113. A pair of passages 120a and 120b are extended from supply and delivery ports of hydraulic motor 115, and connected to respective passages 100a and 100c, similar to passages 90a and 90b of hydraulic motors 80 of rear transaxles 13R and 13L shown in FIG. 15.

The fluidal connection of hydraulic pump 5 to hydraulic motors 10 and 115 through auxiliary speed changing valve 92 is similar to that shown in FIG. 15. When auxiliary speed changing valve 92 is disposed at low speed level position L, all three hydraulic motors 10 and 115 are fluidly connected in parallel to hydraulic pump 5 so as to be supplied with divided fluid. When auxiliary speed changing valve 92 is disposed at middle speed level position M, the pair of parallel motors 10 and hydraulic motor 115 are fluidly connected in tandem to hydraulic pump 5 so as to be supplied with all fluid delivered from hydraulic pump 5. When auxiliary speed changing valve 92 is disposed at high speed level position H, only hydraulic motor 115 is fluidly connected to hydraulic pump 5, and actuator 101 is controlled to reduce the tilt angle of a movable swash plate 121 of motor 115, based on the switching on of sensor 103, thereby accelerating hydraulic motor 115 and rear wheels 119.

Alternative transaxle 15 shown in FIG. 22 will be described. In comparison with transaxle 15 shown in FIGS. 3 to 12, description will be omitted of those parts and structures designated by the same reference numerals, whose functions are identical.

A kingpin support casing 141 and a kingpin block 142, relatively rotatably penetrating kingpin support casing 141, are shorter than corresponding kingpin support casing 26 and kingpin sleeve 27, so as to support transaxle housing 28 not below side frame 2 but on lateral outside of side frame 2. In this regard, a bracket 139 for supporting transaxle housing 28 has a vertical surface fitted onto the vertical outside surface of side frame 2 and fastened to side frame 2 by a bolt or bolts. Bracket 139 has a top portion 139a, which is laterally outwardly extended from the top end of the vertical surface thereof and fastened to an extended bottom portion of kingpin support casing 141 by a bolt or bolts.

Bracket 139 has a bottom portion 139b laterally distally extended from the bottom end of the vertical surface thereof. A bottom kingpin 140 is fastened to an outer end of bottom portion 139b and projects upward from the upper surface of bottom portion 139b coaxially to the center axis of kingpin block 142. The upward projecting portion of bottom kingpin 140 is relatively rotatably inserted into a bottom wall of transaxle housing 28. A top portion of transaxle housing 28 is fixed to a bottom portion of kingpin block 142.

An upper portion of kingpin block 142 projecting upward from kingpin support casing 141 is fixedly provided thereon with sector gear 30 so as to serve as a pivot of sector gear 30. An L-like shaped bracket 138 is fastened at its vertical surface onto the vertical inside surface of side frame 2 by bolts 138a. A top portion of bracket 138 is bent laterally proximally. Pivot shaft 23 of sector gear 22 projects upward from the top portion of bracket 138. In this way, according to rotation of mutually meshing sector gears 22 and 30, kingpin block 142 and transaxle housing 28 are rotated integrally with sector gear 30 around the center axis of kingpin block 142 and bottom kingpin 140 relative to kingpin support casing 141 and bracket 138.

Kingpin block 142 is a solid shaft in comparison with hollow kingpin sleeve 27. In transaxle housing 28 are disposed hydraulic motor 10, deceleration gear train 38, brake assembly 39, motor control linkage 40 for controlling movable swash plate 53, and so on, similar to transaxle 15 shown in FIGS. 7 to 9.

Due to the vertically short transaxle 15, vehicle 1 can be small-sized and, if side frames 2 are lowered, the gravitational center of vehicle 1 can be lowered so as to stabilize vehicle 1.

Figure 22:
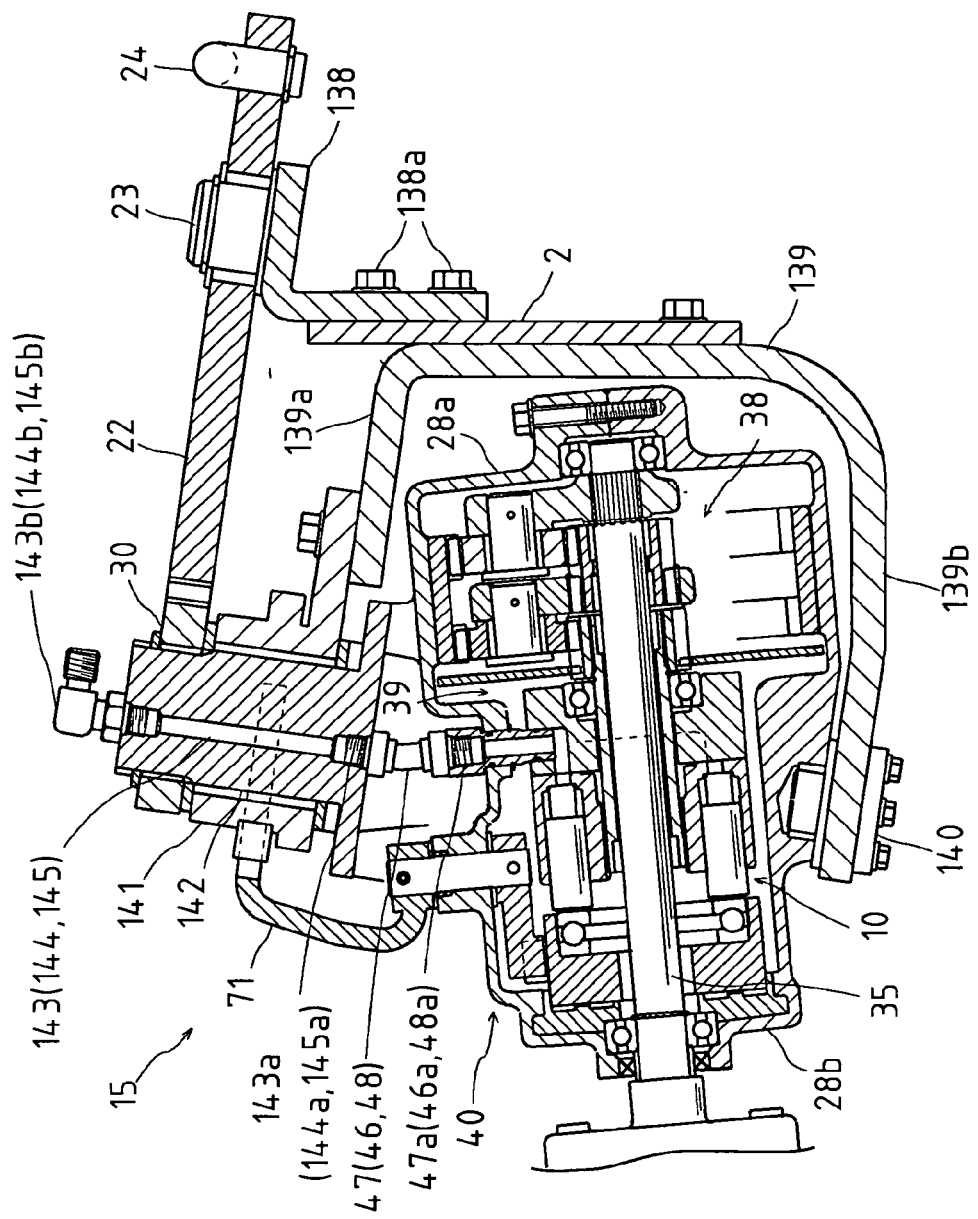
FIG. 22 is a sectional rear view of an alternative vertically shortened front transaxle 15 (left front transaxle 15L).

In comparison with transaxle 15 shown in FIG. 3, the turning range of transaxle 15 shown in FIG. 22 is restricted by bracket 139. The small-sizing of vehicle 1 recovers the restriction of turning range of transaxles 15 so as to reduce the turning circle of vehicle 1.

Three axial penetrating fluid holes 143, 144 and 145 are formed within kingpin block 142. Pipe couplings 143a, 144a and 145a are screwed into bottom openings of respective fluid holes 143, 144 and 145. Drain pipe 46 and hydraulic fluid pipes 47 and 48 are extended downward from respective pipe couplings 143a, 144a and 145a to pipe couplings 46a, 47a and 48a screwed into the top surface of transaxle housing 28. Pipe couplings 143b, 144b and 145b are screwed into top openings of respective fluid holes 143, 144 and 145. Hydraulic fluid pipes are extended from pipe couplings 144b and 145b to hydraulic pump 5, and a drain pipe is extended from pipe coupling 143b to an unshown fluid tank.

Brake wire 49 is passed therethrough another axial penetrating hole formed within kingpin block 142 so as to be connected to a braking manipulator such as a brake pedal, and to brake arm 68 pivoted above the top surface of transaxle housing 28 (see FIG. 12).

Long kingpin sleeve 27 of transaxle 15 shown in FIG. 3 may be replaced with a solid shaft penetrated by axial holes for passing fluid and brake wire 49, similar to short kingpin block 142 shown in FIG. 22.

Figure 23:
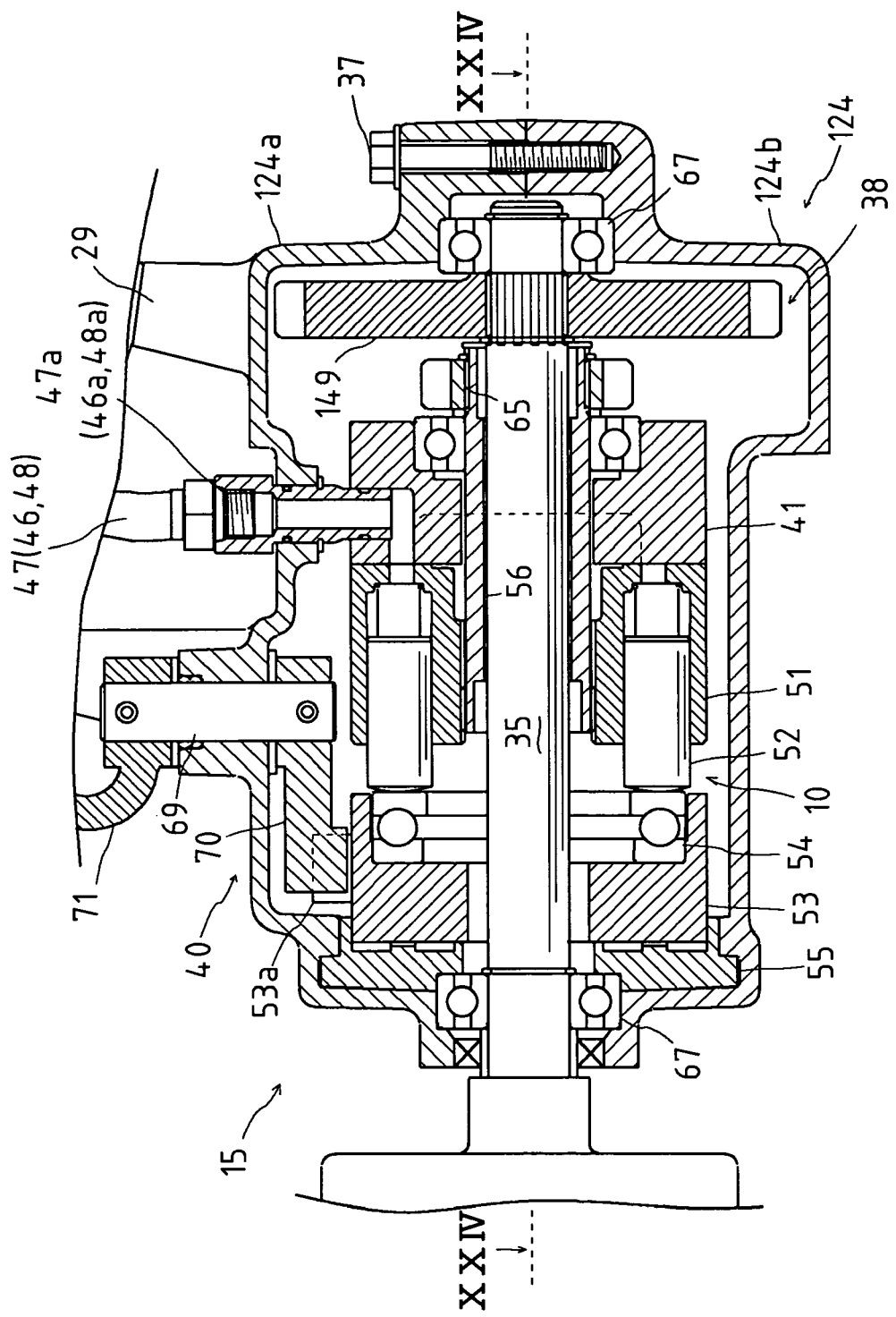
FIG. 23 is a sectional rear view of a lower portion of an alternative front transaxle 15, showing an alternative housing 124 incorporating hydraulic motor 10 and an alternative axially shortened deceleration gear train 38.
Figure 24:
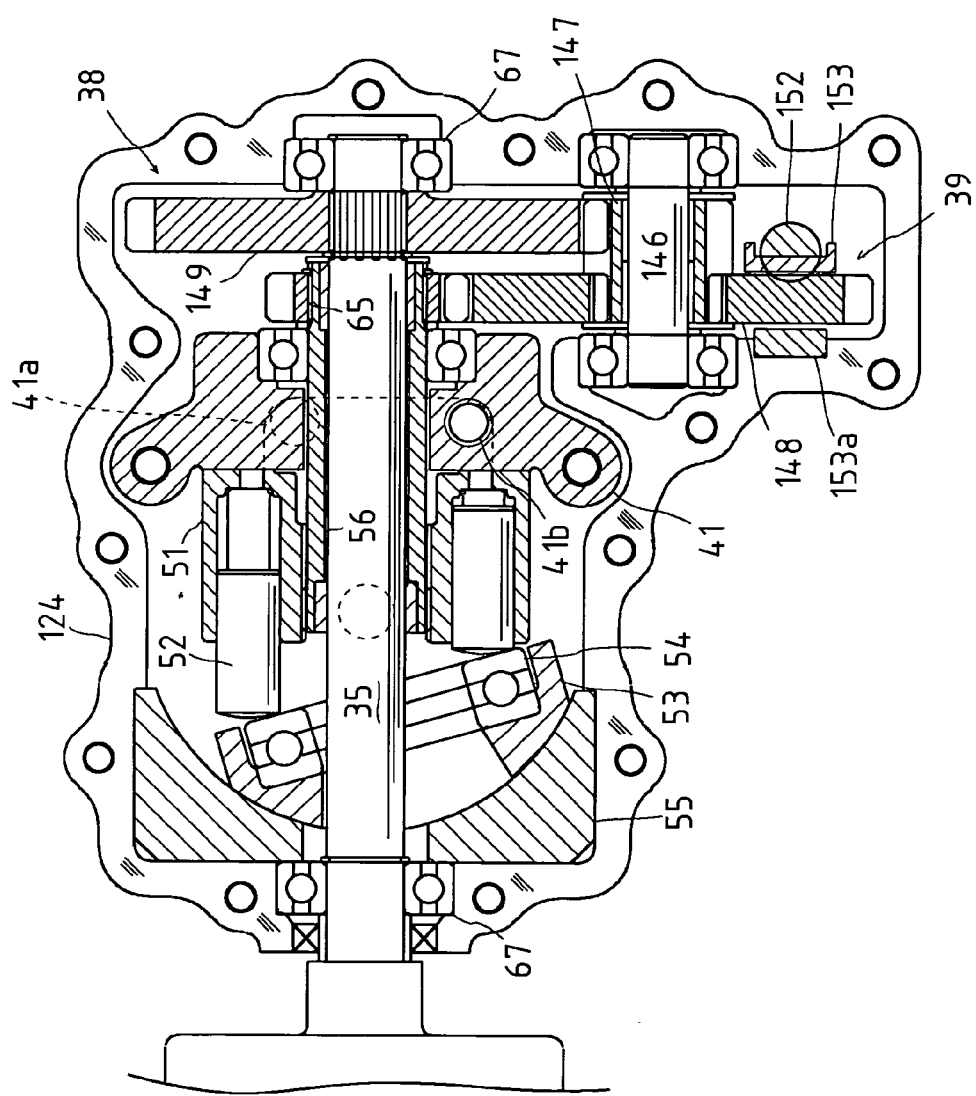
FIG. 24 is a cross sectional view taken along a XXIV-XXIV line of FIG. 23.
Figure 25:
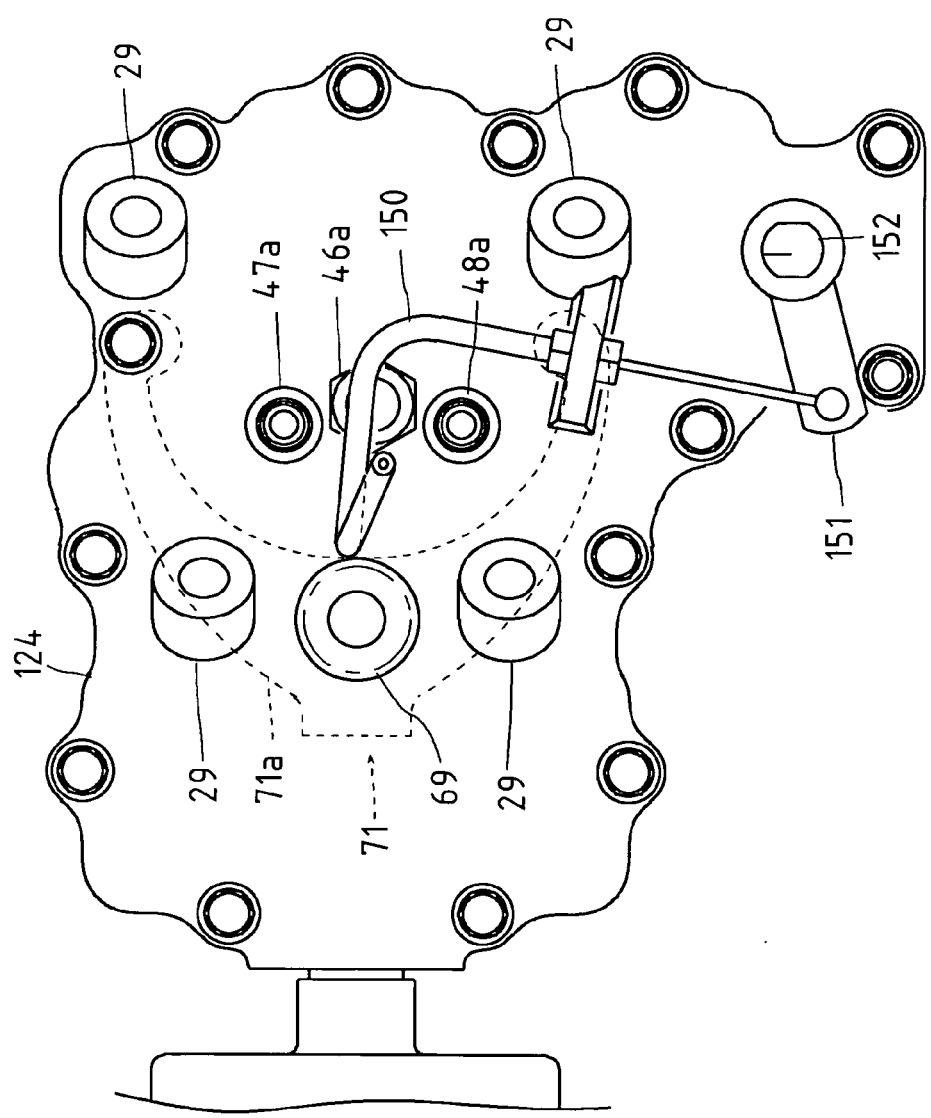
FIG. 25 is a plan view of transaxle housing 124 of transaxle 15 shown in FIG. 23.

Referring to FIGS. 23 to 25, transaxle 15 including alternative economic deceleration gear train 38 will be described. A housing 124 incorporating hydraulic motor 10 is constituted by upper and lower housing halves 124a and 124b joined to each other through a horizontal joint surface on which the center axis of axle 35 is disposed. Axle 35 is journalled by upper and lower housing halves 124a and 124b through opposite bearings 67. Horizontal motor sleeve 56 is coaxially and relatively rotatably fitted on axle 35. Cylinder block 51 is spline-fitted on motor sleeve 56 and slidably rotatably fitted onto center section 41. Motor sleeve 56 relatively rotatably penetrates center section 41, and its proximal end projects outward from center section 41 opposite to cylinder block 51 so as to be fixedly provided thereon with motor gear 65. A diametrically large gear 149 is fixed (spline-fitted) on axle 35 between the proximal end of motor sleeve 56 and bearing 67.

As shown in FIG. 24, a horizontal counter shaft 146 is journalled between upper and lower housing halves 124a and 124b in parallel to axle 35 through opposite bearings. A long and diametrically small gear 147 is fixed on counter shaft 146. A gear 148, which is diametrically larger than motor gear 65, is spline-fitted on gear 147 and meshes with motor gear 65. Gear 149 meshes with gear 147 in parallel to mutually meshing gears 65 and 148. In this way, deceleration gear train 38 transmits the rotary force of motor sleeve 56 to axle 35 through gears 65, 148, 147 and 149 in order.

As shown in FIG. 24, alternative brake assembly 39, including a vertical camshaft 152, a pressure plate 153 and a brake pad 153a, is provided for braking gear 148. Brake pad 153a is fitted in walls of upper and lower housing halves 124a and 124b opposite to pressure plate 153 with respect to gear 148. As shown in FIG. 25, camshaft 152 projects upward from housing 124 so as to be fixedly provided thereon with an arm 151. A brake wire 150 is interposed between arm 151 and an unshown braking manipulator. By operating the braking manipulator, camshaft 152 is rotated to press pressure plate 153 against gear 148, thereby braking axle 35.

In transaxle 15 shown in FIGS. 7 and 8, deceleration gear train 38 includes carriers 58 and 62 with planetary gears 57 and 61, and brake assembly 39 is disposed between deceleration gear train 38 and center section 41, so that the span between motor gear 65 (the first element of deceleration gear train 38) and carrier 62 (the final element of deceleration gear train 38) becomes long, thereby axially elongating transaxle 15.

On the contrary, referring to FIGS. 23 and 24, the axial length of deceleration gear train 38 between motor gear 65 (the first element of deceleration gear train 38) and gear 149 (the final element of deceleration gear train 38) is shorter than that of planetary deceleration gear train 38 shown in FIGS. 7 and 8, and brake assembly 39 is disposed in the dead space adjacent to gear 148 and opposite to gear 149 with respect to gear 147. As a result, housing 124 is axially shorter than transaxle housing 28 so as to constitute axially short transaxle 15. Such an axially short transaxle 15 facilitates steering of vehicle 1, and contributes for small-sizing of vehicle 1. Further, the parts count and cost of deceleration gear train 38 shown in FIGS. 23 and 24 are reduced in comparison with planetary deceleration gear train 38 shown in FIGS. 7 and 8. Such a construction of front transaxle 15, including deceleration gear train 38 shown in FIGS. 23 to 25, is applicable to rear transaxle 13.

Figure 27:
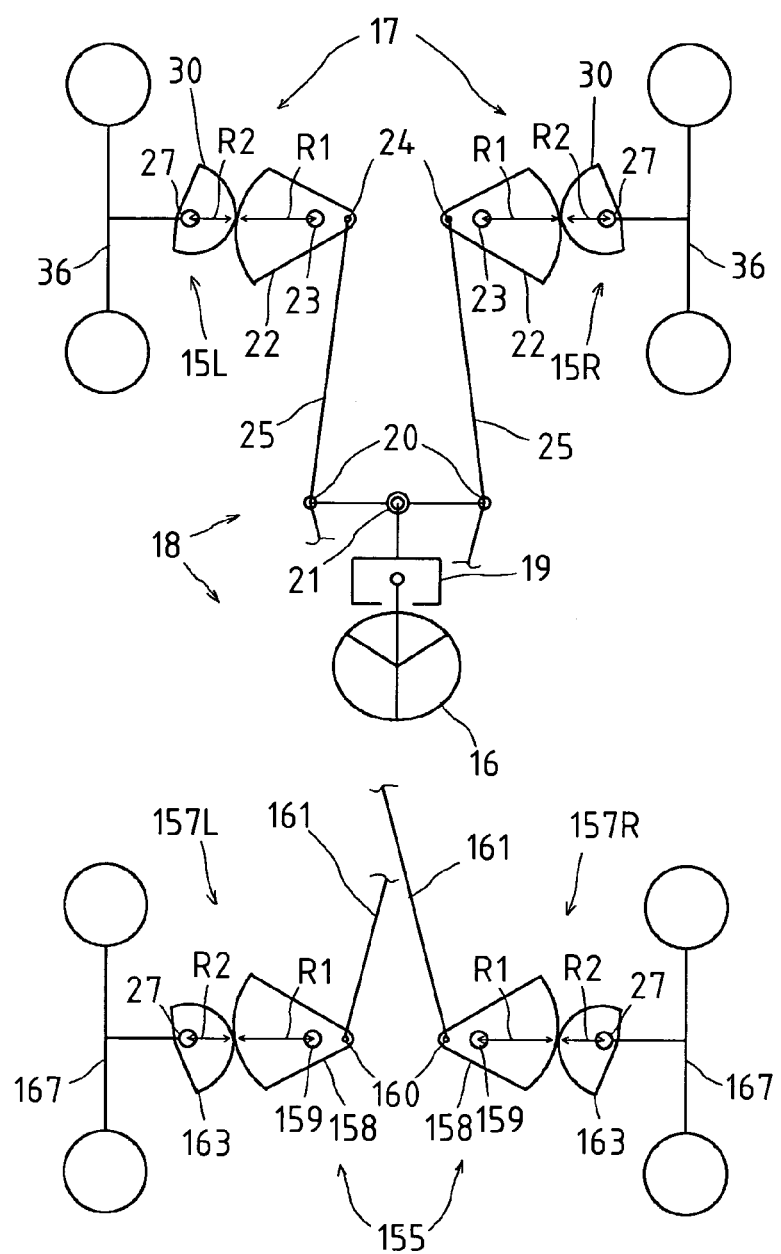
FIG. 27 is a diagram of an alternative steering linkage 18 of vehicle 1 of FIG. 26 including left and right front steering gear trains 17 and left and right rear steering gear trains 155, when vehicle 1 is directed straight.
Figure 28:
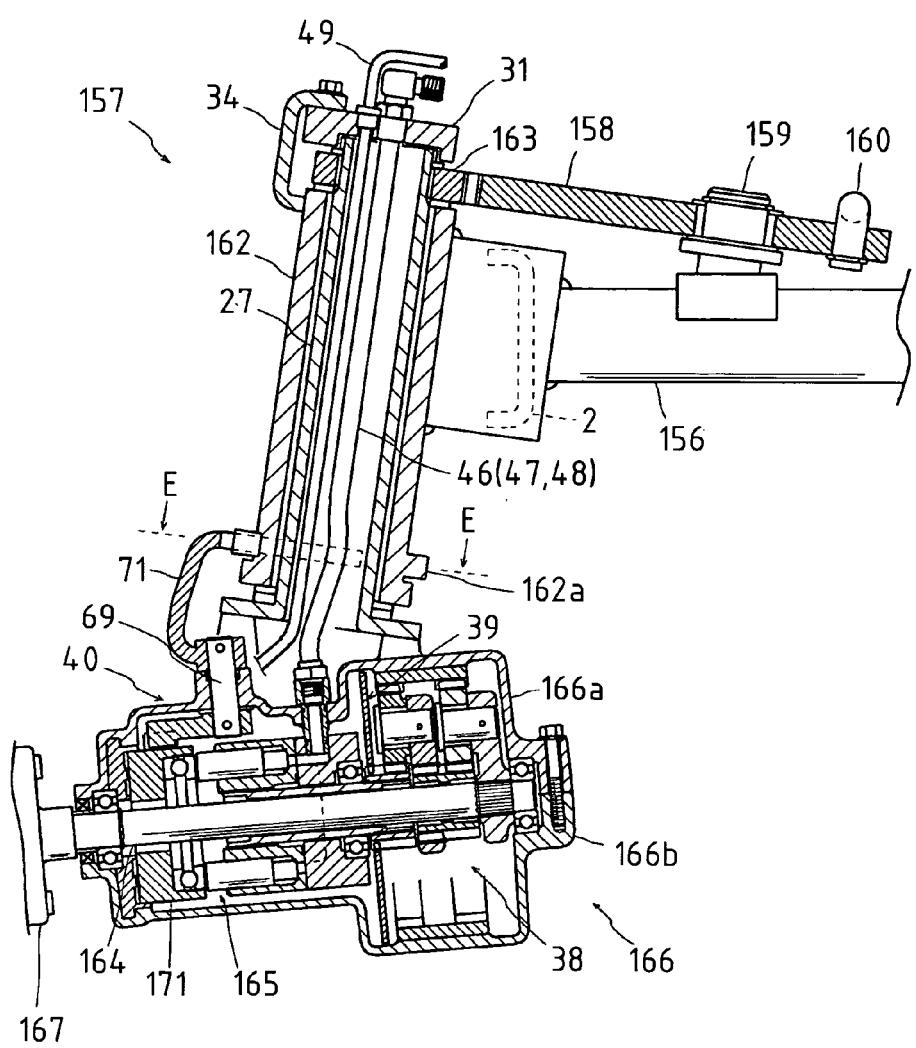
FIG. 28 is a sectional rear view of rear transaxle 157 (left rear transaxle 157L), showing a housing 166 incorporating a hydraulic motor 165 for driving rear wheel 167.
Figure 29:
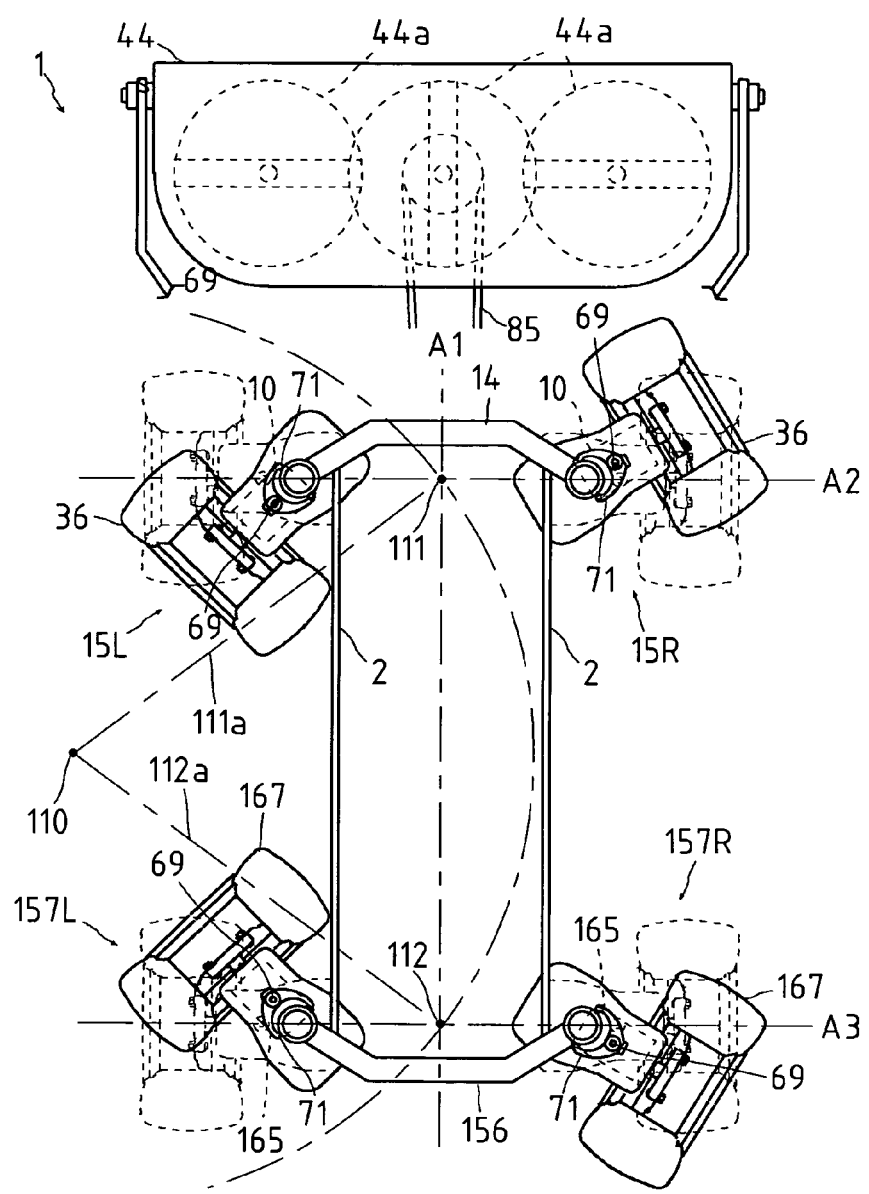
FIG. 29 is a schematic plan view of vehicle 1 shown in FIG. 26 when vehicle 1 turns left.
Figure 30:
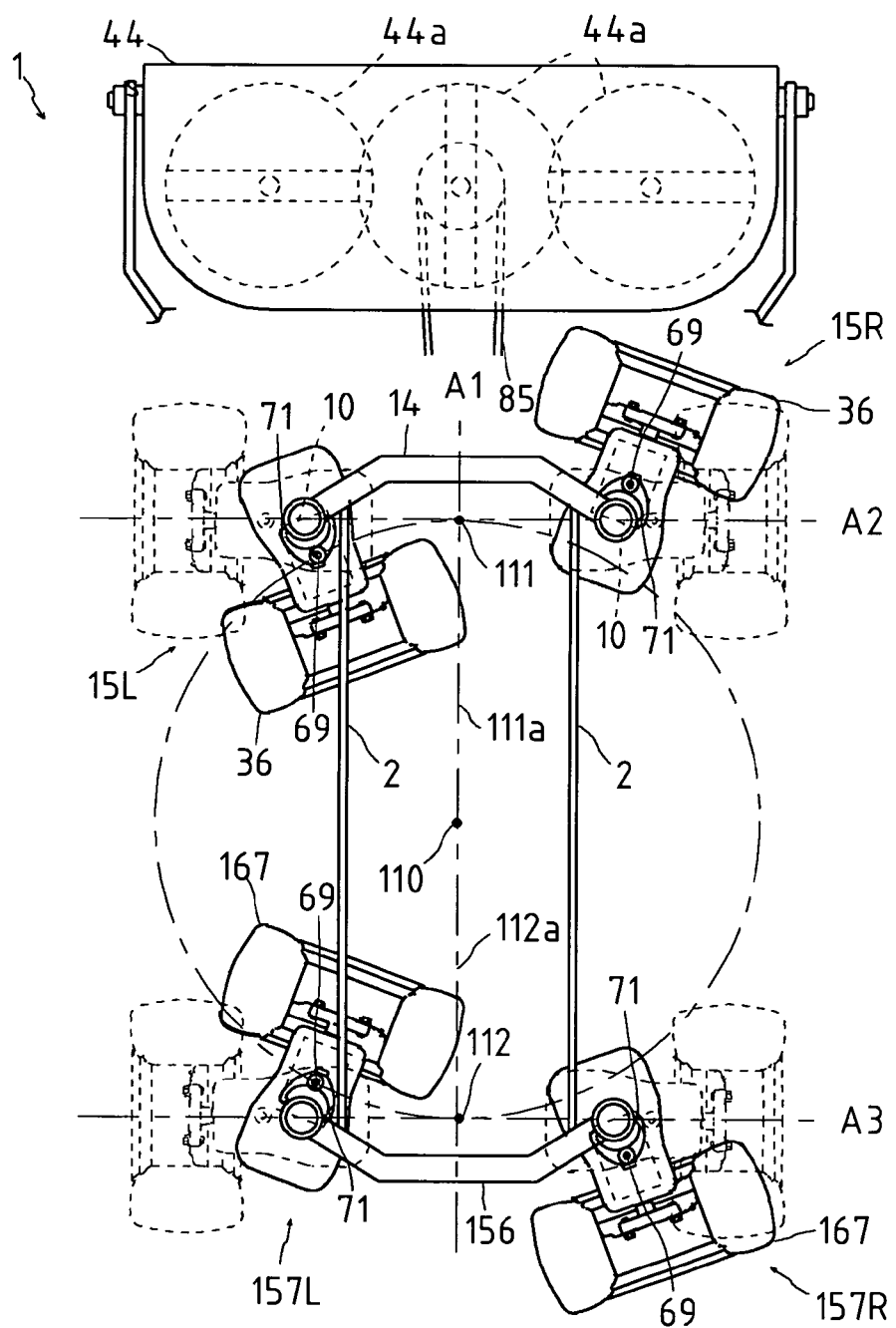
FIG. 30 is a schematic plan view of vehicle 1 shown in FIG. 26 when vehicle 1 spins.

Alternative four-wheel driving and steering vehicle 1 shown in FIGS. 26 to 36 will be described. Similar to the above embodiments, left and right front transaxles 15L and 15R with front wheels 36 are steerably supported by front cross member 14 on the front end of side frames 2. Further, in this embodiment, left and right rear transaxles 157L and 157R (generically named as "rear transaxles 157") with rear wheels 167 (rear wheel 167 on the turning inside of vehicle 1 is referred to as "inside rear wheel 167", and rear wheel 167 on the turning outside of vehicle 1 is referred to as "outside rear wheel 167") are steerably supported by a rear cross member 156 on the rear end of side frames 2. Vehicle 1 having steerable front transaxles 15 and rear transaxles 157 can turn on a very small circle as shown in FIG. 29. Extremely, it can spin as shown in FIG. 30. Transaxle 157 includes a transaxle housing 166 incorporating an axle 164 and a hydraulic motor 165 for driving axle 164. Rear wheels 167 are fixed on respective axles 164.

Figure 26:
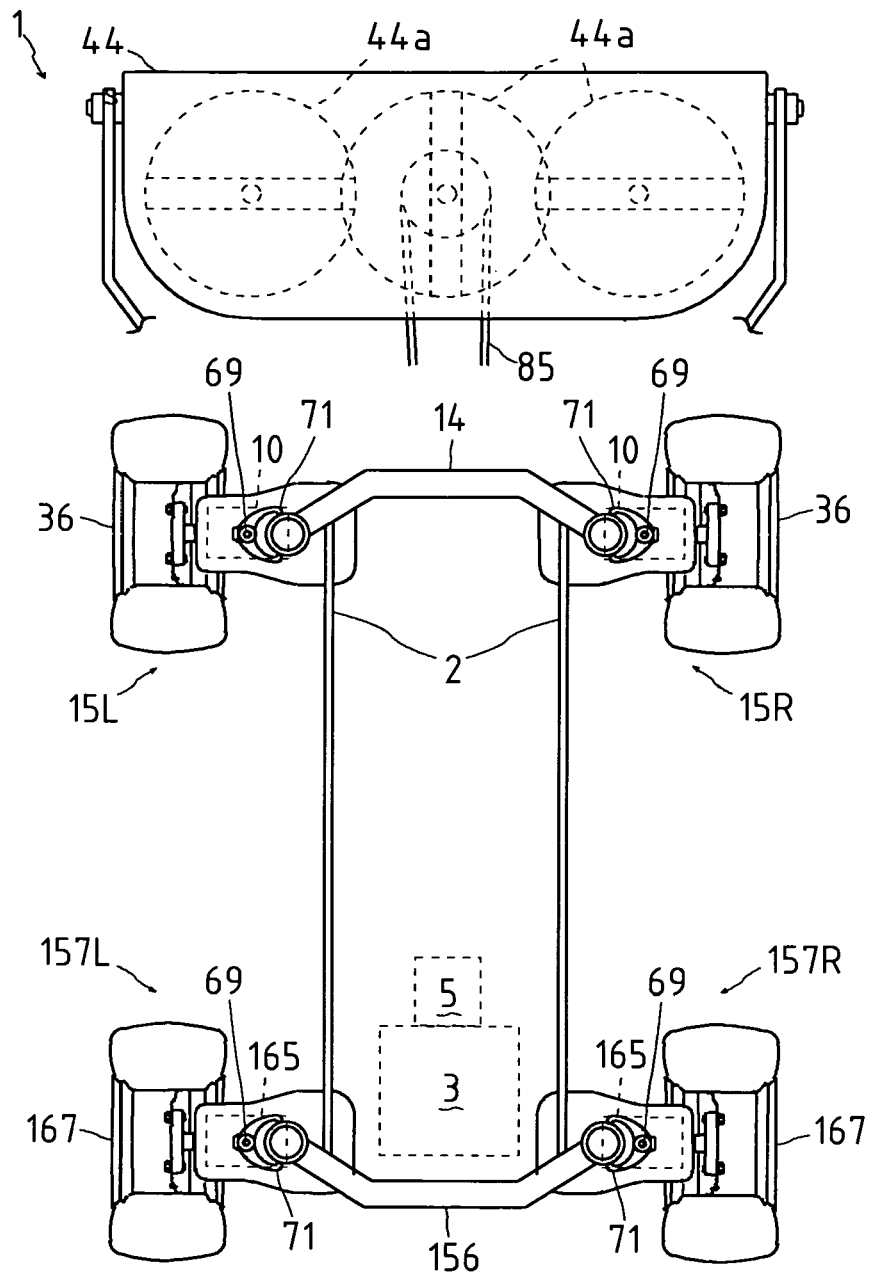
FIG. 26 is a schematic plan view of an alternative four-wheel driving and steering vehicle 1 having left and right steerable front transaxles 15 (15L and 15R) with respective front wheels 36 and left and right steerable rear transaxles 157 (157L and 157R) with respective rear wheels 167 when vehicle 1 is directed straight.

As shown in FIG. 26, vehicle 1 is provided with a front-mount mower 44 in front of the chassis (the front ends of side frames 2). Mower 44 is drivingly connected to engine 3 through a drive belt 85 for driving its rotary blades 44a.

Steering linkage 18 including right and left steering gear trains 17 is interposed between steering wheel 16 and respective front wheels 36, similar to FIG. 2. Similar to steering gear trains 17, right and left steering gear trains 155 are interposed between steering wheel 16 and respective rear wheels 167, as shown in FIG. 27. Front steering gear trains 17 and rear steering gear trains 155 are distributed symmetrically in the longitudinal direction of vehicle 1.

Right and left steering gear trains 155 are disposed above cross member 156. As shown in FIGS. 27 and 28, each steering gear train 155 includes mutually meshing sector gears 158 and 163. Sector gear 158 has a toothed distal edge meshing with sector gear 163, and has a joint pin 160 at its proximal end. Link rods 161 are pivotally extended from respective joint pins 160, cross each other, and are pivotally connected to opposite ends of connection rod 20. Sector gear 158 is pivoted on a pivot shaft 159 projecting upward from rear cross member 156 between the toothed distal edge of sector gear 158 and proximal joint pin 160, as show in FIG. 28.

A kingpin support casing 162 is fixed onto each of right and left ends of cross member 156. Kingpin sleeve 27 having top and bottom open ends is coaxially disposed in kingpin support casing 162 so as to be substantially horizontally rotatable around its substantially vertical center axis. A top portion of kingpin sleeve 27 projects upward from kingpin support casing 162 so as to be fixedly provided thereon with sector gear 163. Therefore, kingpin sleeve 27 serves as the pivot shaft of sector gear 163. A bottom portion of kingpin sleeve 27 projects downward from kingpin support casing 162 so as to be fixed to transaxle housing 166 of transaxle 157. Therefore, housing 166 of transaxle 157 is rotatable integrally with sector gear 163 and kingpin sleeve 27 relative to the chassis including side frames 2 and cross member 156.

As shown in FIG. 27, sector gears 158 and 163 of right and left steering gear trains 155 are disposed laterally symmetrically when vehicle 1 is directed straight, i.e., when steering wheel 16 is disposed at its neutral (or straight traveling) position.

When steering wheel 16 is rotated for turning of vehicle 1, one end of connection rod 20 on the turning inside of vehicle 1 is rotated rearward so as to rearwardly pull link rod 25 and the proximal end of sector gear 22 on the turning inside of vehicle 1, and to rearwardly push link rod 161 and the proximal end of sector gear 158 on the turning outside of vehicle 1. Simultaneously, the other end of connection rod 20 on the turning outside of vehicle 1 is rotated forward so as to forwardly push link rod 25 and the proximal end of sector gear 22 on the turning outside of vehicle 1, and to forwardly pull link rod 161 and the proximal end of sector gear 158 on the turning inside of vehicle 1.

As a result, as shown in FIG. 29, during the turning of vehicle 1, inside wheel 36 is turned rearward, inside wheel 167 is turned forward, outside wheel 36 is turned forward, and outside wheel 167 is turned rearward.

As shown in FIG. 27, mutually meshing sector gears 158 and 163 is so shaped as to ensure their gear ratio similar to that between mutually meshing sector gears 22 and 30, as mentioned above. In this regard, the gear ratio of mutually meshing sector gears 158 and 163 is defined as a ratio of a radius R2 of sector gear 163 to a radius R1 of sector gear 158 on a line between center axes of pivot shaft 159 and kingpin sleeve 27. Radius R1 of sector gear 158 is defined as a distance between the center axis of pivot shaft 159 and its toothed edge, and radius R2 of sector gear 163 is defined as a distance between the center axis of kingpin sleeve 27 and its toothed edge.

As mutually meshing toothed edges of sector gears 158 and 163 are rotated forward, the ratio of radius R2 to radius R1 is increased so as to reduce the increase rate of the turning angle of corresponding wheel 167. As mutually meshing toothed edges of sector gears 22 and 33 are rotated rearward, the ratio of radius R2 to radius R1 is reduced so as to increase the increase rate of the turning angle of corresponding wheel 167. Therefore, the gear ratio of inside wheel 167 becomes larger than that of outside wheel 167. As the rotational angle of steering wheel 16 from the neutral position is increased, the difference of turning angle between inside wheel 167 and outside wheel 167 becomes larger.

In this way, the turning angle of forwardly turned inside rear wheel 167 becomes the same as that of rearwardly turned inside front wheel 36, and the turning angle of rearwardly turned outside rear wheel 167 becomes the same as that of forwardly turned outside front wheel 36. In other words, as shown in FIG. 29, turning center 110 is disposed on the longitudinally middle line of vehicle 1 between middle point 111 of front wheels 36 (cross point 111 between lines A1 and A2) and middle point 112 of rear wheels 167 (cross point 112 between lines A1 and A3) so that turning radius 112a of rear wheels 167 becomes the same as turning radius 111a of front wheels 36. Namely, the turning circle of rear wheels 167 agrees with that of front wheels 36 (all wheels 36 and 167 turn along a common circle).

When steering wheel 16 is fully rotated for turning of vehicle 1, turning center 110 reaches middle line A1 so that all wheels 36 and 167 turn along a common circle centering on the center of vehicle 1, i.e., vehicle 1 spins, as shown in FIG. 30.

Further, during the turning of vehicle 1, the rotary speed of rear wheels 167 can be as large as that of front wheels 36, whereby change of displacement of hydraulic motors 10 or 165 is not required to make a difference of rotary speed between front wheels 36 and rear wheels 167. Therefore, hydraulic motors 10 and 165 may be fixed in displacement.

However, to prevent unstable high-speed turning of vehicle 1, front transaxles 15 incorporate respective variable displacement hydraulic motors 10 with movable swash plates 53, and rear transaxles 157 incorporate respective variable displacement hydraulic motors 165 with movable swash plates 171. Motor control linkages 40 of respective transaxles 15 and 157 for controlling the tilt angles of swash plates 53 and 171 are so constructed as to increase the tilt angles of swash plates 53 and 171, i.e., to reduce the rotary speeds of hydraulic motors 10 and 165, according to increase of turning angle of steering wheel 16.

Figure 31:
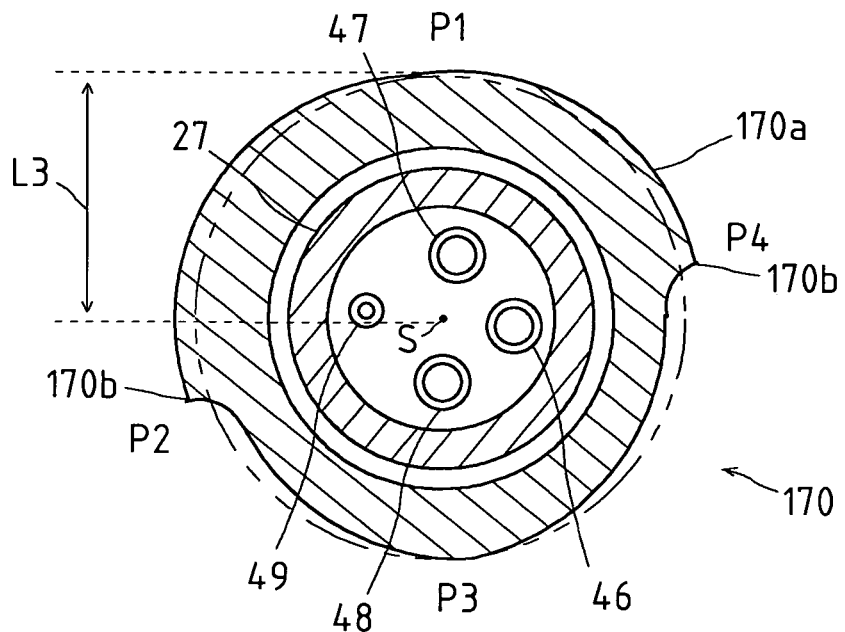
FIG. 31 is an axially sectional view of an alternative kingpin support casing 170 and kingpin sleeve 27 of front transaxle 15 in vehicle 1 shown in FIG. 26, wherein a cam 170a is formed on kingpin support casing 170.

Each of front transaxles 15 is provided with an alternative kingpin support casing 170 formed on an outer peripheral surface thereof with a cam 170a, as shown in FIG. 31. Cam 26a of kingpin support casing 26 shown in FIG. 10 is shaped so as to reduce the tilt angle of movable swash plate 53 according to increase of turning angle of steering wheel 16. Cam 170a shown in FIG. 31 is shaped symmetrically in the longitudinal direction of vehicle 1 in comparison with cam 26a shown in FIG. 10.

As shown in FIG. 31, four points P1, P2, P3 and P4 divide the peripheral surface of each cam 170a into four substantially quarter ranges, similar to those of cam 26a shown in FIG. 10. That is, point P1 is the front end point, and point P3 is the rear end point. Cam 170a has steps 170b on respective points P2 and P4 such as to serve as stoppers for nodular ends 71b of clamping portion 71a of motor control arm 71 sliding along the peripheral surface of cam 170a. The longer ranges between points P1 and P2 and between points P3 and P4 are provided for sliding of nodular ends 71b of clamping portion 71*a* of motor control arm 71 when corresponding wheel 36 is disposed on the turning inside of vehicle 1. The shorter ranges between points P2 and P3 and between points P4 and P1 are provided for sliding of nodular ends 71*b* of clamping portion 71*a* of motor control arm 71 when corresponding wheel 36 is disposed on the turning outside of vehicle 1.

A basically circular line having constant radius L3 is drawn in a phantom line in FIG. 31. During the shift from point P1 to point P2, and from point P1 to point P4, distance L3 of the peripheral surface of cam 170*a* is increased so as to increase its deviation from the basically circular line. During the shift from point P3 to point P2, and from point P3 to point P4, distance L3 of the peripheral surface of cam 170*a* is reduced so as to increase its deviation from the basically circular line.

Since illustrated cam 170*a* is formed for left front transaxle 15L, the long range between P1 and P2 is disposed left, and the short range between P1 and P4 right. If cam 170*a* is provided for right front transaxle 15R, the long ranges are exchanged for the short ranges in their right and left positional relation.

Figure 33:
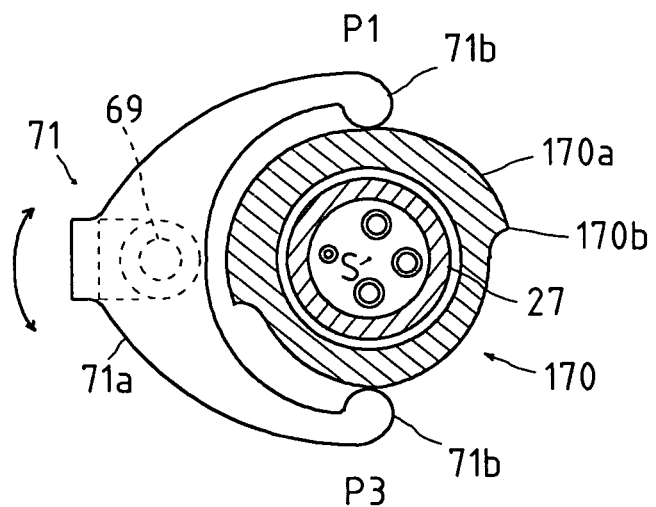
FIG. 33(a) is an axially sectional view of clamping portion 71a of motor control arm 71 clamping cam 170a when steering wheel 16 is disposed at a straight traveling position.
FIG. 33(b) is an axially sectional view of clamping portion 71a of motor control arm 71 clamping cam 170a when steering wheel 16 is rotated so as to direct corresponding front wheel 36 on the turning inside of vehicle 1.
FIG. 33(c) is an axially sectional view of clamping portion 71a of motor control arm 71 clamping cam 170a when steering wheel 16 is rotated so as to direct corresponding front wheel 36 on the turning outside of vehicle 1.
Figure 33:
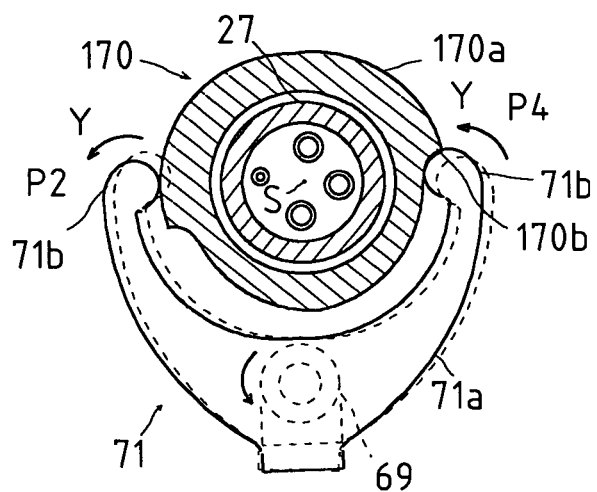
Figure 33:
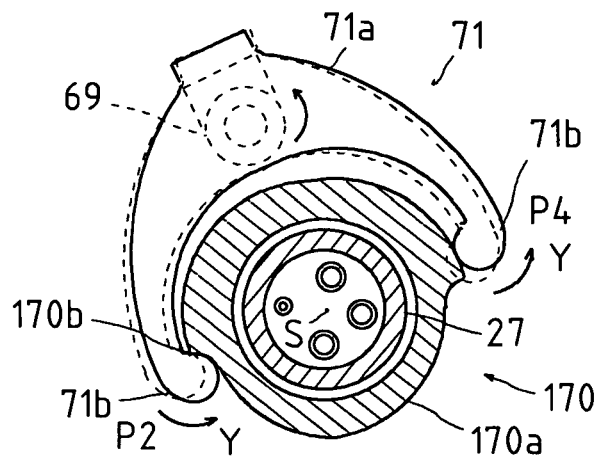

As shown in FIG. 33(*a*), when steering wheel 16 is disposed at the neutral (straight traveling) position, nodular ends 71*b* abut against cam 170*a* on points P1 and P3.

By rotating steering wheel 16 leftward from the straight traveling position, left transaxle 15L with wheel 36 on the turning inside of vehicle 1 turns leftward, so that nodular ends 71*b* slide along cam 170*a* in the long ranges from point P1 to point P2 and from point P3 to point P4. During the sliding of nodular ends 71*b* on cam 170*a*, nodular end 71*b* on the range between points P1 and P2 moves away from center axis S of kingpin sleeve 27, and nodular end 71*b* on the range between points P3 and P4 moves toward center axis S of kingpin sleeve 27. Finally, nodular end 71*b* sliding between points P1 and P2 reaches step 170*b* on point P2, and nodular end 71*b* sliding between points P3 and P4 reaches step 170*b* on point P4, as shown in FIG. 33(*b*), thereby defining the maximum left (inside) turning angle of left transaxle 15L with wheel 36.

By rotating steering wheel 16 rightward from the straight traveling position, left transaxle 15L with wheel 36 on the turning outside of vehicle 1 turns rightward, so that nodular ends 71*b* slide along cam 170*a* in the short ranges from point P1 to point P4 and from point P3 to point P2. During the sliding of nodular ends 71*b* on cam 170*a*, nodular end 71*b* on the range between points P1 and P4 moves away from center axis S of kingpin sleeve 27, and nodular end 71*b* on the range between points P3 and P2 moves toward center axis S of kingpin sleeve 27. Finally, nodular end 71*b* sliding between points P1 and P4 reaches step 170*b* on point P4, and nodular end 71*b* sliding between points P3 and P2 reaches step 170*b* on point P2, as shown in FIG. 33(*c*), thereby defining the maximum right (outside) turning angle of left transaxle 15L with wheel 36.

The movement of nodular ends 71*b*, depending upon the deviation of cam 170*a* from the basically circular line, causes the rotation of control shaft 69 fixed to motor control arm 71 relative to transaxle housing 28, thereby moving swash plate 53. Whether steering wheel 16 is rotated right or left, nodular ends 71*b* moves in a common direction Y arrowed in FIG. 33(*b*) and FIG. 33(*c*) so as to increase the tilt angle of swash plate 53, i.e., increase the displacement of hydraulic motor 10, thereby decelerating front wheels 36.

Figure 32:
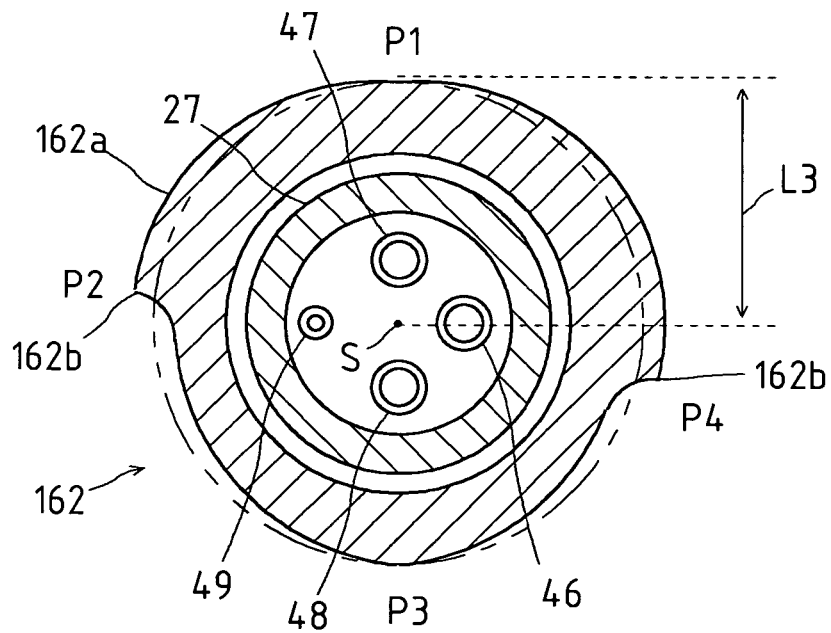
FIG. 32 is an axially sectional view of a kingpin support casing 162 and kingpin sleeve 27 of rear transaxle 157 in vehicle 1 shown in FIG. 26, wherein a cam 162a is formed on kingpin support casing 162.

Each of rear transaxles 157 is provided with an alternative kingpin support casing 162 formed on an outer peripheral surface thereof with a cam 162*a*, as shown in FIGS. 28 and 32. Cam 162*a* shown in FIG. 32 is shaped laterally symmetrically in comparison with cam 170*a* show in FIG. 31.

As shown in FIG. 32, four points P1, P2, P3 and P4 divide the peripheral surface of each cam 162*a* into four substantially quarter ranges, similar to those of cam 170*a* shown in FIG. 31. Cam 162*a* has steps 162*b* on respective points P2 and P4 such as to serve as stoppers for nodular ends 71*b* of clamping portion 71*a* of motor control arm 71 sliding along the peripheral surface of cam 162*a*. The longer ranges between points P1 and P4 and between points P2 and P3 are provided for sliding of nodular ends 71*b* of clamping portion 71*a* of motor control arm 71 when corresponding wheel 167 is disposed on the turning inside of vehicle 1. The shorter ranges between points P1 and P2 and between points P3 and P4 are provided for sliding of nodular ends 71*b* of clamping portion 71*a* of motor control arm 71 when corresponding wheel 167 is disposed on the turning outside of vehicle 1.

A basically circular line having constant radius L3 is drawn in a phantom line in FIG. 32. During the shift from point P1 to point P2, and from point P1 to point P4, distance L3 of the peripheral surface of cam 162*a* is increased so as to increase its deviation from the basically circular line. During the shift from point P3 to point P2, and from point P3 to point P4, distance L3 of the peripheral surface of cam 162*a* is reduced so as to increase its deviation from the basically circular line.

Since illustrated cam 162*a* is formed for left rear transaxle 157L, the short range between P1 and P2 is disposed left, and the long range between P1 and P4 is disposed right. If cam 162*a* is provided for right rear transaxle 157R, the long ranges are exchanged for the short ranges in their right and left positional relation.

Figure 34:
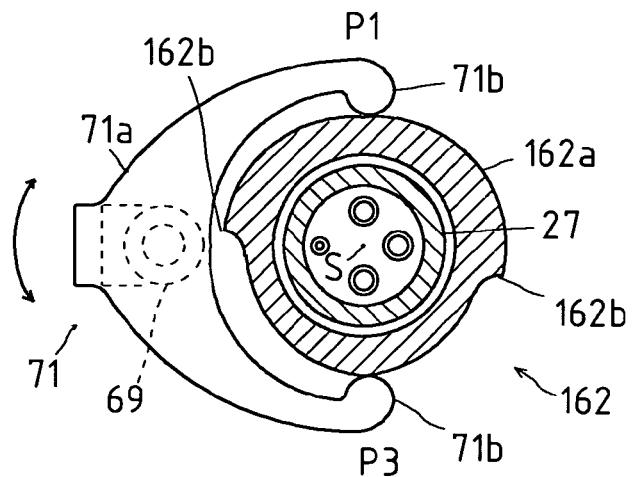
FIG. 34(a) is an axially sectional view of clamping portion 71a of motor control arm 71 clamping cam 162a when a steering wheel 16 is disposed at a straight traveling position.
FIG. 34(b) is an axially sectional view of clamping portion 71a of motor control arm 71 clamping cam 170a when steering wheel 16 is rotated so as to direct corresponding rear wheel 167 on the turning inside of vehicle 1.
FIG. 34(c) is an axially sectional view of clamping portion 71a of motor control arm 71 clamping cam 162a when steering wheel 16 is rotated so as to direct corresponding rear wheel 167 on the turning outside of vehicle 1.
Figure 34:
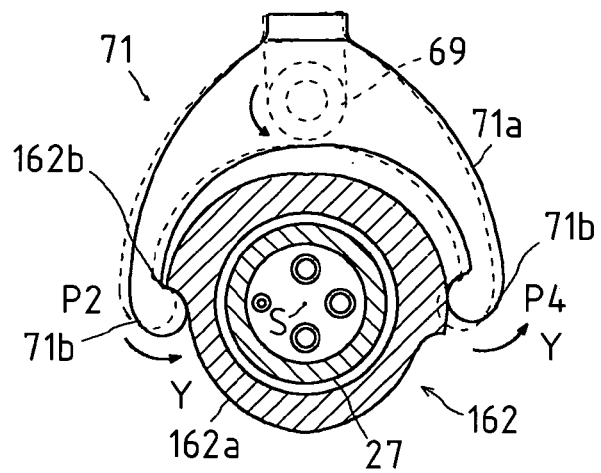
Figure 34:
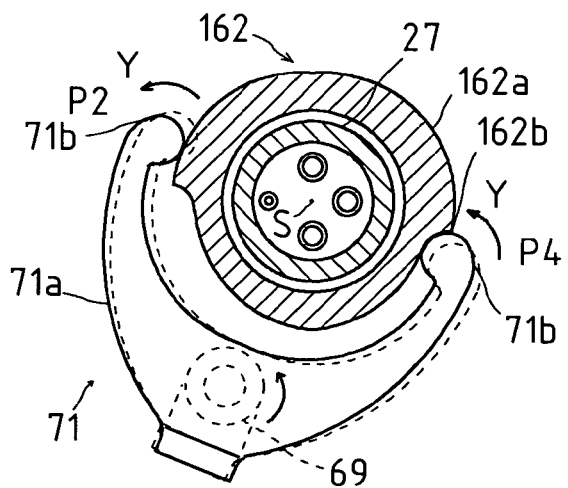

As shown in FIG. 34(*a*), when steering wheel 16 is disposed at the neutral (straight traveling) position, nodular ends 71*b* abut against cam 162*a* on points P1 and P3.

By rotating steering wheel 16 leftward from the straight traveling position, left transaxle 157L with wheel 167 on the turning inside of vehicle 1 turns rightward, so that nodular ends 71*b* slide along cam 162*a* in the long ranges from point P1 to point P4 and from point P3 to point P2. During the sliding of nodular ends 71*b* on cam 162*a*, nodular end 71*b* on the range between points P1 and P4 moves away from center axis S of kingpin sleeve 27, and nodular end 71*b* on the range between points P2 and P3 moves toward center axis S of kingpin sleeve 27. Finally, nodular end 71*b* sliding between points P1 and P4 reaches step 162*b* on point P4, and nodular end 71*b* sliding between points P3 and P2 reaches step 162*b* on point P2, as shown in FIG. 34(*b*), thereby defining the maximum right (inside) turning angle of left transaxle 157L with wheel 167.

By rotating steering wheel 16 rightward from the straight traveling position, left transaxle 157L with wheel 167 on the turning outside of vehicle 1 turns leftward so that nodular ends 71*b* slide along cam 162*a* in the short ranges from point P1 to point P2 and from point P3 to point P4. During the sliding of nodular ends 71*b* on cam 162*a*, nodular end 71*b* on the range between points P1 and P2 moves away from center axis S of kingpin sleeve 27, and nodular end 71*b* on the range between points P3 and P4 moves toward center axis S of kingpin sleeve 27. Finally, nodular end 71*b* sliding between points P1 and P2 reaches step 162*b* on point P2, and nodular end 71*b* sliding between points P3 and P4 reaches step 162*b* on point P4, as shown in FIG. 34(*c*), thereby defining the maximum left (outside) turning angle of left transaxle 157L with wheel 167.

The movement of nodular ends 71*b* depending upon the deviation of cam 162*a* from the basically circular line causes the rotation of control shaft 69 fixed to motor control arm 71 relative to transaxle housing 28, thereby moving swash plate 171. Whether steering wheel 16 is rotated right or left, nodular ends 71b moves in a common direction Y arrowed in FIG. 34(b) and FIG. 34(c) so as to increase the tilt angle of swash plate 171, i.e., increase the displacement of hydraulic motor 165, thereby decelerating rear wheels 167.

Figure 35:
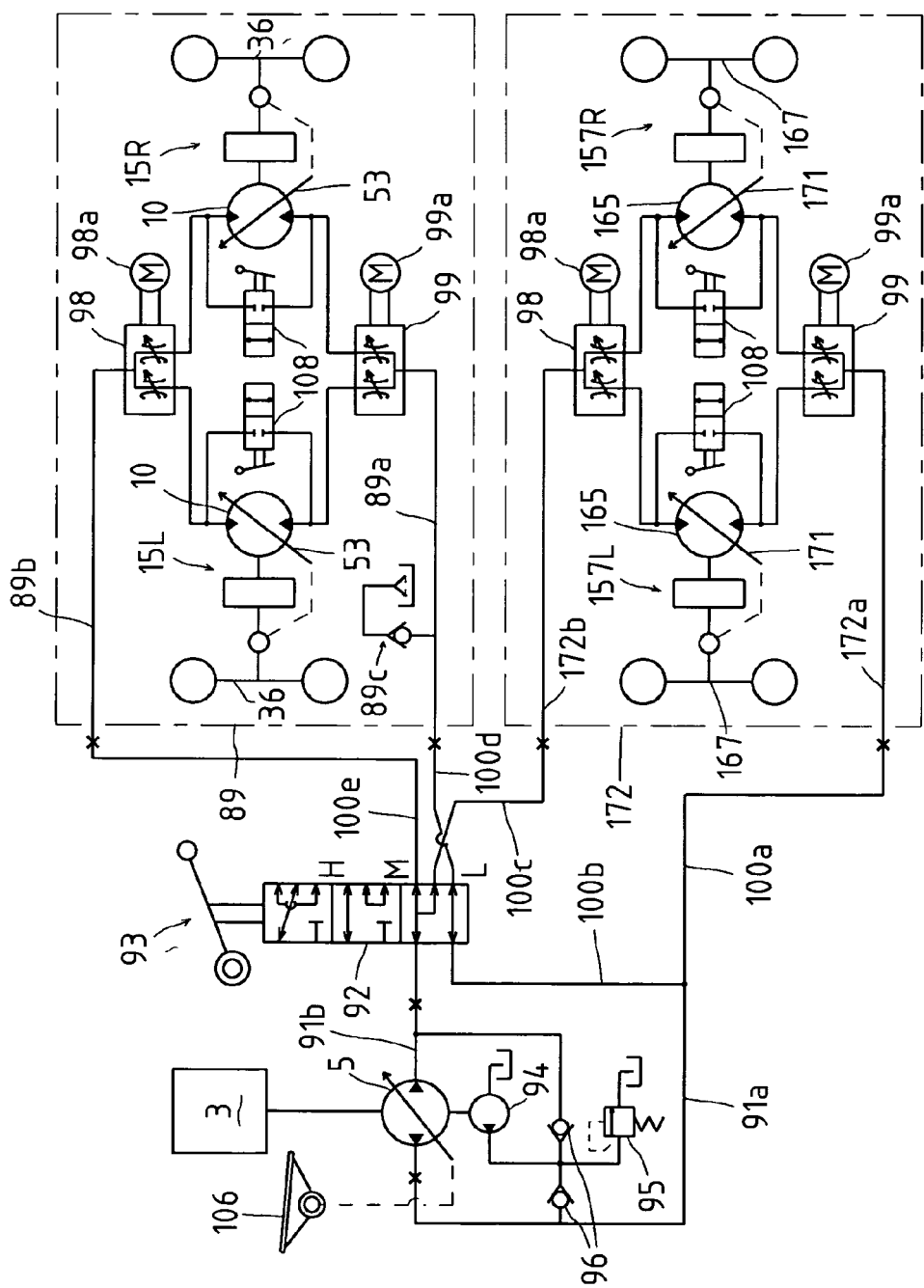
FIG. 35 is a diagram of a hydraulic circuit system of vehicle 1 shown in FIG. 26, comprising first hydraulic circuit 89 for the pair of hydraulic motors 10, an alternative second hydraulic circuit 172 for the pair of hydraulic motors 165 and the auxiliary speed changing system including auxiliary speed changing valve 92.
Figure 36:
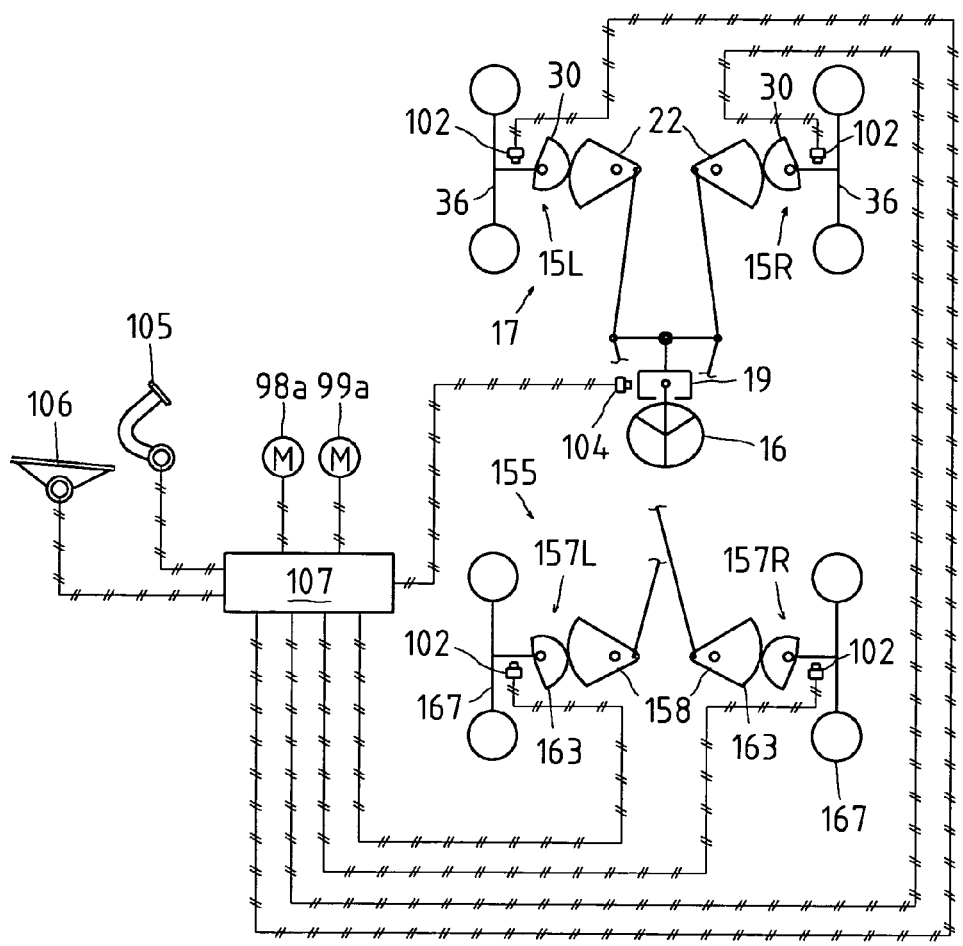
FIG. 36 is a diagram of an electric control system of vehicle 1 shown in FIG. 26 for controlling step motors 98a and 99a of flow control valves 98 and 99 shown in FIG. 35.

A hydraulic circuit system for vehicle 1 having front transaxles 15 and rear transaxles 157 is constructed such as shown in FIG. 35. The hydraulic circuit system comprises first hydraulic circuit 89 including the pair of parallel hydraulic motors 10 and an alternative second hydraulic circuit 172 including the pair of parallel hydraulic motors 165. Second hydraulic circuit 172 includes a hydraulic fluid passage 172a connected to passage 100a, and a hydraulic fluid passage 172b connected to passage 100c, so as to fluidly connect hydraulic motors 165 in parallel to hydraulic pump 5 through auxiliary speed changing valve 92.

When auxiliary speed changing valve 92 is disposed at low speed level position L, all hydraulic motors 10 and 165 are fluidly connected in parallel to hydraulic pump 5 so as to be supplied with respective quarters of fluid from hydraulic pump 5. When auxiliary speed changing valve 92 is disposed at middle speed level position M, the pair of parallel hydraulic motors 10 and the pair of parallel hydraulic motors 165 are fluidly connected in tandem to hydraulic pump 5 so that all the fluid from hydraulic pump 5 is distributed between the hydraulic motors 165, and distributed between the hydraulic motors 10.

When auxiliary speed changing valve 92 is disposed at high speed level position H, only the pair of hydraulic motors 165 are supplied with fluid from hydraulic pump 5. Additionally, the tilt angles of movable swash plates 171 may be reduced so as to increase the rotary speeds of hydraulic motors 165 according to the setting of auxiliary speed changing valve 92 at high speed level position H.

Similar to first and second hydraulic circuits 89 and 90 shown in FIG. 15, first and second hydraulic circuits 89 and 172 are provided with flow control valves 98 and 99 with respective step motors 98a and 99a controlled by controller 107, according to the rotational angle of steering wheel 16 detected by steering angle sensor 104, the rotary speeds of wheels 36 and 167 detected by respective rotary sensors 102, the traveling direction of vehicle 1 corresponding to the depressed direction of main speed changing pedal 106, and the depressed or undepressed state of differential locking pedal 105. Therefore, the differential rotation of front wheels 36 and the differential rotation of rear wheels 167 can be suitably restricted.

An alternative four-wheel driving and steering vehicle 1 shown in FIGS. 37 to 50 will be described. Similar to vehicle 1 shown in FIG. 1, vehicle 1 shown in FIG. 37 comprises a vehicle chassis including left and right side frames 2, engine 3, hydraulic pump 5, mower 4 disposed between front wheels 236 and rear wheels 279. Rear-discharging chute 74 is extended rearward from mower 4 above engine 3 and hydraulic pump 5. Hydraulic pump 5 is disposed in front of engine 3 so as to be drivingly connected to engine 3. The layout of engine 3, mower 4 and hydraulic pump 5 may be changed suitably.

As shown in FIGS. 37 to 40, front cross member 14 is laterally extended across the front end portions of side frames 2 and pivotally supported at its laterally middle top portion through a center pin 14a by the chassis so as to be vertically rotatable at its right and left ends around center pin 14a. Front cross member 14 steerably supports left and right front transaxles 215L and 215R (generically named as "front transaxles 215"), each of which incorporates a hydraulic motor 210 and supports a front wheel 236 driven by hydraulic motor 210. A rear cross member 278 is laterally extended across the rear end portions of side frames 2. Rear cross member 278 may be also pivotally supported by the chassis similar to front cross member 14, or may be fixed to the chassis. Rear cross member 278 steerably supports left and right rear transaxles 213L and 213R (generically named as "rear transaxles 213"), each of which incorporates a hydraulic motor 280 and supports a rear wheel 279 driven by hydraulic motor 280.

Figure 38:
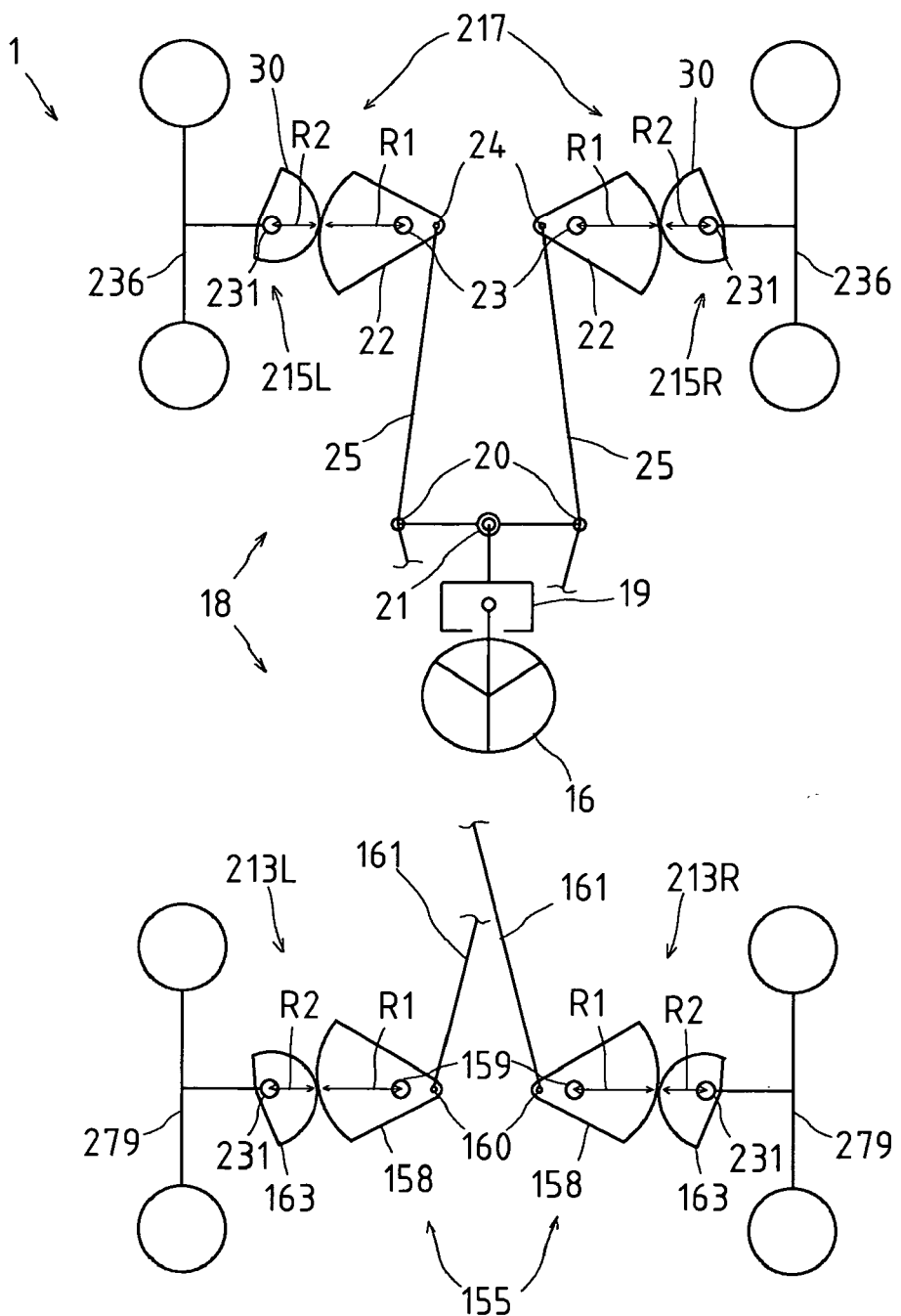
FIG. 38 is a diagram of an alternative steering linkage 18 of vehicle 1 of FIG. 37 including alternative left and right front steering gear trains 217 and left and right rear steering gear trains 155, when vehicle 1 is directed straight.

Steering linkage 18 shown in FIG. 38 interlockingly connects all transaxles 215 and 213 to steering wheels 16, similar to steering linkage 18 interlockingly connecting all transaxles 15 and 157 as shown in FIG. 27. Left and right steering gear trains 217, each of which includes mutually meshing sector gears 22 and 30, are disposed above front cross member 14, similar to left and right steering gear trains 17 shown in FIGS. 2 and 27. Left and right steering gear trains 155, each of which includes mutually meshing sector gears 158 and 163, are disposed above rear cross member 278, similar to those disposed above rear cross member 156 as shown in FIG. 27.

Figure 41:
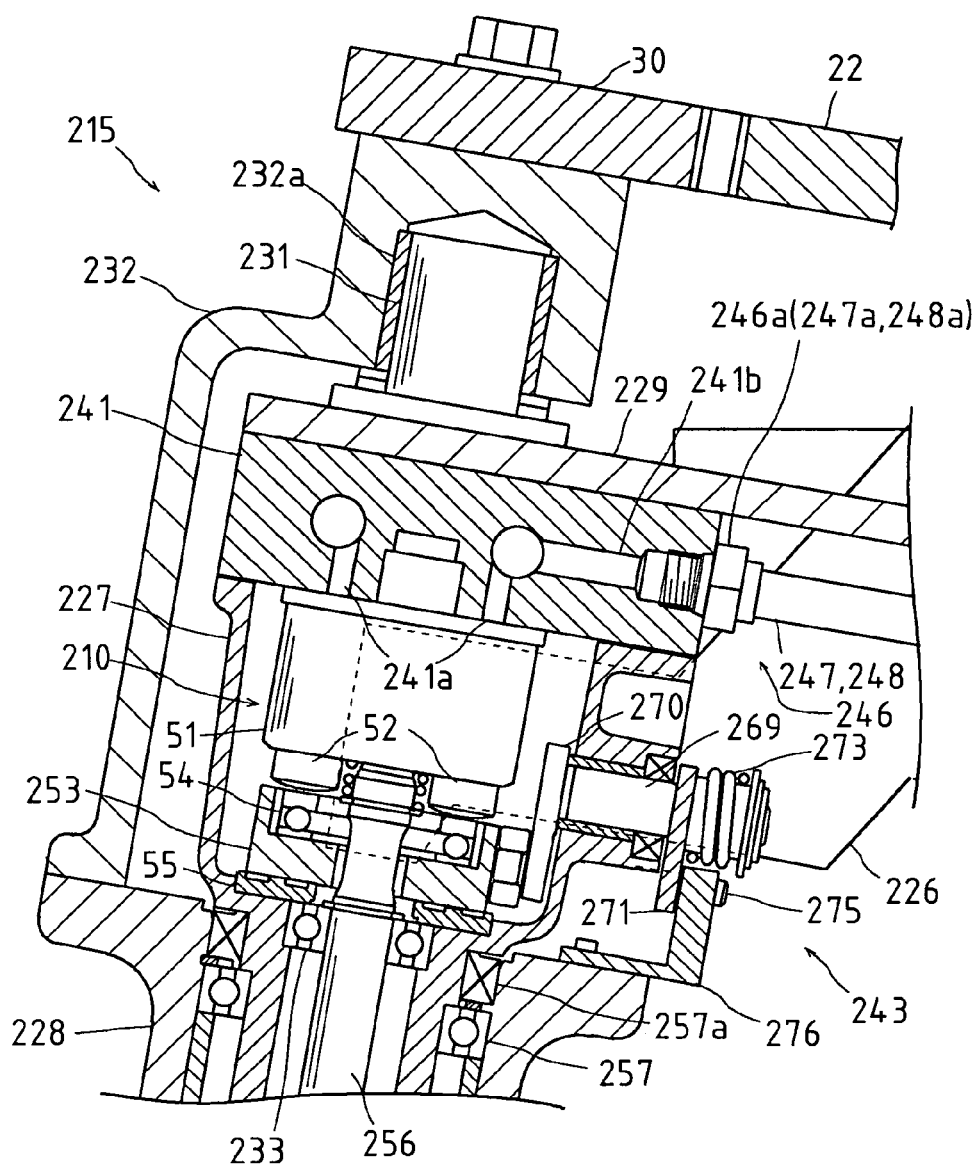
FIG. 41 is a sectional rear view of an upper portion of front transaxle 215 shown in FIG. 39, showing a hydraulic motor 210 therein.

Description of steering linkage 18 shown in FIG. 38 is omitted because its structure is the same as steering linkage 18 shown in FIG. 27, excluding that each of distal sector gears 30 and 163 of transaxles 215 and 213 is relatively rotatably provided on a later-discussed pivot shaft 231 fixed to each of cross members 14 and 278, as shown in FIG. 41, in comparison with sector gears 30 and 163 of transaxles 15 and transaxle 157 fixed to rotatable kingpin sleeve 27 (or kingpin block 142).

Representative left transaxle 215L (hereinafter, transaxle 215) will be described with reference to FIGS. 39, 41 to 44, 45(a) and 45(b). Description of right transaxle 215R and left and right rear transaxles 213L and 213R is omitted because they are similar to left transaxle 215L.

Figure 37:
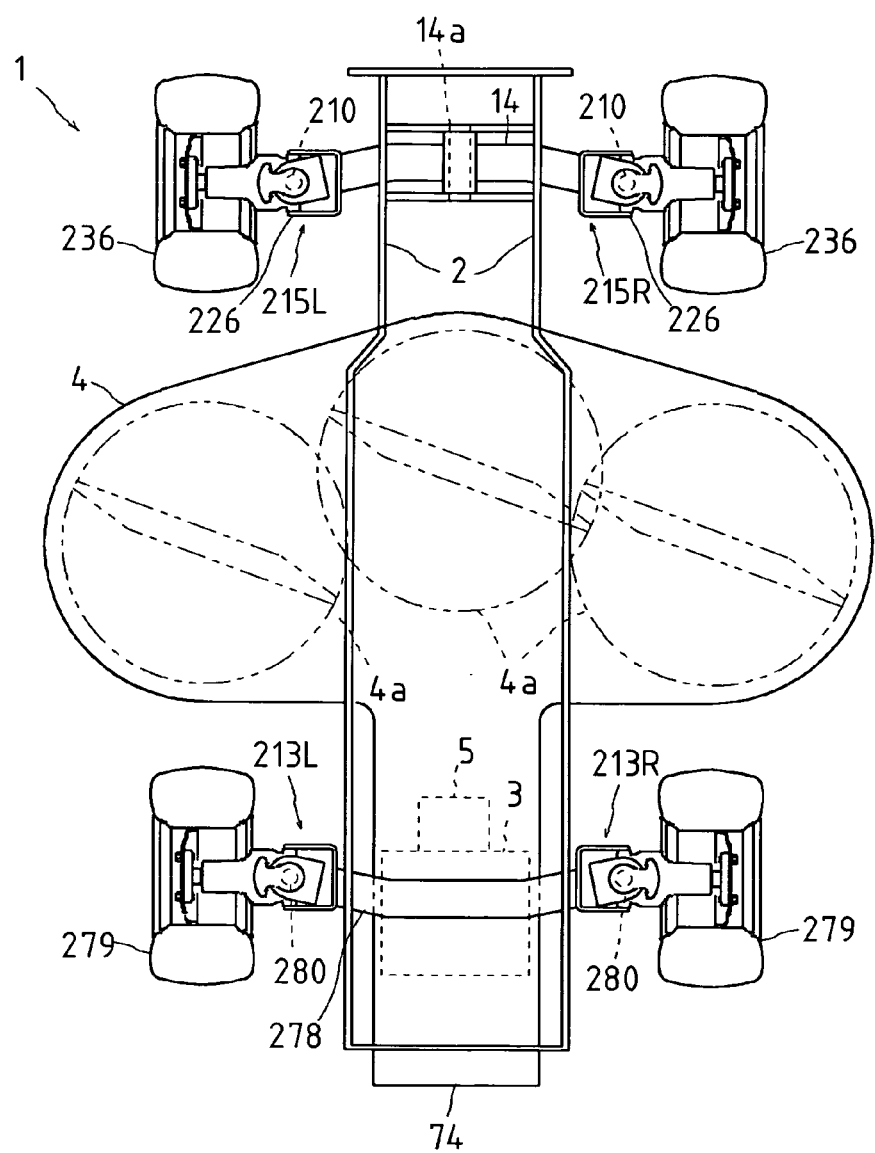
FIG. 37 is a schematic plan view of an alternative four-wheel driving and steering vehicle 1 having left and right steerable front transaxles 215 (215L and 215R) with respective front wheels 236 and left and right steerable rear transaxles 213 (213L and 213R) with respective rear wheels 279 when vehicle 1 is directed straight.

A bracket 226, which is laterally distally open U-like shaped when viewed in plan as shown in FIG. 37, is fixed onto each of left and right ends of cross member 14. An upwardly and downwardly open motor housing 227 is fastened at its front and rear vertical surfaces onto front and rear vertical plate portions of bracket 226 by bolts or the like. Motor housing 227 has an upper motor housing portion and a lower kingpin portion 227a which is diametrically smaller than the upper motor housing portion.

A hydraulic motor 210 is disposed in the upper motor housing portion of motor housing 227. A center section 241 of hydraulic motor 210 is fixed onto a top peripheral edge of motor housing 227 so as to cover the top opening of motor housing 227. Hydraulic motor 210 is fitted onto the lower surface of center section 241 and extends a motor shaft 256 downward on the center axis of kingpin portion 227a of motor housing 227.

A plate-like stay 229 is extended laterally distally from each of left and right ends of cross member 14 so as to be fittingly fixed onto the upper surface of center section 241. A knuckle arm 232 is disposed along the outer surface of the upper motor housing portion of motor housing 227, and formed on a top portion thereof with a downwardly open hole 232a. A pivotal shaft 231 projects upward from the top surface of stay 229 so as to be relatively rotatably inserted into hole 232a. A top surface of knuckle arm 232 is fitted onto a lower surface of sector gear 30, and sector gear 30 is fastened to knuckle arm 232 by a bolt. In this way, knuckle arm 232 is rotated integrally with sector gear 30 around pivot shaft 231. Sector gear 30 meshes with sector gear 22 pivoted onto cross member 14 through pivot shaft 23 so as to constitute steering gear train 217.

A steerable axle housing 228 is disposed below motor housing 227 and covers kingpin portion 227a of motor housing 227 at its upper portion. A distal housing half 228b and a proximal housing half 228a are joined to each other through a ring gear 266 so as to constitute axle housing 228. An upper portion of proximal housing half 228a is extended upward so as to form a kingpin casing portion 228c, in which kingpin portion 227a of motor housing 227 is relatively rotatably disposed. Upper and lower bearings 257 are interposed between an inner peripheral surface of kingpin casing portion 228c and an outer peripheral surface of kingpin portion 227a. An oil seal 257a is interposed between the top inner peripheral surface of kingpin casing portion 228c and the stepped outer peripheral surface of motor housing 227 (the upper end portion of kingpin portion 227a). Knuckle arm 232 is fixed at a bottom end thereof onto an upper end of kingpin casing portion 228c. In this way, steerable axle housing 228 is rotated integrally with sector gear 30 and knuckle arm 232 around kingpin portion 227a and pivot shaft 231.

Steerable axle housing 228 can be easily detached from motor housing 227 by being removed from knuckle arm 232, thereby facilitating maintenance or repair of hydraulic motor 210 and parts in motor housing 227 and steerable axle housing 228.

Figure 39:
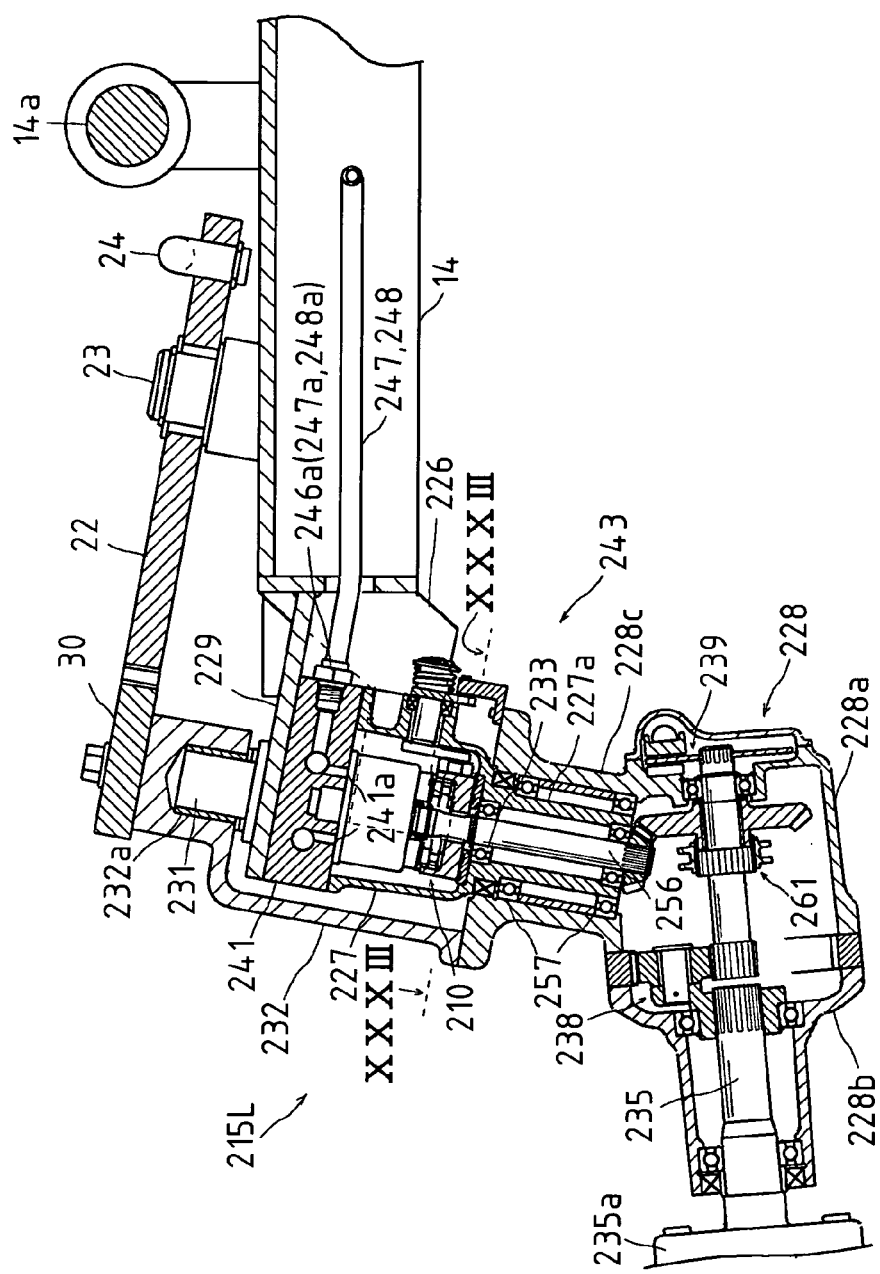
FIG. 39 is a sectional rear view of front transaxle 215 (left front transaxle 215L).

Referring to FIGS. 39 and 41, hydraulic motor 210 in transaxle 215 will be more detailed. As shown in FIG. 41, in the upper housing portion of motor housing 227, a pair of kidney ports 241a are open downward at the bottom surface of center section 241, and cylinder block 51 is slidably fitted at its top surface onto the bottom surface of center section 241 in motor housing 227. A pair of hydraulic fluid ports 241b in connection with respective kidney ports 241a are open outward at a laterally proximal side surface of center section 241 facing cross member 14. Further, a drain port is open outward at the same side surface of center section 241. Pipe couplings 246a, 247a and 248a are screwed into the opening ends of the drain port and the pair of hydraulic fluid ports 241b, respectively. A drain pipe 246 and hydraulic fluid pipes 247 and 248 are extended along cross member 14 and connected to the outer ends of respective pipe couplings 246a, 247a and 248a. Drain pipe 246 is connected to an unshown fluid tank, and hydraulic fluid pipes 247a and 248a are connected to hydraulic pump 5.

Pistons 52 are axially fitted in cylinder block 51 so as to constitute axial piston type hydraulic motor 210. A downwardly arcuately recessed guide seat 55 is fixed on a step of motor housing 227 between the upper motor housing portion and kingpin portion 227a. A movable swash plate 253 with thrust bearing 54 is slidably fitted at its arcuately convex bottom surface onto the recessed upper surface of guide seat 55.

Pistons 52 project downward from cylinder block 51 and abut against thrust bearing 54 in swash plate 253. Alternatively, hydraulic motor 210 may be a radial piston type hydraulic motor, in which pistons are radially fitted into its cylinder block. In this construction, a cam ring replacing movable swash plate 253 may be disposed around the cylinder block so as to abut against the radial pistons.

Axial motor shaft 256 of hydraulic motor 210 is extended downward from cylinder block 51 through swash plate 253 and guide seat 55 on the center axis of kingpin portion 227a of motor housing 227, journalled by kingpin portion 227a through upper and lower bearings 233, and inserted into steerable axle housing 228.

Figure 42:
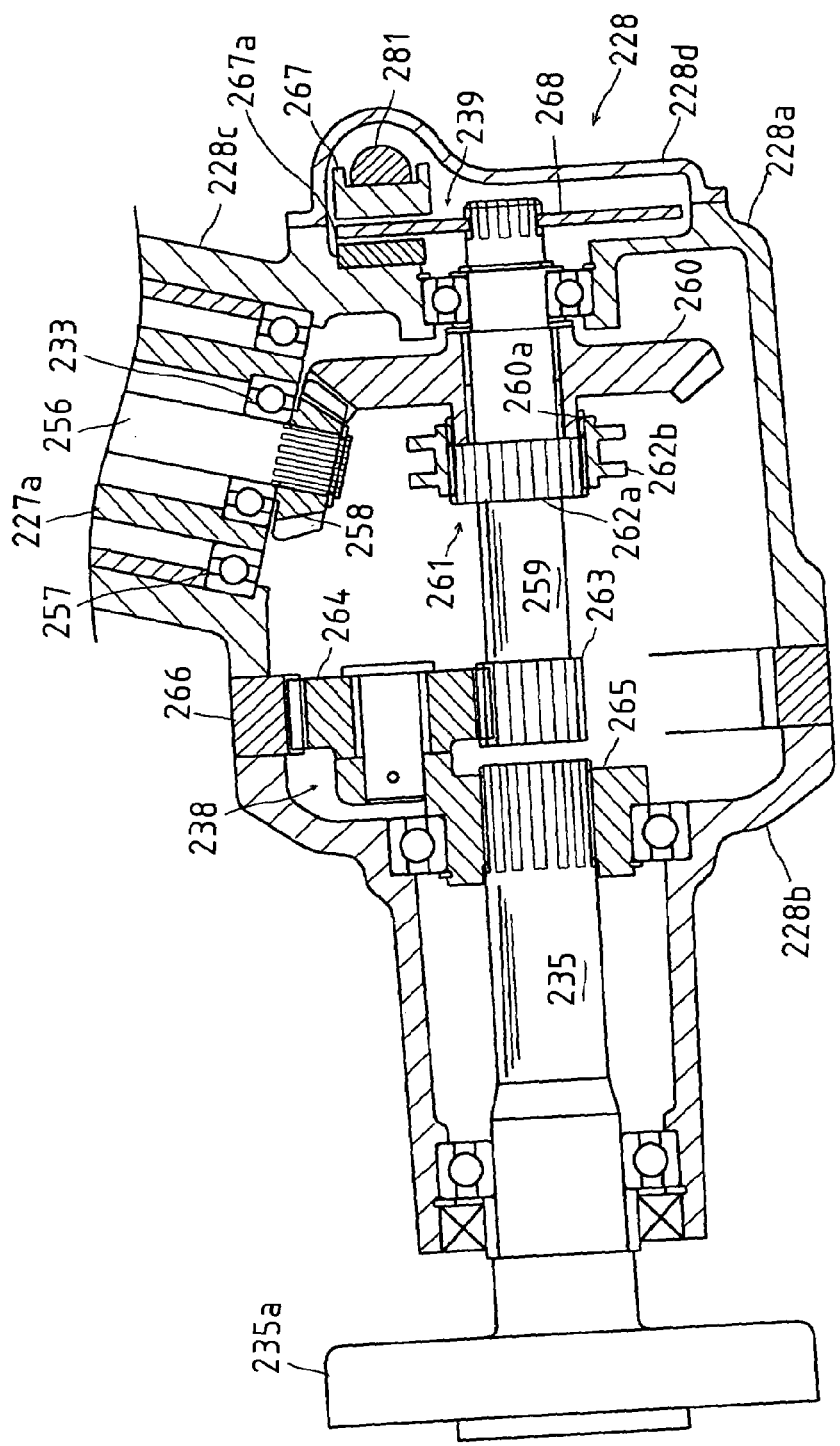
FIG. 42 is a sectional rear view of a lower portion of front transaxle 215 shown in FIG. 39, showing a steerable axle housing 228 incorporating a deceleration gear train 238 and an axle 235.

The inner structure of steerable axle housing 228 will be described with reference to FIGS. 39 and 42. A bottom end of motor shaft 256 projects downward from lower bearing 233 into a gearing chamber formed in proximal housing half 228a of steerable axle housing 228 below kingpin casing portion 228c, and is fixedly provided thereon with a bevel motor gear 258. A horizontal axle 235 is journalled by distal housing half 228b of steerable axle housing 228 through bearings. A distal end of axle 235 disposed out of steerable axle housing 228 is formed into a hub 235a of front wheel 236. A clutch shaft 259 is disposed coaxially to axle 235 and journalled by proximal housing half 228a through a bearing. A bevel clutch gear 260 is relatively rotatably provided on clutch shaft 259, and constantly meshes with bevel motor gear 258.

A clutch 261 is interposed between clutch gear 260 and clutch shaft 259. In this regard, a spline hub 262a is fixed on clutch shaft 259. A clutch teeth portion 260a is formed on an end of an axial boss of bevel clutch gear 260 facing spline hub 262a. A clutch slider 262b is spline-fitted on spline hub 262a, and axially slidably shifted between a clutch-on position and a clutch-off position. Clutch shaft 259 is drivingly connected to axle 235 through a later-discussed planetary deceleration gear train 238.

When clutch slider 262b is disposed at the clutch-on position, clutch slider 262b meshes with clutch teeth portion 260a of clutch gear 260 in addition to spline hub 262a, so that the output force of hydraulic motor 210 (the rotary force of motor shaft 256) is transmitted to clutch shaft 259, thereby driving front wheel 236. When clutch slider 262b is disposed at the clutch-off position, clutch slider 262b meshes with only spline hub 262a without clutch teeth 260a, so that the output force of hydraulic motor 210 is not transmitted to clutch slider 262b, thereby stopping front wheel 236.

Clutch slider 262b, axially slidable on spline hub 262a, is operationally connected to a clutch manipulator disposed on vehicle 1 out of steerable axle housing 228. Clutch sliders 262b provided in all front and rear transaxles 215 and 213 may interlock with one another so that all front and rear wheels 236 and 279 can be simultaneously isolated from the driving force caused by hydraulic fluid supplied from hydraulic pump 5. For example, when vehicle 1 is towed, the clutch manipulator is operated so as to set all clutch sliders 262b at the clutch-off positions so as to enable all front and rear wheels 236 and 279 to rotate freely from hydraulic motors 210 and 280, thereby preventing hydraulic motors 210 and 280 from pumping by the rotation of corresponding wheels 236 and 279.

A brake assembly 239 is constructed on a proximal end of clutch shaft 259 projecting outward from proximal housing half 228a, and covered with a cover 228d. In this regard, a brake disk 268 is fixed on the end of clutch shaft 259. A pressure plate 267 is disposed adjacent to brake disk 268. A brake pad 267a is fitted onto proximal housing half 228a opposite to pressure plate 267 with respect to brake disk 268. A horizontal camshaft 281 is disposed adjacent to pressure plate 267. Camshaft 281 projects outward from cover 228d and is operationally connected to an unshown brake manipulator. When the brake manipulator is operated for braking, camshaft 281 is rotated to press pressure plate 267 against brake disk 268 so as to clamp brake disk 268 between pressure plate 267 and brake pad 267a, thereby braking clutch shaft 259.

Alternatively, brake assembly 239 may be disposed in another portion of axle housing 228. Camshafts 281 of brake assemblies 239 in all transaxles 215 and 213 may interlock with one another so as to simultaneously brake all wheels 236 and 279. Camshafts 281 may be interlockingly connected to clutch 261 so that clutch 261 is clutched off according to the braking operation of camshaft 281.

Planetary gear train 238 is interposed between clutch shaft 259 and axle 235. As mentioned above, ring gear 266 is fixedly sandwiched between proximal housing half 228a and distal housing half 228b along a vertical surface perpendicular to axle 235 and clutch shaft 259. A distal end of clutch shaft 259 is disposed in ring gear 266 and formed thereon with a sun gear 263. Ring gear 266 is formed with an internal gear on its inner periphery, and a planetary gear 264 is (or planetary gears 264 are) interposed between sun gear 263 and the internal gear of ring gear 266. A carrier 265 is fixed on a proximal end portion of axle 235, and journalled by distal housing half 228b through a bearing. Planetary gear 264 is (planetary gears 264 are) pivoted on carrier 235.

A motor control linkage 243 for controlling swash plate 253 will be described with reference to FIGS. 39, 41, 43, 44, 45(a) and 45(b). A motor control shaft 269 relatively rotatably penetrates a proximal sidewall of the upper motor housing portion of motor housing 227. An inner motor control arm 270 is fixed onto one end of motor control shaft 269 in motor housing 227, and interlocks with movable swash plate 253. More detailed, a pin projects from a tip of inner motor control arm 270, and fitted into a recess formed on movable swash plate 253. Swash plate 253 is a cradle type swash plate, which slides against seat 55 according to rotation of motor control shaft 269 so as to rotate around the center axis of motor control shaft 269.

Figure 43:
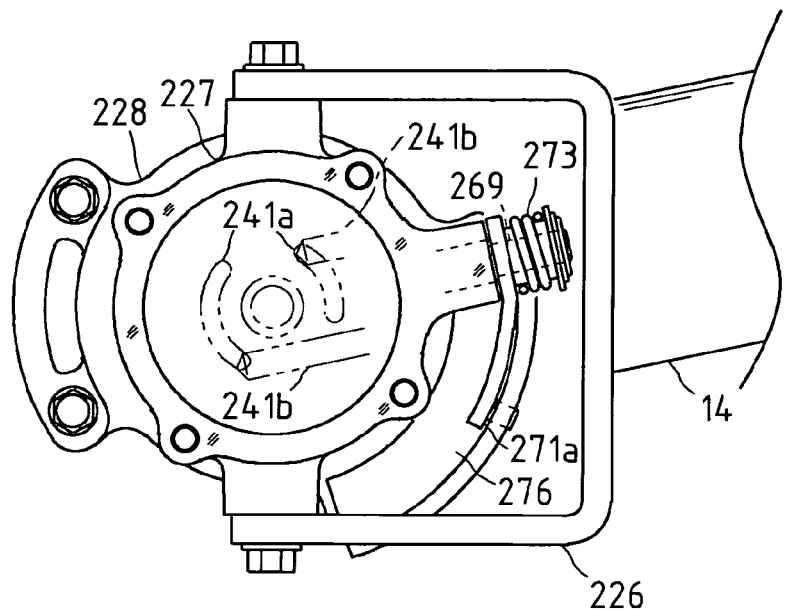
FIG. 43 is a view of an upper portion of transaxle 215 taken along the center axis of kingpin portion 227a of a motor housing 227, showing a part of axle housing 228 relatively rotatably supported on motor housing 227 with a motor control linkage 243.
Figure 44:
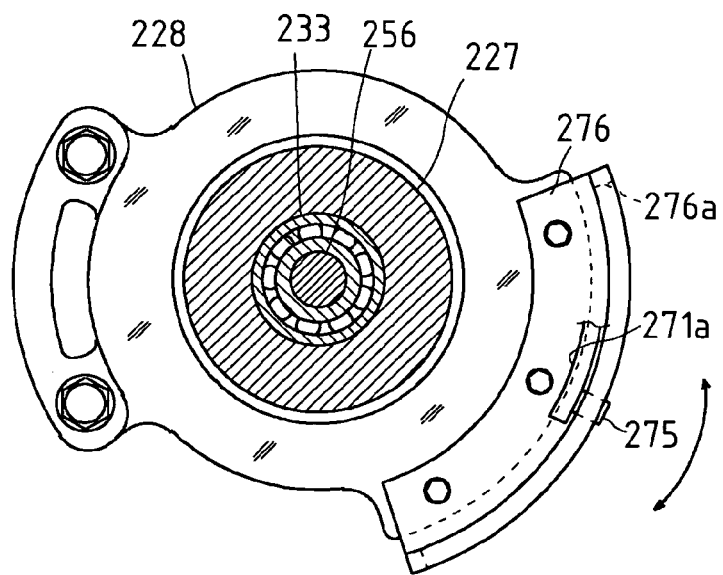
FIG. 44 is a cross sectional view of transaxle 215 taken along a XXXIII-XXXIII line of FIG. 39, showing a part of motor control linkage 243.
Figure 45:
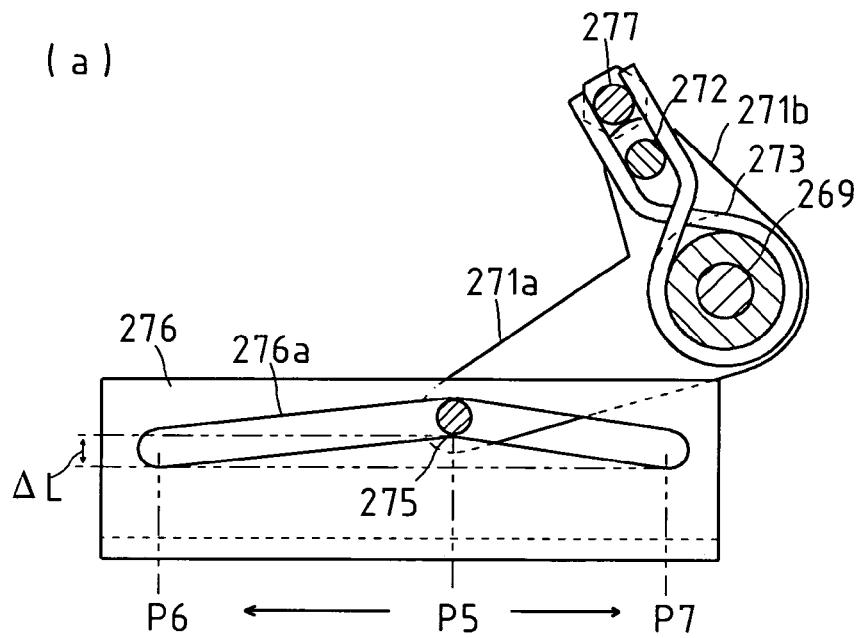
FIG. 45(a) is a schematic side view of motor control linkage 243 when steering wheel 16 is disposed at the straight traveling position.
FIG. 45(b) is a schematic side view of motor control linkage 243 when steering wheel 16 is fully rotated for turning of vehicle 1.
Figure 45:
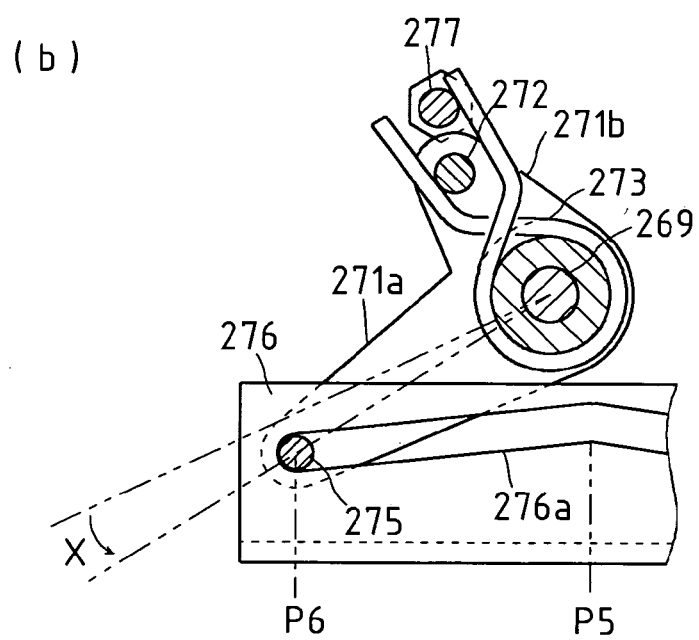

Motor control linkage 243 is provided for reducing the rotary speed of hydraulic motor 210 so that vehicle 1 can turn stably. A V-like bent outer motor control arm 271, whose bent portion is a boss portion fixed on the other end of motor control shaft 269 on the proximal outside of motor housing 227, has a first arm portion 271a and a second arm portion 271b extended substantially perpendicularly to each other from the boss portion thereof fixed on control shaft 269. A downward rotational direction of first arm portion 271a is defined as the direction of control shaft 269 for increasing the tilt angle of swash plate 153 (i.e., for increasing the displacement of hydraulic motor 210). First arm portion 271a is arcuately curved when viewed along the center axis of kingpin portion 227a, as shown in FIGS. 43 and 44.

A top surface of kingpin casing portion 228c of axle housing 228 is extended outward so as to form a sector portion just below first arm portion 271a. A cam plate 276, which is arcuate when viewed along the center axis of kingpin portion 227a, is fittingly fixed at its bottom surface onto the top surface of the sector portion of kingpin casing portion 228c of axle housing 228. Cam plate 276 is sectionally L-like bent to have a plate portion erected from an outer arcuate edge of the bottom surface. A vertically inversed V-like shaped cam slot 276a is opened in the erected plate portion of cam plate 276.

The curvature of first arm portion 271a agrees with that of the erected plate portion of cam plate 276 so that first arm portion 271a is fittingly disposed along the inner surface of the erected plate portion of cam plate 276. A pin 275 projects from a tip of first arm portion 271a so as to be slidably inserted into cam slot 276a. The top bent portion of cam slot 276a serves as a straight traveling position P5 so that, when steering wheel 16 is disposed at the straight traveling position, pin 275 is disposed at straight traveling position P5 in cam slot 276a, as shown in FIG. 45(a).

Straight traveling position P5 in cam slot 276a is higher by a height ΔL than both left and right end positions P6 and P7 in cam slot 276a. As steering wheel 16 is rotated leftward from the straight traveling position, pin 275 relatively moves from straight traveling position P5 to left end position P6 in cam slot 276a. As steering wheel 16 is rotated rightward from the straight traveling position, pin 275 relatively moves from straight traveling position P5 to right end position P7 in cam slot 276a. Whether steering wheel 16 is rotated leftward or rightward from its straight traveling position, pin 275 relatively moves downward in cam plate 276 in the center axial direction of kingpin portion 227a so as to rotate first arm portion 271a downward, thereby increasing the tilt angle of swash plate 253. When steering wheel 16 is fully rotated, pin 275 reaches either end position P6 or P7 (FIG. 45(b) illustrates pin 275 reaching end position P6 by fully leftward rotation of steering wheel 16), so that pin 275 is disposed lower than that disposed at straight traveling position P5 by height ΔL. FIG. 45(b) illustrates a rotational degree X of motor control shaft 269 corresponding to the motion of pin 275 from position P5 to position P6 in cam slot 276a.

Since the turning angle of inside wheel 236 (front wheel 236 on the turning inside of vehicle 1) is larger than that of outside wheel 236 (front wheel 236 on the turning outside of vehicle 1), a part of cam slot 276a between position P5 and one of positions P6 and P7 corresponding to the turning of inside wheel 236 is longer than the other part of cam slot 275 between position P5 and the other position P7 or P6 corresponding to the turning of outside wheel 236. Representative cam slot 276a shown in FIG. 45(a) is provided for left transaxle 215, so that the left part of cam slot 276a between positions P5 and P6 for sliding of pin 275 during the leftward rotation of steering wheel 16 is longer than the right part of cam slot 276a between positions P5 and P7.

Second arm portion 271b is provided for returning swash plate 253 and motor control arms 270 and 271 to their initial positions, i.e., straight traveling positions. A spring 273 is coiled on the boss portion of outer motor control arm 271, twisted, and extended at both end portions thereof. As shown in FIG. 45(a), the extended end portions of spring 273 clamp a push pin 272 and a retaining pin 277 therebetween, when outer motor control arm 271 is disposed at the initial straight traveling position. Retaining pin 277 is an eccentric pin, which can be rotated to adjust the straight traveling position of motor control arms 270 and 271. If first arm portion 271a is rotated downward by rotating steering wheel 16 from the straight traveling position, as show in FIG. 45(b), push pin 272 pushes down one end portion of spring 273 while retaining pin 277 retains the other end portion of spring 273 at its initial position, thereby generating the biasing force of spring 273 for biasing outer motor control arm 271 toward the initial straight traveling position.

Symmetrical left and right transaxles 215L and 215R are provided with respective motor control linkages 243 so that the displacement increase rate of hydraulic motor 210 in left transaxle 215L is the same as that of hydraulic motor 210 in right transaxle 215R during the turning operation of steering wheel 16. However, left and right front wheels 236 can be differentially rotated during turning of vehicle 1 because of the differential rotation of parallel hydraulic motors 210 of left and right transaxles 215L and 215R.

Figure 40:
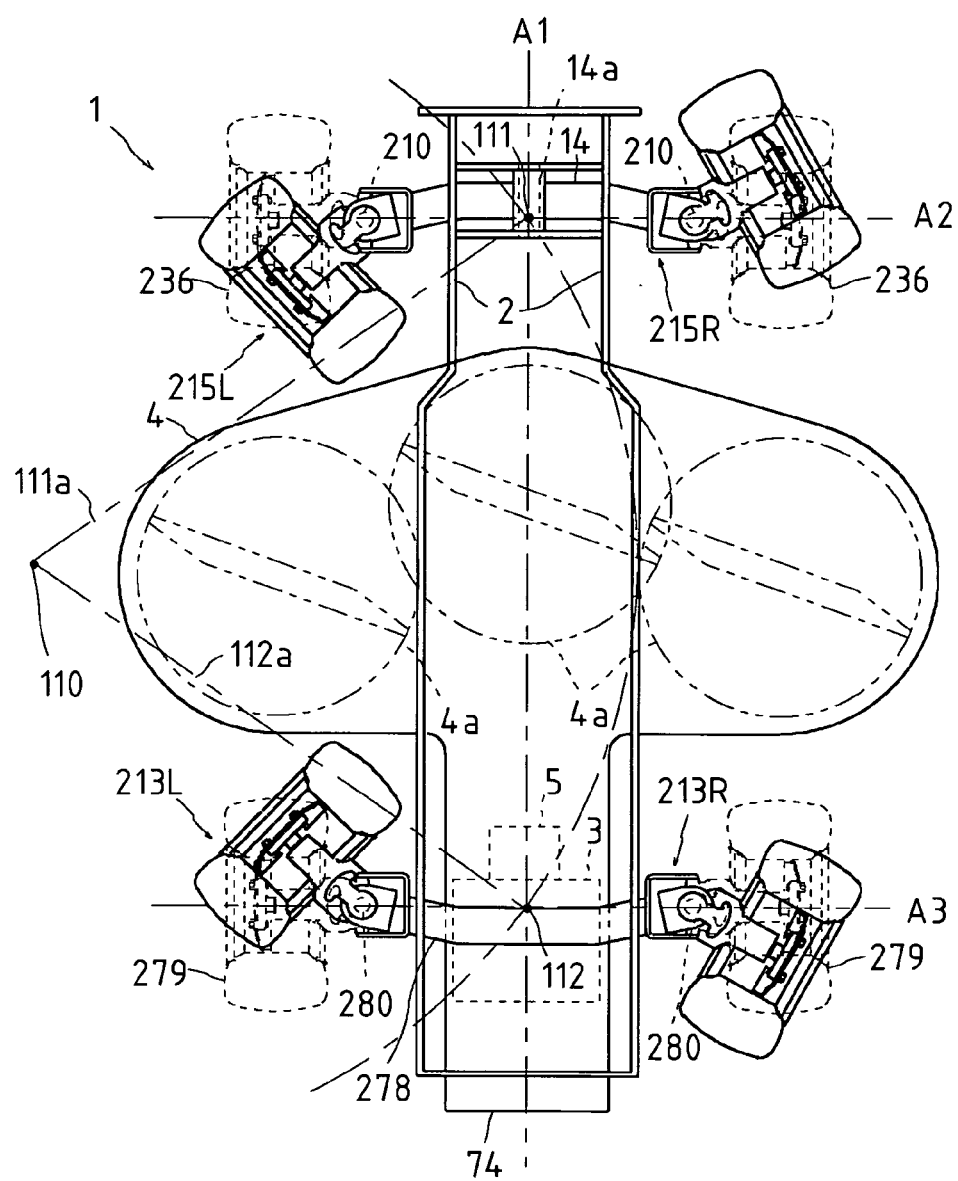
FIG. 40 is a schematic plan view of vehicle 1 shown in FIG. 37 when vehicle 1 turns left.

Further, as shown in FIG. 40, since turning radius 111a of front wheels 236 is the same as turning radius 112a of rear wheels 279, left and right transaxles 213L and 213R are provided with respective motor control linkages similar to motor control linkages 243 so that the displacement increase rates of hydraulic motors 280 in rear transaxles 213L and 213R is the same as that of hydraulic motor 210 in front transaxles 215L and 215R during the turning operation of steering wheel 16. Left and right rear wheels 279 can be differentially rotated during turning of vehicle 1 because of the differential rotation of parallel hydraulic motors 280 of left and right transaxles 213L and 213R.

Figure 46:
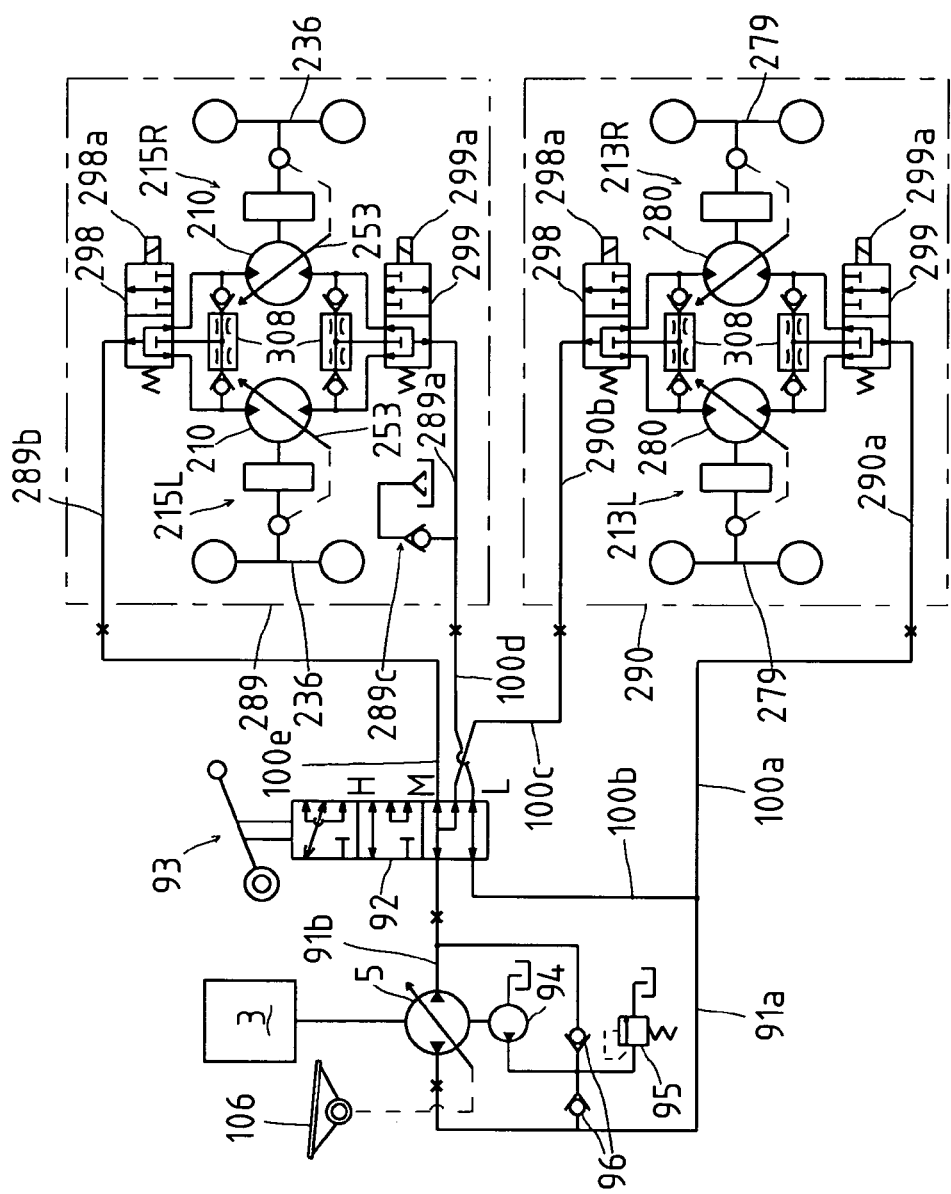
FIG. 46 is a diagram of a hydraulic circuit system of vehicle 1 shown in FIG. 37 to 44, 45(a) and 45(b), comprising a first hydraulic circuit 289 for the pair of hydraulic motors 210, a second hydraulic circuit 290 for a pair of hydraulic motors 280 and the auxiliary speed changing system including auxiliary speed changing valve 92.

FIG. 46 illustrates a hydraulic circuit system for vehicle 1 having front transaxles 215 and rear transaxles 213 as shown in FIGS. 37 to 44, 45(a) and 45(b). The hydraulic circuit system comprises a first hydraulic circuit 289 including the pair of parallel hydraulic motors 210 and a second hydraulic circuit 290 including the pair of parallel hydraulic motors 280. First hydraulic circuit 289 includes a hydraulic fluid passage 289a connected to passage 100d, and a hydraulic fluid passage 289b connected to passage 100e, so as to fluidly connect hydraulic motors 210 in parallel to hydraulic pump 5 through auxiliary speed changing valve 92. Second hydraulic circuit 290 includes a hydraulic fluid passage 290a connected to passage 100a, and a hydraulic fluid passage 290b connected to passage 100c, so as to fluidly connect hydraulic motors 280 in parallel to hydraulic pump 5 through auxiliary speed changing valve 92.

When auxiliary speed changing valve 92 is disposed at low speed level position L, all hydraulic motors 210 and 280 are fluidly connected in parallel to hydraulic pump 5 so as to be supplied with respective almost quarters of fluid from hydraulic pump 5. When auxiliary speed changing valve 92 is disposed at middle speed level position M, the pair of parallel hydraulic motors 210 and the pair of parallel hydraulic motors 280 are fluidly connected in tandem to hydraulic pump 5 so that all the fluid from hydraulic pump 5 is distributed between the hydraulic motors 280, and distributed between the hydraulic motors 210.

When auxiliary speed changing valve 92 is disposed at high speed level position H, only the pair of hydraulic motors 280 are supplied with fluid from hydraulic pump 5. Additionally, the tilt angles of movable swash plates of hydraulic motors 280 may be reduced so as to increase the rotary speeds of hydraulic motors 280 according to the setting of auxiliary speed changing valve 92 at high speed level position H.

In first hydraulic circuit 289, an electromagnetic switching valve 298 is interposed between passage 289b and the pair of hydraulic motors 210, and an electromagnetic switching valve 299 is interposed between passage 289a and the pair of hydraulic motors 210. In second hydraulic circuit 290, switching valve 298 is interposed between passage 290b and the pair of hydraulic motors 280, and switching valve 299 is interposed between passage 290a and the pair of hydraulic motors 280.

The depression direction of main speed changing pedal 106 (for forward traveling or backward traveling), interlocking with means for changing the delivery direction (e.g., a movable swash plate) of hydraulic pump 5, decides whether hydraulic motors 210 and 280 are supplied with hydraulic fluid from passages 289a and 290a to respective passages 289b and 290b or from passages 289b and 290b to respective passages 289a and 290a. When main speed changing pedal 106 is depressed for forward traveling, hydraulic fluid flows through hydraulic motors 210 from passage 289a to passage 289b, and through hydraulic motors 280 from passage 290a to passage 290b, so that switching valves 299 are disposed on the upstream of hydraulic motors 210 and 280, and switching valves 298 on the downstream of hydraulic motors 210 and 280. When main speed changing pedal 106 is depressed for backward traveling, hydraulic fluid flows through hydraulic motors 210 from passage 289b to passage 289a, and through hydraulic motors 280 from passage 290b to passage 290a, so that switching valves 298 are disposed on the upstream of hydraulic motors 210 and 280, and switching valves 299 on the downstream of hydraulic motors 210 and 280.

Each of switching valves 298 and 299 is switched between a normal position and a differential restriction position. Each of switching valves 298 and 299, set at the differential restriction position, is connected to corresponding hydraulic motor 210 or 280 through flow restriction member 308, in which a passage from each of switching valves 298 and 299 bifurcates into two orifices connected to respective hydraulic motors 210 or 280, thereby restricting the amount of fluid to respective corresponding hydraulic motors 210 or 280, i.e., restricting the differential rotation of corresponding hydraulic motors 210 or 280. Each of switching valves 298 and 299, set at the normal position, is connected to the corresponding pair of hydraulic motors 210 or 280 without passing through flow restriction member 308, so as to properly supply hydraulic fluid to the pair of hydraulic motors 210 or 280, thereby allowing the proper differential rotation of hydraulic motors 210 or 280.

Switching valves 298 and 299 are provided with respective solenoids 298a and 299a. By exciting each of solenoids 298a and 299a, corresponding switching valve 298 or 299 is set at the differential restriction position. By unexciting each of solenoids 298a and 299a, corresponding switching valve 298 or 299 is set at the normal position. Solenoids 298a and 299a are excited and unexcited by a controller based on the operation state of a differential locking manipulator, such as differential locking pedal 105.

Whether the differential locking manipulator is operated for differential restriction or not (whether differential locking pedal 105 is depressed or not), the pair of switching valves 298 or 299 on the downstream of the respective pairs of hydraulic motors 210 and 280 are disposed at the normal positions, so as to collect hydraulic fluid from the respective pairs of hydraulic motors 210 and 280 without passing through respective flow restriction members 308.

When the differential locking manipulator is operated for differential restriction (differential locking pedal 105 is depressed), the pair of switching valves 298 or 299 on the upstream of the respective pairs of hydraulic motors 210 and 280 are disposed at the differential restriction positions, so as to distribute hydraulic fluid to the respective pairs of hydraulic motors 210 and 280 through respective flow restriction members 308, thereby restricting the differential rotation of front wheels 236 and the differential rotation of rear wheels 279. When the differential locking manipulator is not operated for differential restriction (differential locking pedal 105 is not depressed), the pair of switching valves 298 or 299 on the upstream of the respective pairs of hydraulic motors 210 and 280 are disposed at the normal positions.

Alternatively, switching valves 298 and 299 may be removed from one of first and second hydraulic circuits 289 and 290 so that the differential rotation of only either the pair of front wheels 236 or the pair of rear wheels 279 can be restricted.

Figure 47:
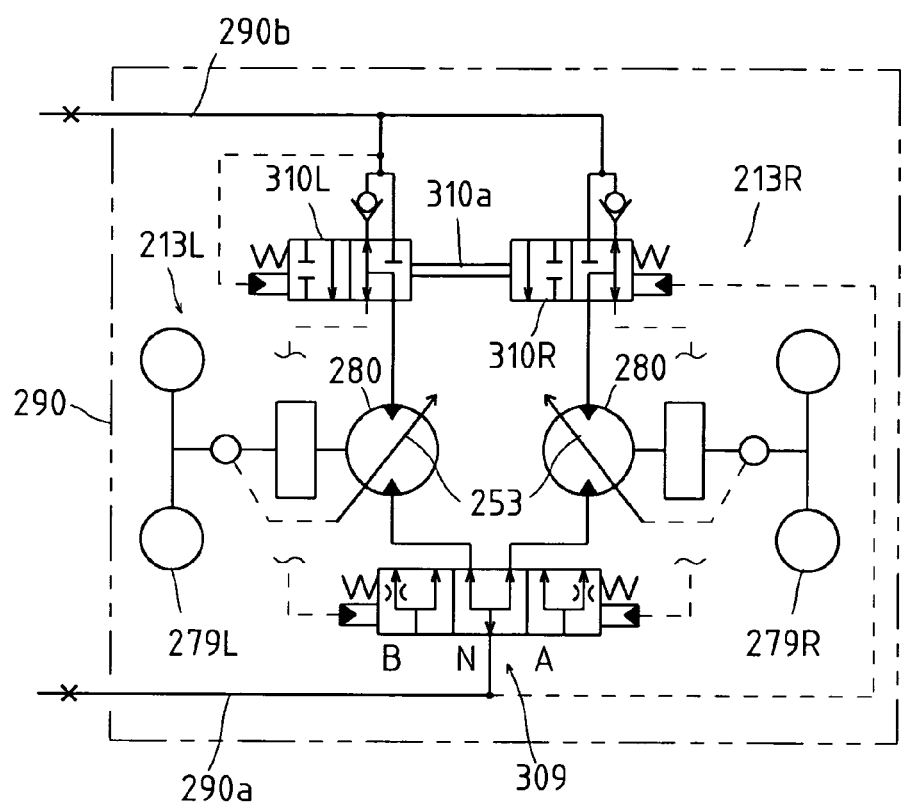
FIG. 47 is a diagram of an alternative second hydraulic circuit 290.

FIG. 47 illustrates an alternative second hydraulic circuit 290 provided with an automatically controlled differential restriction means. The flow direction of hydraulic fluid between passages 290a and 290b, decided according to the traveling direction of vehicle 1, is the same as the above with reference to FIG. 46. A three-position flow control valve 309 is interposed between passage 290a and the pair of hydraulic motors 280. Flow control valve 309 is disposed on the upstream of hydraulic motors 280 during the forward traveling of vehicle 1, and on the downstream of hydraulic motors 280 during the backward traveling of vehicle 1.

Flow control valve 309 is switched among a normal position N, a right restriction position A, and a left restriction position B. Flow control valve 309 has opposite pilot operation portions receiving pilot pressure fluid from respective later-discussed switching valves 310L and 310R. When the opposite pilot pressures are balanced, flow control valve 309 is disposed at normal position N so as to properly pass fluid between passage 290a and the pair of hydraulic motors 280. When pilot pressure from right switching valve 310R is higher than that from left switching valve 310L, flow control valve 309 is disposed at right restriction position A so as to restrict flow of fluid to right hydraulic motor 280 of right transaxle 213R (for right rear wheel 279R) and to properly pass fluid to left hydraulic motor 280 of left transaxle 213L (for left rear wheel 279L). When pilot pressure from left switching valve 310L is higher than that from right switching valve 310R, flow control valve 309 is disposed at left restriction position B so as to restrict flow of fluid to hydraulic motor 280 of left transaxle 213L (for left rear wheel 279L) and to properly pass fluid to right hydraulic motor 280 of right transaxle 213R (for right rear wheel 279R).

Passage 290b bifurcates to hydraulic motors 280 through respective switching valves 310L and 310R. Switching valves 310L and 310R are connected together through a connection member 310a, so as to be shifted integrally with each other. Passage 290b bifurcates, and each of the bifurcating passages from passage 290b further bifurcates to be connected to each of valves 310L and 310R. One of bifurcating passages connected to each of valves 310L and 310R is passed through a check valve, which is opened to pass fluid from each of valves 310L and 310R to passage 290b when corresponding valve 310L or 310R supplies pilot pressure fluid to flow control valve 309. Switching valves 310L and 310R are disposed on the upstream of hydraulic motors 280 during the backward traveling of vehicle 1, and on the downstream of hydraulic motors 280 during the forward traveling of vehicle 1.

Each of switching valves 310L and 310R is switched between a forward traveling position and a backward traveling position. Switching valves 310L and 310R have opposite pilot operation portions: one receiving pilot pressure fluid from passage 290a; and the other receiving pilot pressure fluid from passage 290b.

During the backward traveling of vehicle 1, passage 290b is hydraulically pressured higher than passage 290a so that switching valves 310L and 310R receive pilot pressure from passage 290b to be set at the backward traveling position, where switching valves 310L and 310R pass fluid from passage 290b to hydraulic motors 280 so as to allow differential rotation of hydraulic motors 280. At this time, switching valves 310L and 310R do not generate pilot pressure for shifting flow control valve 309, whereby flow control valve 309 is disposed at normal position N so as to collect fluid from hydraulic motors 280 to passage 290a. As a result, rear wheels 279L and 279R can be properly differentially rotated during the backward traveling of vehicle 1.

During the forward traveling of vehicle 1, passage 290a is hydraulically pressured higher than passage 290b so that switching valves 310L and 310R receive pilot pressure from passage 290a to be set at the forward traveling position, where each of switching valves 310L and 310R receives fluid from each of hydraulic motors 280, supplies a part of the fluid as pilot pressure fluid to flow control valve 309, and supplies the remaining fluid to passage 290b through the opened check valve.

If rear wheels 279L and 279R are normally rotated for the forward traveling of vehicle 1, the opposite pilot pressures to flow control valve 309 are balanced so that flow control valve 309 is disposed at normal position N so as to properly distribute fluid from passage 290a between hydraulic motors 280.

If left wheel 279L is ditched and hydraulic motor 280 in left transaxle 213L is excessively supplied with fluid from passage 290a, the pilot pressure from left switching valve 310L to flow control valve 309 exceeds the pilot pressure from right switching valve 310R to flow control valve 309, so that flow control valve 309 is automatically shifted to left restriction position B so as to restrict the fluid flow to hydraulic motor 280 in left transaxle 213L, thereby supplying sufficient fluid to hydraulic motor 280 for unditched right wheel 279R, whereby vehicle 1 can escape from the ditch. Similarly, if right wheel 279R is ditched, flow control valve 309 is automatically shifted to right restriction position A so as to restrict the flow to hydraulic motor 280 in right transaxle 213R.

Such automatically controlled differential control means as shown in FIG. 47 may be applied to first hydraulic circuit 289 including hydraulic motors 210 of left and right transaxles 215 shown in FIG. 46. Further, it may be provided to the above-mentioned other vehicles 1.

Figure 48:
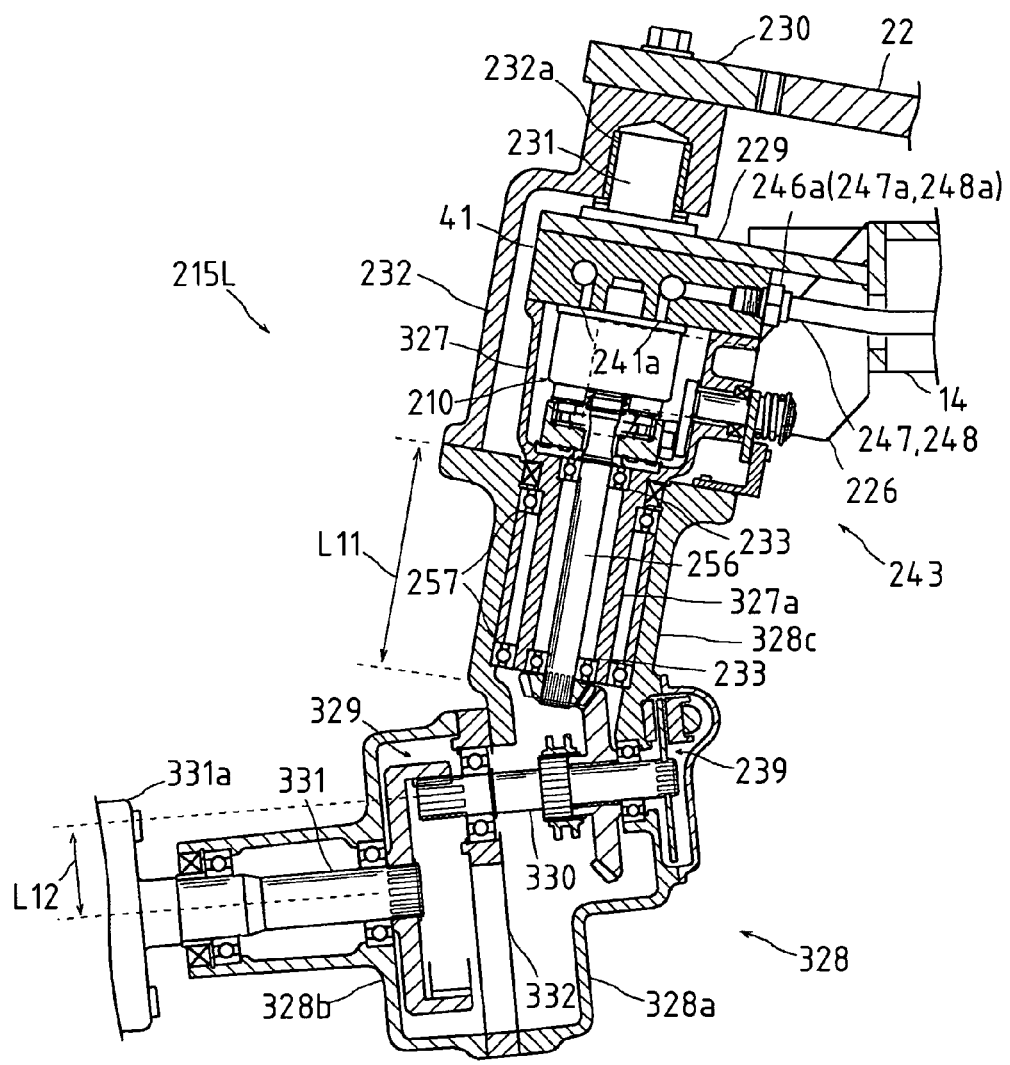
FIG. 48 is a sectional rear view of an alternative front transaxle 215 (left front transaxle 215L), having a large height difference between an axle 331 and a cross member 14.
Figure 49:
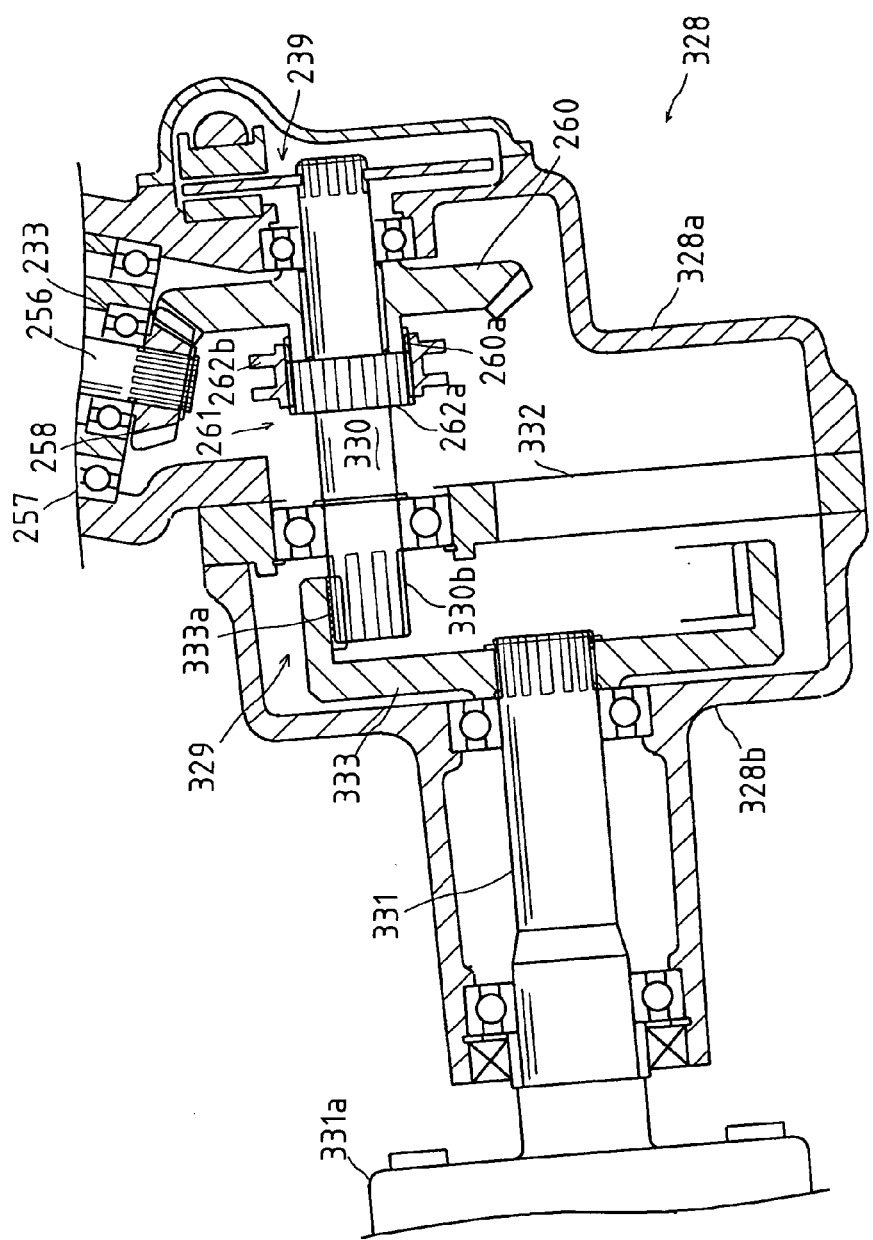
FIG. 49 is a sectional rear view of a lower portion of front transaxle 215 of FIG. 48, showing an inner structure of a steerable axle housing 328.
Figure 50:
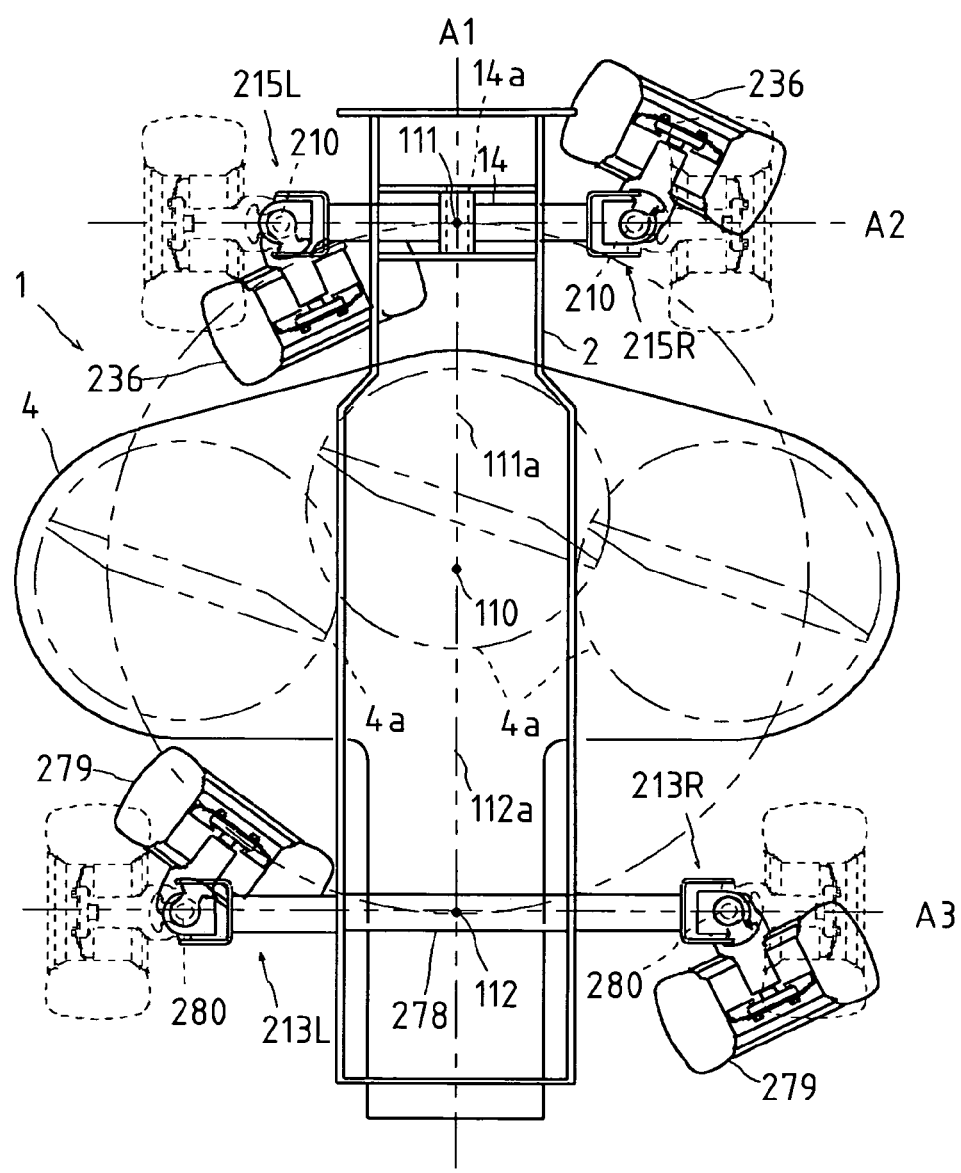
FIG. 50 is a schematic plan view of an alternative four-wheel driving and steering vehicle 1 having steerable front transaxles 215 and steerable rear transaxles 213, each of which is constructed as shown in FIGS. 48 and 49, when vehicle 1 spins.

FIGS. 48 and 49 illustrates an alternative representative transaxle 215 (left front transaxle 215L), which is applicable to right front transaxle 215R and rear transaxles 213 (left and right rear transaxles 213L and 213R). FIG. 50 illustrates a four-wheel driving and steering vehicle 1 using front and rear transaxles 215 and 213 of FIGS. 48 and 49 when vehicle 1 spins.

Front transaxle 215 shown in FIGS. 48 and 49 has an axle 331, which is further lowered in comparison with axle 235 of transaxle 215 shown in FIG. 39, so that front wheel 236 fixed onto axle 235 can pass below front cross member 14. Further, rear wheel 279 supported by rear transaxle 213 employing the same structure of front transaxle 215 shown in FIGS. 48 and 49 can pass below rear cross member 278. As a result, wheels 236 and 279 can be turned in all directions like casters. Vehicle 1 can spin centering on turning center 110 disposed at the center of vehicle 1 while turning radius 111a of front wheels 236 is equaled to turning radius 112a of rear wheels 279, as shown in FIG. 50.

Referring to transaxle 215 shown in FIGS. 48 and 49, a motor housing 327 incorporating hydraulic motor 210 has a lower kingpin portion 327a which is longer than kingpin portion 227a of motor housing 227. Motor shaft 256 of hydraulic motor 210 has a length L11 which is longer than that of motor shaft 256 shown in FIG. 39. To be suitably relatively rotatably supported on such elongated kingpin portion 327a, a steerable axle housing 328 has a kingpin casing portion 328c, which is longer than kingpin casing portion 228c of axle housing 228 shown in FIG. 39.

Further, axle 331 is disposed below a clutch shaft 330, in comparison with axle 235 disposed coaxially to clutch shaft 259. In this regard, to constitute axle housing 328, a bearing plate 332 for journaling a distal portion of clutch shaft 330 through a bearing is sandwiched between a proximal housing half 328a journaling clutch shaft 330 and a distal housing half 328b journaling axle 328b.

A deceleration gear train 329 is drivingly interposed between clutch shaft 330 and axle 331 in distal housing half 328b adjacent to bearing plate 332. Referring to deceleration gear train 329, a diametrically large gear 333 is fixed onto a proximal end of axle 331 serving as the center axis of diametrically large gear 333. Diametrically large gear 333 is formed on its inner peripheral surface with an internal gear 333a. A distal end portion of clutch shaft 330 is formed into a pinion 330b. Pinion 330b meshes with internal gear 333a at the top inner peripheral portion of diametrically large gear 333, so as to ensure a height difference L12 between clutch shaft 330 and axle 331. Proximal housing half 328a and distal housing half 328b are so shaped as to suit such deceleration gear train 329.

Incidentally, axle 331 projects outward from axle housing 328 so as to be formed into a hub 331a onto which wheel 236 is fixed. Clutch shaft 330 is drivingly connected to motor shaft 256 through clutch 261 and bevel gears 260 and 258, similar to clutch shaft 259 shown in FIG. 42. Brake assembly 239 is provided on clutch shaft 330 in axle housing 328, similar to that on clutch shaft 259 in axle housing 228.

Other parts of transaxle 215 (213) shown in FIGS. 48 to 50 are similar to those of transaxle 215 shown in FIGS. 37 to 46. A hydraulic circuit system of transaxle 215 and 213 shown in FIGS. 48 to 50 may be modified as shown in FIG. 47.

An alternative four-wheel driving and two-wheel steering vehicle 1 shown in FIGS. 51 to 55, having steerable front wheels 236 and unsteerable rear wheels 340, will be described. With respect to this vehicle 1, front transaxles 215 for driving and steering front wheels 236 may be similar to those shown in FIGS. 37 to 42, excluding motor control linkage 243 as shown in FIGS. 54(a) and 54(b), which is different from that shown in FIGS. 45(a) and 45(b), as discussed later.

Figure 51:
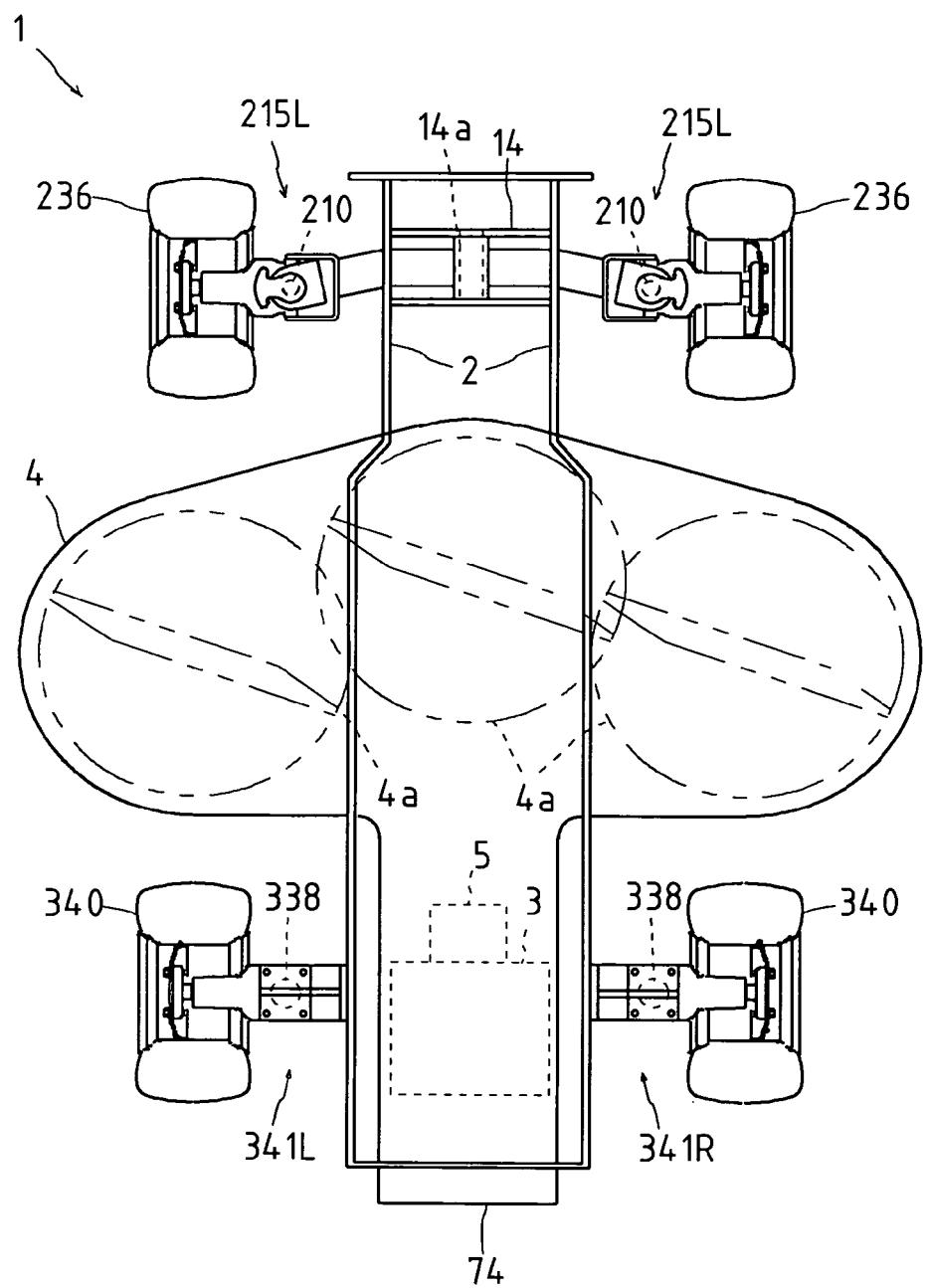
FIG. 51 is a schematic plan view of an alternative four-wheel driving and two-wheel steering vehicle 1 having steering front transaxles 215 and unsteering rear transaxles 341L and 341R, when vehicle 1 is directed straight.
Figure 52:
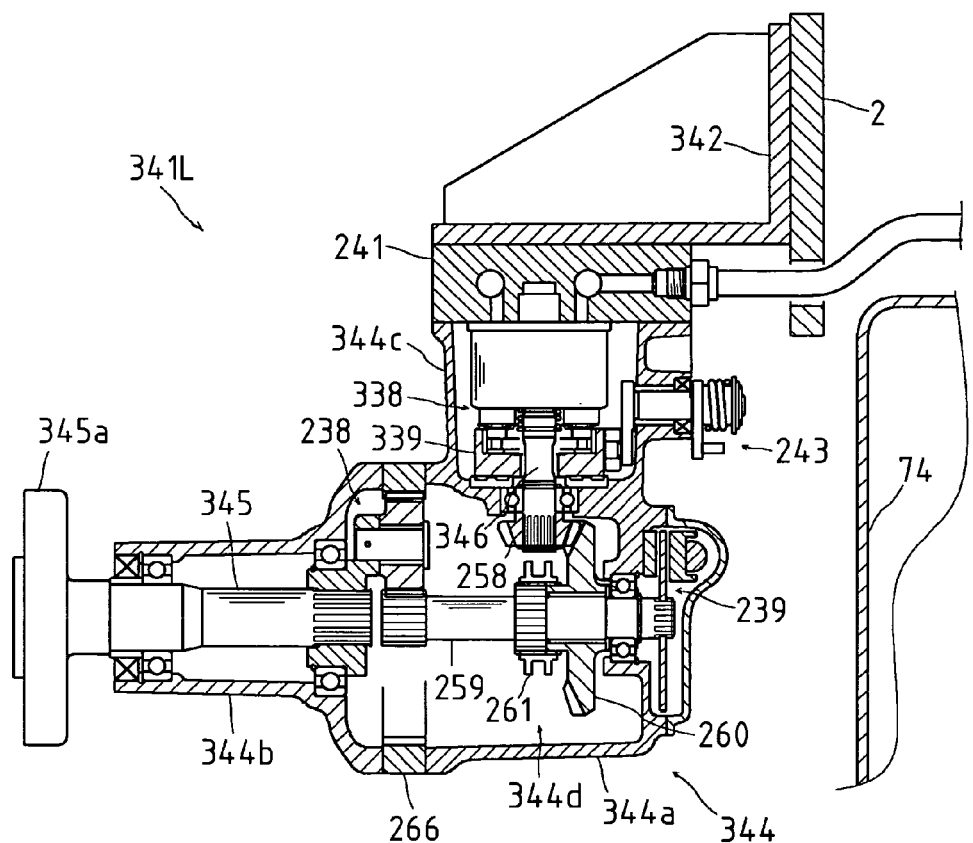
FIG. 52 is a sectional rear view of rear transaxle 341 (left rear transaxle 341L).

Unsteering rear transaxles 341L and 341R (generically named as "rear transaxles 341") will be described with reference to FIG. 52 illustrating representative left transaxle 341L. Transaxle 341 has an unsteerable transaxle housing 344 disposed on each of left and right outsides of rear-discharging duct 74 of mower 4, which is extended rearward above engine 3 and hydraulic pump 5 as shown in FIG. 51. Transaxle housing 344 is constituted by a proximal housing half 344a and a distal housing half 344b joined to each other through ring gear 266 of deceleration gear train 238, similar to steerable axle housing 228. Proximal housing half 344a journals clutch shaft 259, and incorporates a gear train including clutch 261 and bevel gears 260 and 258 for drivingly connecting clutch shaft 259 to a vertical motor shaft 346 of a hydraulic motor 338 of transaxle 341. Brake assembly 239 is disposed in transaxle housing 344 so as to brake clutch shaft 259, similar to that shown in FIG. 42. Distal housing half 344b journals an axle 345 disposed coaxially to clutch shaft 259, similar to axle 235 shown in FIG. 42. Axle 345 projects outward from transaxle housing 344 so as to be formed into a hub 345a onto which rear wheel 340 is fixed. Deceleration gear train 238 including ring gear 266 is drivingly interposed between clutch shaft 259 and axle 345 in transaxle housing 344.

Proximal housing half 344a is formed at an upper portion thereof with an upwardly open motor housing portion 344c for incorporating hydraulic motor 338. Center section 241 is fixed onto the top open edge of motor housing portion 344c. A bracket 342, which is L-like bent when viewed in rear, is fixed at its vertical surface onto the outside surface of side frame 2, and at its horizontal bottom surface onto a top surface of center section 241.

In motor housing portion 344c, hydraulic motor 338 is slidably rotatably fitted onto a bottom surface of center section 241. A movable swash plate 339 is fitted onto a bottom surface of motor housing portion 344c. Axial motor shaft 346 is extended downward from hydraulic motor 338 through movable swash plate 339 into proximal housing half 344a below motor housing portion 344c. Bevel motor gear 258 is fixed onto a bottom end of motor shaft 258 so as to mesh with bevel gear 260 provided on clutch shaft 259.

Figure 53:
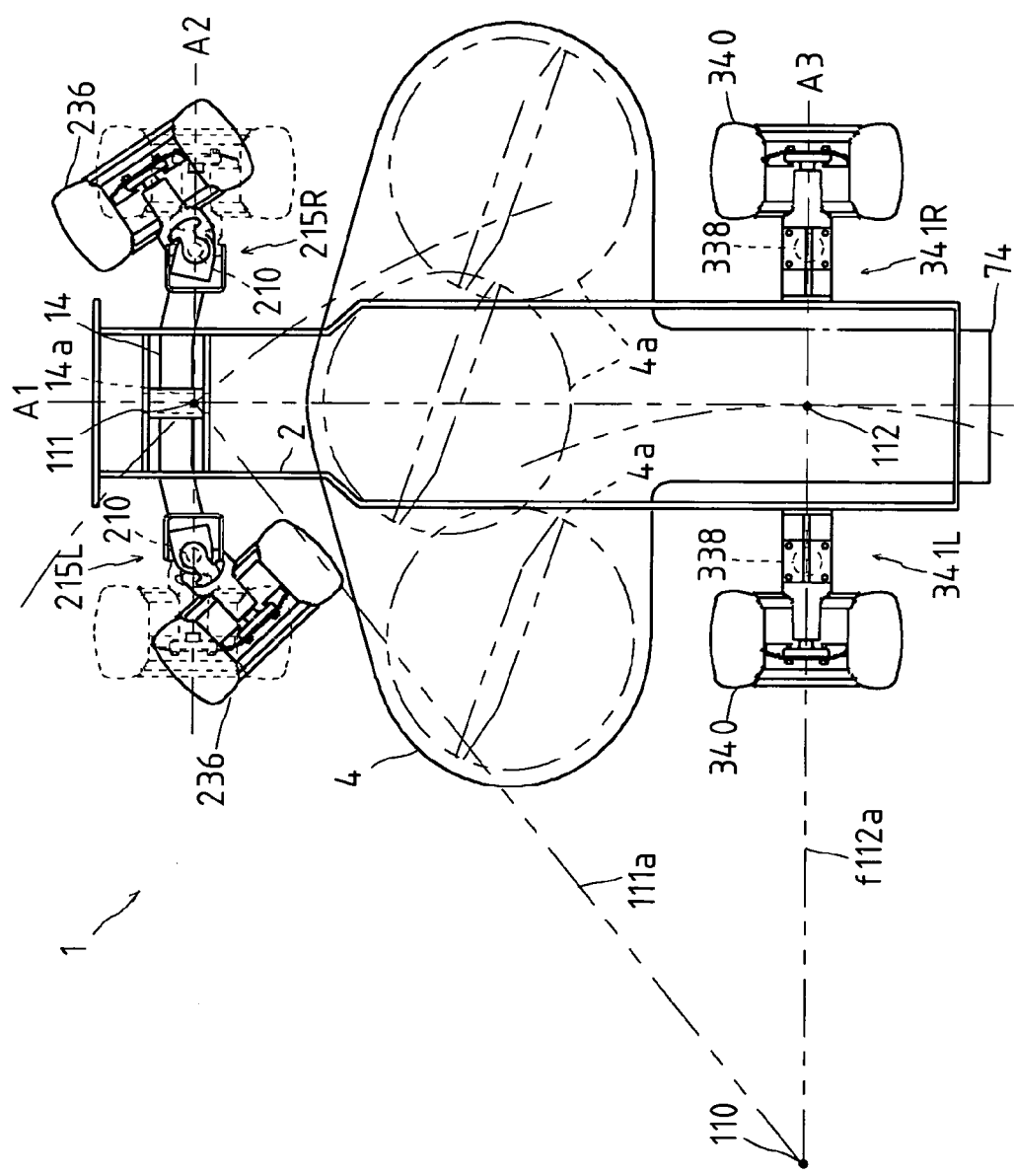
FIG. 53 is a schematic plan view of vehicle 1 of FIG. 51, when vehicle 1 turns.
Figure 54:
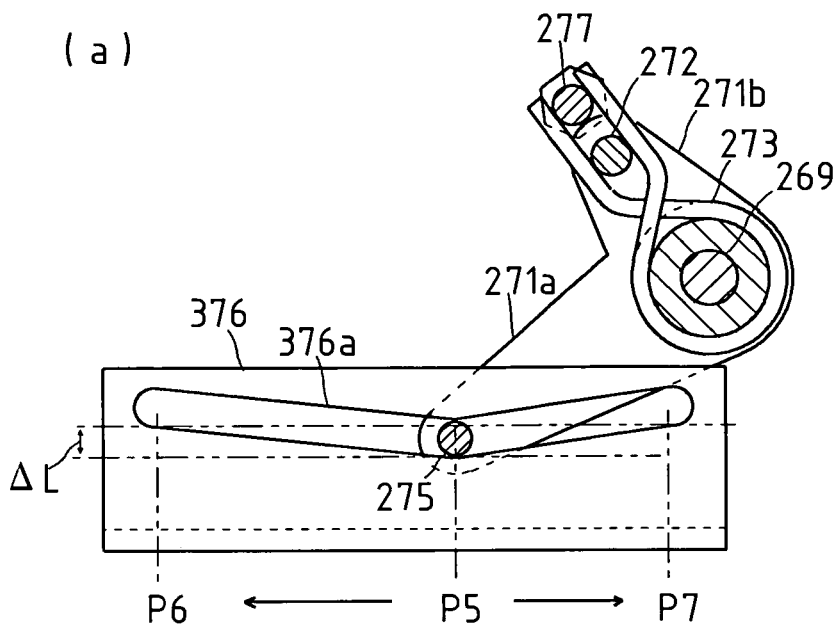
FIG. 54(a) is a schematic side view of motor control linkage 243 of front transaxle 215 for vehicle 1 of FIGS. 51 to 53, when steering wheel 16 is disposed at the straight traveling position.
FIG. 54(b) is a schematic side view of motor control linkage 243 of front transaxle 215 for vehicle 1 of FIGS. 51 to 53, when steering wheel 16 is fully rotated for turning of vehicle 1.
Figure 54:
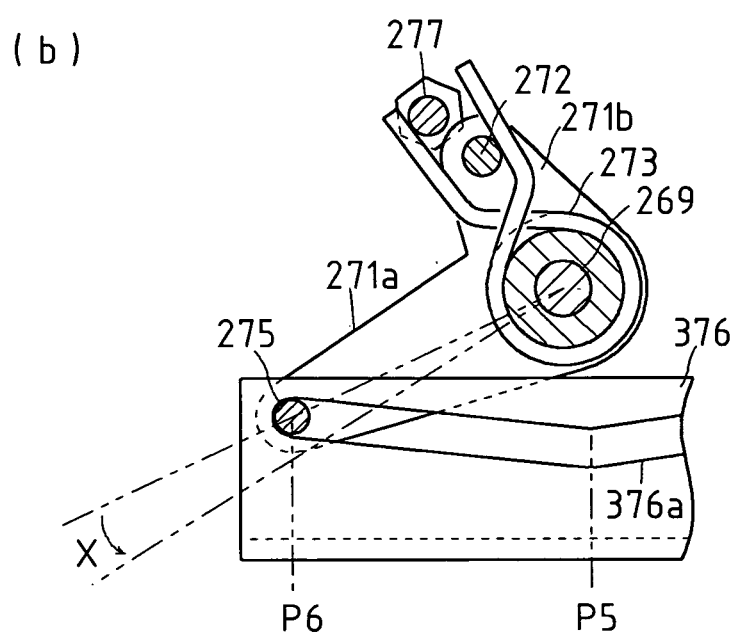

As shown in FIG. 53, during turning of vehicle 1, turning radius 111a of steerable front wheels 236 becomes longer than turning radius 112a of unsteerable rear wheels 340. Therefore, during turning of vehicle 1, front wheels 236 (hydraulic motors 210) must be accelerated faster than rear wheels 340 (hydraulic motors 338). Thus, motor control linkage 243 of each front transaxle 215 must be constructed so as to reduce the tilt angle of swash plate 339 (reduce the displacement of hydraulic motor 338) according to rotation of steering wheel 16 for turning of vehicle 1, in comparison with motor control linkage 243 shown in FIGS. 41, 43, 44, 45(a) and 45(b) for decelerating hydraulic motor 210 (or hydraulic motor 280) during turning of vehicle 1.

The only different point of motor control linkage 243 shown in FIGS. 54(a) and 54(b) from that shown in FIGS. 45(a) and 45(b) is to use a cam plate 376 having a not-reversed V-like shaped cam slot 376a for guiding pin 275 projecting from outer motor control arm 271. In cam slot 376a shown in FIGS. 54(a) and 54(b), straight traveling position P5 is lower than both end positions P6 and P7, in comparison with cam slot 276a shown in FIGS. 45(a) and 45(b), in which straight traveling position P5 is higher than both end positions P6 and P7. In other words, cam slot 376a corresponds to vertically reversed cam slot 276a.

By the rotation of steering wheel 16 for turning of vehicle 1, pin 275 relatively moves in cam slot 376a from position P5 to either position P5 or P6, thereby becoming higher. Accordingly, first arm portion 271a of outer motor control arm 271 rotates upward so as to reduce the tilt angle of movable swash plate 339, thereby accelerating hydraulic motor 210 and front wheel 236.

Figure 55:
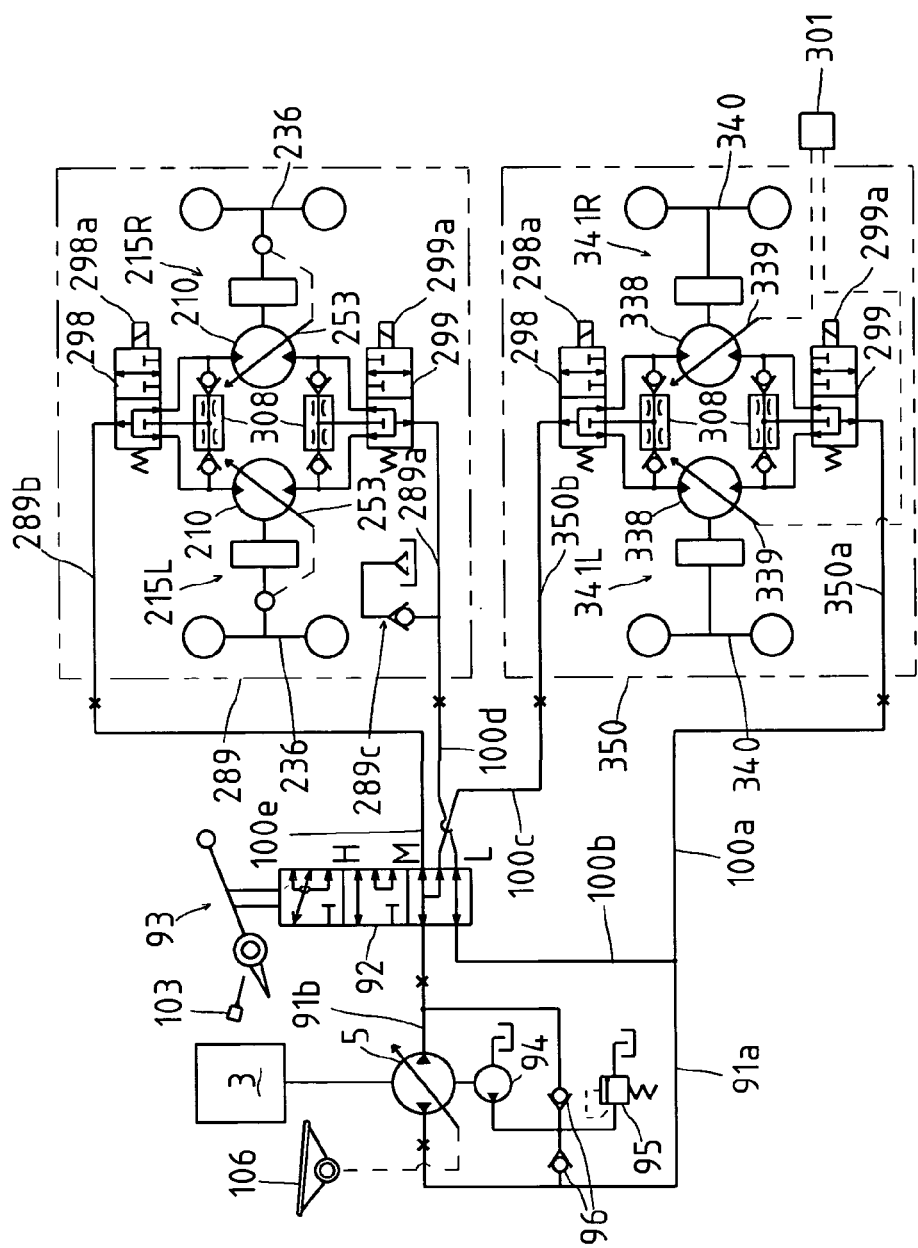
FIG. 55 is a diagram of a hydraulic circuit system of vehicle 1 shown in FIG. 51 to 53, 54(a) and 54(b), comprising first hydraulic circuit 289 for the pair of hydraulic motors 210, an alternative second hydraulic circuit 350 for a pair of hydraulic motors 338 and the auxiliary speed changing system including auxiliary speed changing valve 92.

FIG. 55 illustrates a hydraulic circuit system for vehicle 1 having front transaxles 215 and rear transaxles 341 as shown in FIGS. 51 to 53, 54(a) and 54(b). The hydraulic circuit system comprises first hydraulic circuit 289 including the pair of parallel hydraulic motors 210 and a second hydraulic circuit 350 including the pair of parallel hydraulic motors 338. First hydraulic circuit 289 includes hydraulic fluid passage 289a connected to passage 100d, and hydraulic fluid passage 289b connected to passage 100e, so as to fluidly connect hydraulic motors 210 in parallel to hydraulic pump 5 through auxiliary speed changing valve 92. Second hydraulic circuit 350 includes a hydraulic fluid passage 350a connected to passage 100a, and a hydraulic fluid passage 350b connected to passage 100c, so as to fluidly connect hydraulic motors 338 in parallel to hydraulic pump 5 through auxiliary speed changing valve 92.

When auxiliary speed changing valve 92 is disposed at low speed level position L, all hydraulic motors 210 and 338 are fluidly connected in parallel to hydraulic pump 5 so as to be supplied with respective almost quarters of fluid from hydraulic pump 5. When auxiliary speed changing valve 92 is disposed at middle speed level position M, the pair of parallel hydraulic motors 210 and the pair of parallel hydraulic motors 338 are fluidly connected in tandem to hydraulic pump 5 so that all the fluid from hydraulic pump 5 is distributed between the hydraulic motors 338, and distributed between the hydraulic motors 210.

When auxiliary speed changing valve 92 is disposed at high speed level position H, only the pair of hydraulic motors 338 are supplied with fluid from hydraulic pump 5. Additionally, a sensor 103 is switched on by setting auxiliary speed changing manipulator 93 for setting auxiliary speed changing valve 92 at high speed level position H. Accordingly, a controller 301 reduces the tilt angles of movable swash plates 339 of hydraulic motors 338 so as to increase the rotary speeds of hydraulic motors 338. Alternatively, hydraulic motors 338 may be fixed in displacement.

Similar to first hydraulic circuit 289 and second hydraulic circuit 290 shown in FIG. 46, each of first and second hydraulic circuits 289 and 350 is provided with electromagnetic switching valves 298 and 299 with respective flow restriction members 308. More specifically, in second hydraulic circuit 350, switching valve 298 is interposed between passage 350b and the pair of hydraulic motors 338, and switching valve 299 is interposed between passage 350a and the pair of hydraulic motors 338. As mentioned above, due to switching valves 298 and 299 controlled based on the depression direction of speed control pedal 106 and on the operation of a differential restriction manipulator (such as differential locking pedal 105), hydraulic fluid is distributed through flow restriction member 308 between hydraulic motors 210 and between hydraulic motors 338 so as to restrict differential rotation of front wheels 236 and differential rotation of rear wheels 340, at need.

Alternatively, switching valves 298 and 299 may be removed from one of first and second hydraulic circuits 210 and 350 so that the differential rotation of only either the pair of front wheels 236 or the pair of rear wheels 340 can be restricted.

Figure 56:
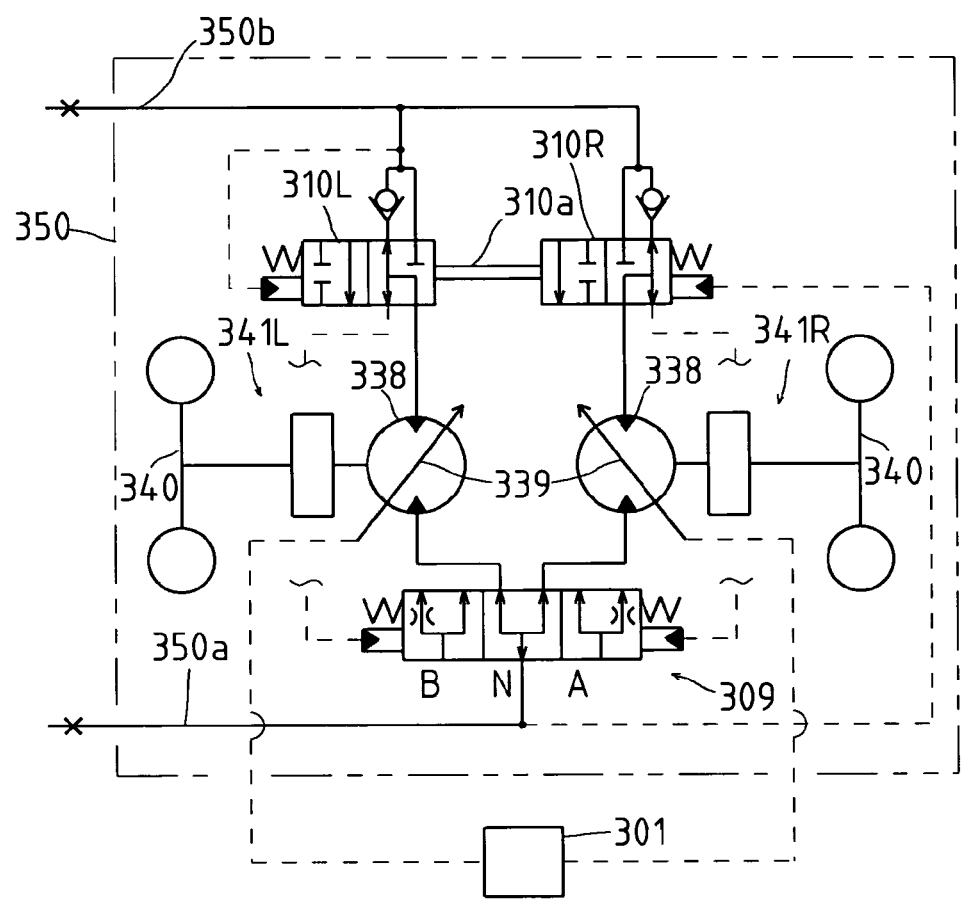
FIG. 56 is a diagram of an alternative second hydraulic circuit 350.

FIG. 56 illustrates an alternative second hydraulic circuit 350 provided with an automatically controlled differential restriction means including flow control valve 309 and switching valves 310L and 310R, similar to FIG. 47. Description is omitted because the structure and function are the same as that of FIG. 47.

Figure 57:
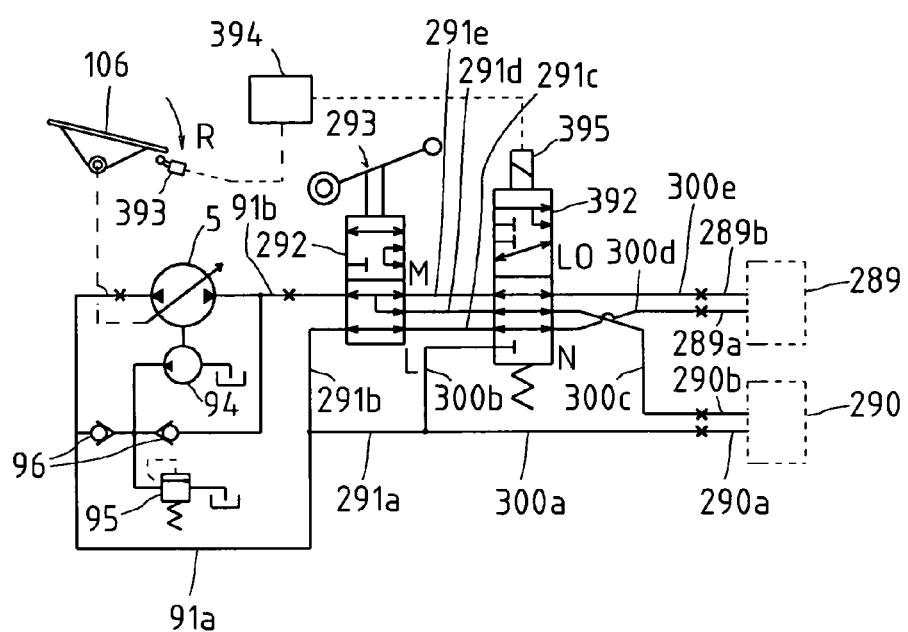
FIG. 57 is a diagram of an alternative auxiliary speed changing system including an auxiliary speed changing valve 292 and a deceleration valve 392.

FIG. 57 illustrates an alternative auxiliary speed changing system, which can automatically reduce the speed of vehicle 1 traveling backward. The auxiliary speed changing system shown in FIG. 57 is applied to the representative hydraulic circuit system including first and second hydraulic circuits 289 and 290 as shown in FIG. 46 (or 47). This auxiliary speed changing system can be applied to any of the hydraulic circuit systems shown in FIGS. 15 (or 16), 21, 35 and 55 (or 56).

Hydraulic fluid passages 91a and 91b are extended from respective suction and delivery ports of hydraulic pump 5. Charge pump 94 can supply fluid to hydraulic fluid passages 91a and 91b through respective charge valves 96. Passage 91a bifurcates to passages 291a and 291b. Passage 291a bifurcates to passages 300a and 300b. Passage 300a is connected to passage 290a of second hydraulic circuit 290.

Passages 91b and 291b are connected to an auxiliary speed changing valve 292 interlocking with an auxiliary speed changing manipulator 293. Passage 300b is connected to an electromagnetic deceleration valve 392. Passages 291c, 291d and 291e are interposed between auxiliary speed changing valve 292 and deceleration valve 392. Passages 300c, 300d and 300e are extended from deceleration valve 392 so that passage 300c is connected to passage 290b of second hydraulic circuit 290, passage 300d to passage 289a of first hydraulic circuit 289, and passage 300e to passage 289b of first hydraulic circuit 289.

By operating auxiliary speed changing manipulator 293, auxiliary speed changing valve 292 is switched between a low speed level position L and a middle speed level position M. Whether auxiliary speed changing valve 292 is disposed at position L or M, vehicle 1 travels by four-wheel driving. Alternatively, auxiliary speed changing valve 292 can be further shifted to a high speed level position (such as high speed level position H of valve 92) for fluidly connecting only either the pair of hydraulic motors 290 or the pair of hydraulic motors 210 to hydraulic pump 5 so that vehicle 1 can travel by two-wheel driving.

Auxiliary speed changing valve 292, disposed at low speed level position L, connects passage 291b to passage 291c, and bifurcates passage 91b to passages 291d and 291e, thereby fluidly connecting all hydraulic motors 210 and 280 in parallel to hydraulic motor 5. Auxiliary speed changing valve 292, disposed at middle speed level position M, cuts off passage 291b, connects passage 91b to passage 291e, and connects passage 291c to passage 291d.

Deceleration valve 392 is switched between a normal position N and a deceleration position LO. When deceleration valve 392 is disposed at normal position N, passage 300b is cut off, passage 291c is connected to passage 300d, passage 291d is connected to passage 300c, and passage 291e is connected to passage 300e. When deceleration valve 392 is disposed at deceleration position LO, passage 300b is connected to passage 300d, passages 291c and 291d are cut off, and passage 291e is bifurcated to passages 300c and 300e.

Deceleration valve 392 is provided with a solenoid 395 electrically controlled by a controller 394. A sensor 393 is disposed adjacent to main speed changing pedal 106 so as to be switched on when main speed changing pedal 106 is depressed for backward traveling of vehicle 1. When main speed changing pedal 106 is not depressed, or is depressed for forward traveling of vehicle 1, sensor 393 is switched off. At this time, solenoid 395 is unexcited so as to keep deceleration valve 392 at normal position N.

When auxiliary speed changing valve 292 is disposed at low speed level position L, and deceleration valve 392 is set at normal position N, passage 91a from hydraulic pump 5 bifurcates to passage 290a of second hydraulic circuit 290 and passage 289a of first hydraulic circuit 289, and passage 91b from hydraulic pump 5 bifurcates to passage 290b of second hydraulic circuit 290 and passage 289b of first hydraulic circuit 289. As a result, all hydraulic motors 210 and 280 are fluidly connected in parallel to hydraulic pump 5.

When auxiliary speed changing valve 292 is disposed at middle speed level position M, and deceleration valve 392 is set at normal position N, passage 91a is connected to passage 290a of second hydraulic circuit 290, passage 91b is connected to passage 289b of first hydraulic circuit 289, and passage 290b of second hydraulic circuit 290 is connected to passage 289a of first hydraulic circuit 289. As a result, the pair of hydraulic motors 210 and the pair of hydraulic motors 280 are fluidly connected in tandem to hydraulic pump 5.

When speed control pedal 106 is depressed for backward traveling of vehicle 1, sensor 393 is switched on. At this time, if auxiliary speed changing valve 292 is disposed at middle speed level position M so as to fluidly connect the pair of hydraulic motors 210 and the pair of hydraulic motors 280 in tandem to hydraulic pump 5, controller 394 excites solenoid 395 so as to shift deceleration valve 392 to deceleration position LO, thereby forcibly fluidly connecting all hydraulic motors 210 and 280 in parallel to hydraulic pump 5.

In this way, even if auxiliary speed changing manipulator 293 is set at the middle speed level position, all hydraulic motors 210 and 280 are automatically fluidly connected in parallel to hydraulic pump 5 so as to slow down vehicle 1 during its backward traveling.

Although the invention has been described in its preferred form with a certain degree of particularity, it is understood that the present disclosure of the preferred form may be changed in the details of construction, and the combination and arrangement of parts may be adjusted, without departing from the spirit and the scope of the invention as hereinafter claimed.

What is claimed is:

1. A steerable hydraulic transaxle, comprising:
   a kingpin relatively rotatably supported by a vehicle chassis;
   a housing fixed to the kingpin;
   a single axle disposed in the housing;
   a single wheel fixed onto the single axle outside of the housing;
   a hydraulic motor disposed in the housing so as to drive the single axle, wherein the single axle is disposed in the hydraulic motor so that an axis of the single axle coincides with a rotary axis of the hydraulic motor; and motor control means for changing a displacement of the hydraulic motor in association with the rotation of the kingpin and the housing relative to the vehicle chassis.

2. The steerable hydraulic transaxle as set forth in claim 1, further comprising:
a kingpin casing fixed to the vehicle chassis, wherein the kingpin relatively rotatably penetrates the kingpin casing, and wherein the motor control means changes the displacement of the hydraulic motor according to the rotation of the kingpin relative to the kingpin casing.

3. The steerable hydraulic trans axle as set forth in claim 2, wherein the motor control means includes a cam formed on the kingpin casing.

4. The steerable hydraulic transaxle as set forth in claim 1, wherein the kingpin is penetrated so as to pass fluid supplied to the hydraulic motor in the housing.

5. A steerable hydraulic transaxle, comprising:
a motor housing fixed to a vehicle chassis, wherein the motor housing is partly formed as a kingpin;
a hydraulic motor disposed in the motor housing;
an axle housing supported by the kingpin to be rotatable relative to the motor housing;
a single axle disposed in the axle housing and drivingly connected to the hydraulic motor;
a single wheel fixed onto the single axle out of the axle housing; and
motor control means for changing a displacement of the hydraulic motor in association with the rotation of the axle housing relative to the motor housing.

6. The steerable hydraulic transaxle as set forth in claim 5, further comprising:
an output shaft of the hydraulic motor disposed on a center axis of the kingpin; and
a gear train disposed in the axle housing so as to drivingly connect the output shaft of the hydraulic motor to the single axle.

7. The steerable hydraulic transaxle as set forth in claim 1, wherein the housing has a first end portion from which the axle projects outwardly towards the wheel, and wherein the first end portion of the housing is disposed in a rim of the wheel.

8. The steerable hydraulic transaxle as set forth in claim 7, wherein the hydraulic motor is disposed in the first end portion of the housing, wherein the housing has a second end portion opposite to the first end portion, and wherein the second end portion is larger in the radial direction of the axle than the first end portion, the steerable hydraulic transaxle further comprising:
a deceleration gear train interposed between the hydraulic motor and the axle, wherein the deceleration gear train is disposed in the second end portion of the housing.

9. A steerable hydraulic transaxle, comprising:
a kingpin relatively rotatably supported by a vehicle chassis;
a housing fixed to the kingpin;
a single axle disposed in the housing;
a single wheel fixed onto the single axle out of the housing;
a variable displacement hydraulic motor disposed in the housing so as to drive the single axle;
a movable swash plate for changing a displacement of the hydraulic motor, wherein the movable swash plate is disposed in the housing so as to be tiltable in association with the rotation of the kingpin and the housing, relative to the vehicle chassis; and
a kingpin casing fixed to the vehicle chassis, wherein the kingpin relatively rotatably penetrates the kingpin casing, and wherein the movable swash plate is operatively connected to the kingpin casing so as to be tiltable according to the rotation of the kingpin relative to the kingpin casing.

10. The steerable hydraulic transaxle as set forth in claim 9, wherein the movable swash plate is operatively connected to a cam formed on the kingpin casing.

11. The steerable hydraulic transaxle as set forth in claim 9, wherein the kingpin is penetrated so as to pass fluid supplied to the hydraulic motor in the housing.

12. A steerable hydraulic transaxle system comprising:
a pair of housings supported by a vehicle chassis so as to rotate relative to the vehicle chassis;
a pair of axles disposed in the respective housings;
a pair of steerable wheels fixed to the respective axles outside of the respective housings;
a pair of hydraulic motors supported by the respective housings so as to drive the respective axles, wherein each of the axles is disposed in the corresponding hydraulic motor so that an axis of the axle coincides with a rotary axis of the hydraulic motor;
a pair of motor control means disposed in the respective housings so as to change displacements of the respective hydraulic motors; and
a steering operation device for steering the pair of steerable wheels, wherein the steering operation device is operatively connected to the pair of housings so that the housings are rotated to turn the steerable wheels according to operation of the steering operation device, thereby steering the pair of steerable wheels, and wherein the steering operation device is operatively connected to the pair of the motor control means so as to change the displacement of the hydraulic motors according to operation of the steering operation device.

13. A steerable hydraulic transaxle system, comprising:
a pair of kingpins relatively rotatably supported by a vehicle chassis;
a pair of housings fixed to the respective kingpins so as to be relatively rotatably supported by the vehicle chassis;
a pair of axles disposed in the respective housings;
a pair of steerable wheels fixed to the respective axles outside of the respective housings;
a pair of hydraulic motors supported by the respective housings so as to drive the respective axles, wherein each of the axles is disposed in the corresponding hydraulic motor so that an axis of the axle coincides with a rotary axis of the hydraulic motor;
a pair of motor control means disposed in the respective housings so as to change displacements of the respective hydraulic motors; and
a steering operation device for steering the pair of steerable wheels, wherein the steering operation device is operatively connected to the pair of motor control means so as to change the displacements of the hydraulic motors according to operation of the steering operation device.

* * * * *

UNITED STATES PATENT AND TRADEMARK OFFICE
CERTIFICATE OF CORRECTION

PATENT NO. : 7,591,338 B2
APPLICATION NO. : 11/008662
DATED : September 22, 2009
INVENTOR(S) : Koji Irikura It is certified that error appears in the above-identified patent and that said Letters Patent is hereby corrected as shown below:

Title Page item (30) should be inserted as follows:

--(30) Foreign Application Priority Data

Dec. 11, 2003 (JP) ..........................2003-413756
Jan. 15, 2004  (JP) ..........................2004-7631

Column 43, line 11, reading "The steerable hydraulic trans axle as set forth" should read --The steerable hydraulic transaxle as set forth--.

Signed and Sealed this

Seventeenth Day of November, 2009

David J. Kappos
*Director of the United States Patent and Trademark Office*